United States Patent
Caton et al.

(10) Patent No.: US 10,552,846 B2
(45) Date of Patent: Feb. 4, 2020

(54) AUTHENTICATED BARCODE PATTERNS

(71) Applicant: Document Security Systems Inc., Rochester, NY (US)

(72) Inventors: Michael Caton, Oakfield, NY (US); Michael Roy, Webster, NY (US); David Wicker, Dansville, NY (US); Nicole Acton, Churchville, NY (US); Jaeson Caulley, Foster City, CA (US)

(73) Assignee: DOCUMENT SECURITY SYSTEMS, INC., Rochester, NY (US)

( * ) Notice: Subject to any disclaimer, the term of this patent is extended or adjusted under 35 U.S.C. 154(b) by 0 days.

(21) Appl. No.: 14/696,499

(22) Filed: Apr. 27, 2015

(65) Prior Publication Data

US 2015/0302421 A1   Oct. 22, 2015

Related U.S. Application Data

(63) Continuation-in-part of application No. PCT/US2013/065029, filed on Oct. 15, 2013, which is a continuation-in-part of application No. 13/838,892, filed on Mar. 15, 2013, now Pat. No. 9,171,347.

(60) Provisional application No. 61/814,962, filed on Apr. 23, 2013, provisional application No. 61/841,218, filed on Jun. 28, 2013, provisional application No. 61/719,385, filed on Oct. 27, 2012, provisional application No. 61/713,422, filed on Oct. 12, 2012.

(51) Int. Cl.
*G06Q 20/00* (2012.01)
*G06Q 30/00* (2012.01)
*G06Q 20/20* (2012.01)

(52) U.S. Cl.
CPC ......... *G06Q 30/018* (2013.01); *G06Q 20/204* (2013.01)

(58) Field of Classification Search
CPC ......... G06Q 10/20; G06Q 30/06; G07G 1/145
USPC ............................... 235/375; 713/300, 320
See application file for complete search history.

(56) References Cited

U.S. PATENT DOCUMENTS

| | | | |
|---|---|---|---|
| 7,710,623 B2 | 8/2010 | MacMaster |
| 7,906,198 B2 | 3/2011 | Wicker |
| 8,249,350 B2 | 8/2012 | Voloshynovskyy |
| 8,285,748 B2 | 10/2012 | Thomas |

(Continued)

*Primary Examiner* — Rokib Masud
(74) *Attorney, Agent, or Firm* — McDonnell Boehnen Hulbert & Berghoff LLP

(57) ABSTRACT

A system and method for hidden security feature detection, analysis and authentication using a smart device is disclosed. The smart device can detect and analyze hidden security features using the camera capability of the smart device to capture a digital image, and then analyze and authenticate that image using a security service including a database of security feature data, processing rules, and other information. The security service can support a variety of smart devices and security features. The smart device includes a security-specific autofocus function that allows the smart device to be positioned within a range of distances and angles from a target document that includes hidden/covert security feature(s). The smart device can display an enhanced image showing the hidden security feature(s) and/or report if the security feature is valid or invalid, along with related information, via beeps, vibration, display, text messaging, or other reporting capabilities.

7 Claims, 29 Drawing Sheets

(56) References Cited

U.S. PATENT DOCUMENTS

| | | | | |
|---|---|---|---|---|
| 2003/0213844 | A1* | 11/2003 | Yoshida | G06Q 30/06 |
| | | | | 235/383 |
| 2007/0283175 | A1* | 12/2007 | Marinkovic | G06F 1/3218 |
| | | | | 713/320 |
| 2012/0187185 | A1* | 7/2012 | Sayan | G06Q 30/0601 |
| | | | | 235/375 |
| 2012/0298743 | A1* | 11/2012 | Voloshynovskyy | G07D 7/005 |
| | | | | 235/375 |

* cited by examiner

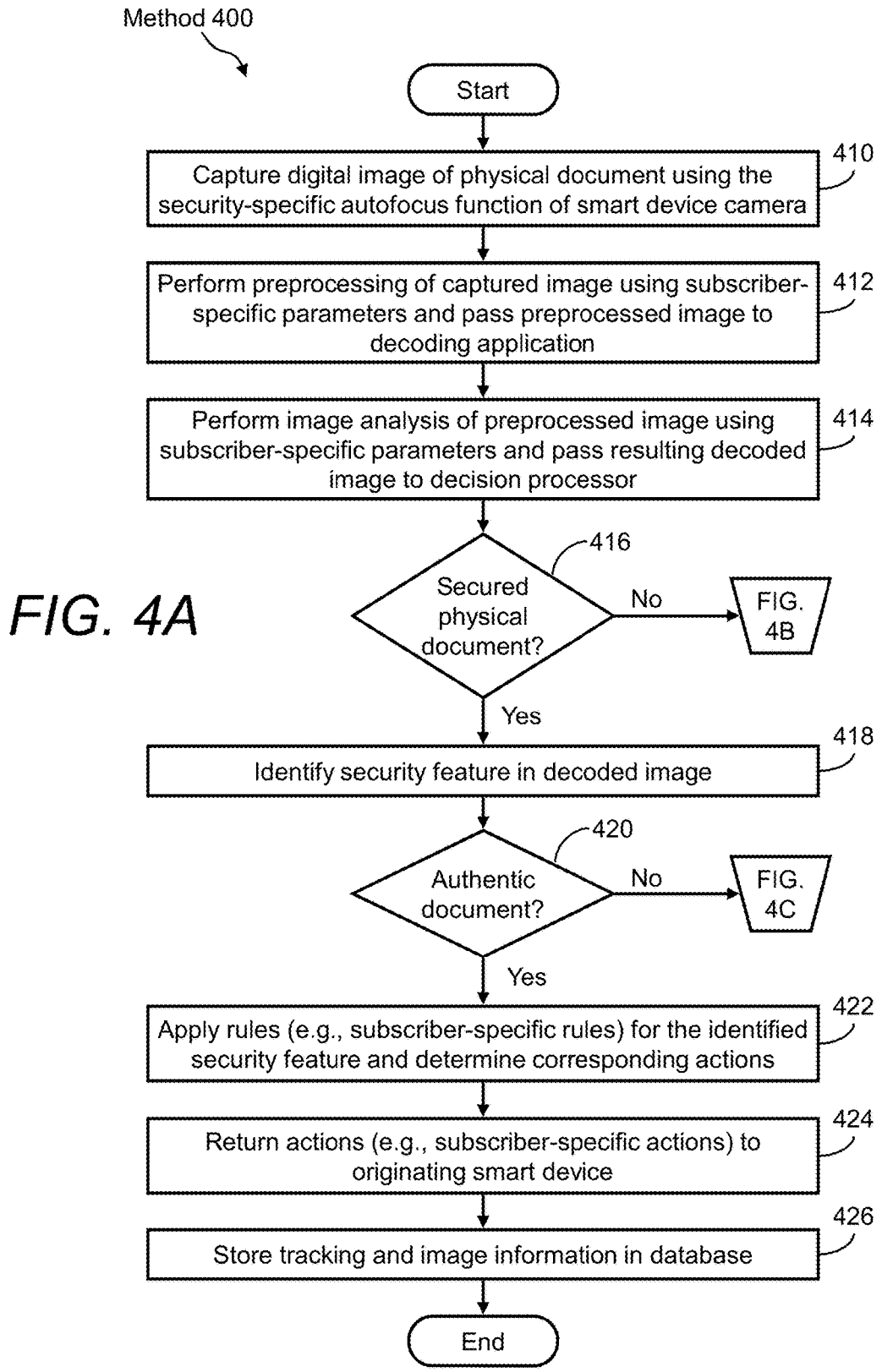

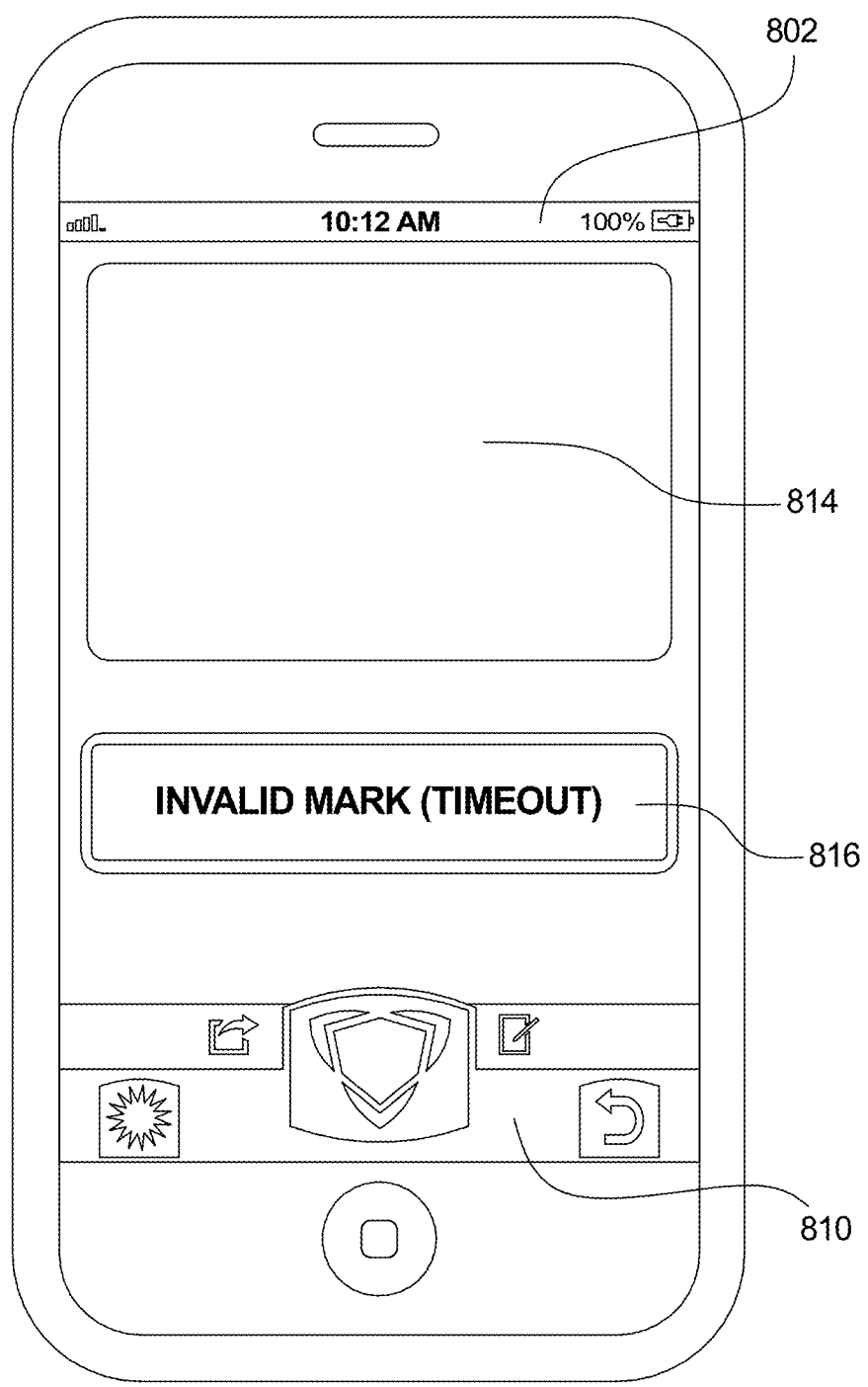

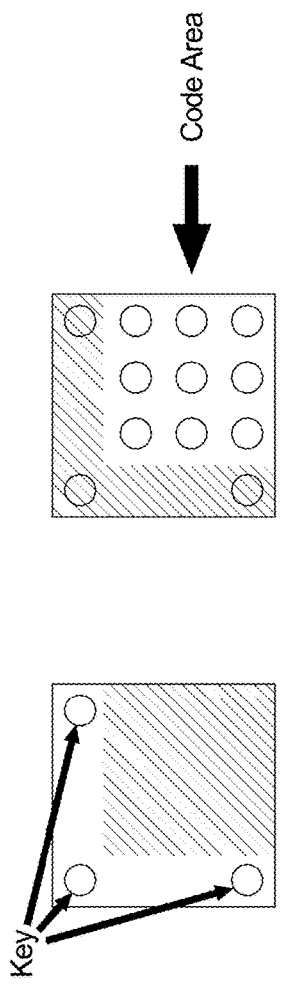
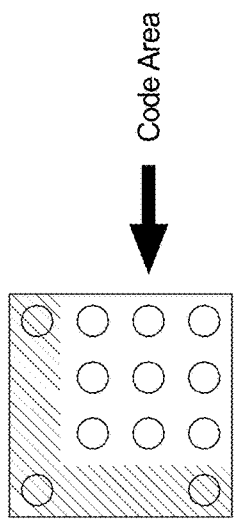
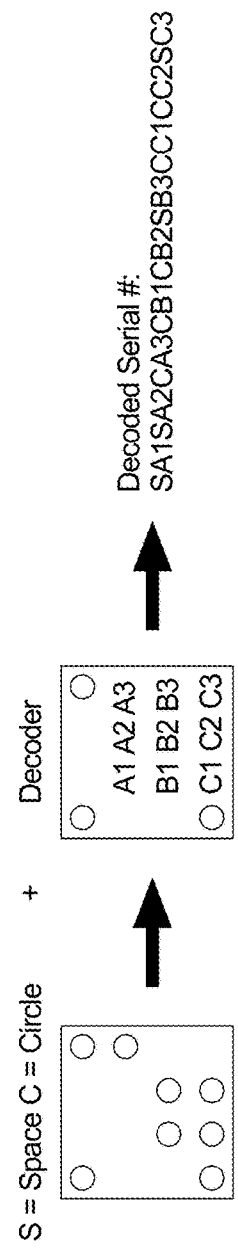
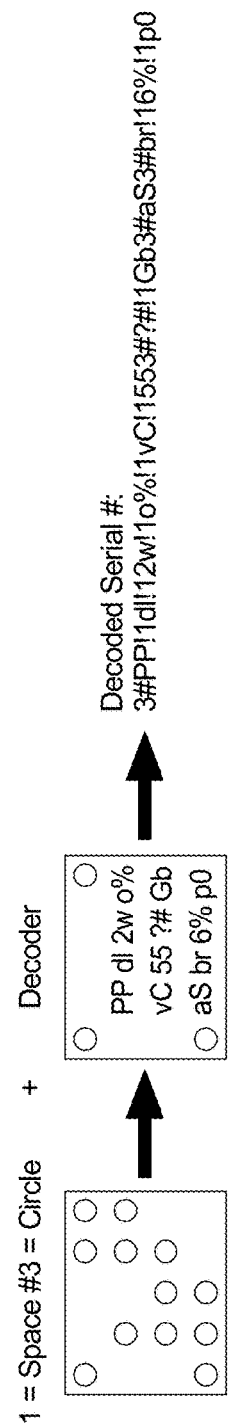
FIG. 11A FIG. 11B
FIG. 11C
FIG. 11D
Key
Code Area
S = Space C = Circle
Decoder
A1 A2 A3
B1 B2 B3
C1 C2 C3
Decoded Serial #:
SA1SA2CA3CB1CB2SB3CC1CC2SC3
!1 = Space #3 = Circle
Decoder
PP dl 2w o%
vC 55 ?# Gb
aS br 6% p0
Decoded Serial #:
3#PP!1dl!12w!1o%!1vC!1553#?#!1Gb3#aS3#br!16%!1p0

FIG. 12A
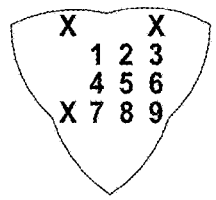
FIG. 12B
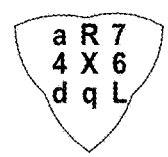
FIG. 12C
FIG. 12D
```
0 r
B 2
h 9
J U
h R
```
FIG. 12E
```
0 B h J h
r 2 9 U R
```
FIG. 12F
```
B h J h
r 2 9 U
c 1 Y 7
```
FIG. 12H
```
0 r s        d y 5 h u        d y 5 h u
B 2    d     e 5              e 5
h 9      p   y u              y u
J U    9     4 t 7 6 6        4 t 7 6 6
h R    k         8 i              8 i
k C  2           9 9              9 9
5 p 1        8 G 4 Y n        8 G 4 Y n
```
FIG. 12G
```
あ い え
お う は
ひ す で
```

AUTHENTICATED BARCODE PATTERNS

CROSS-REFERENCE TO RELATED APPLICATIONS

This application is a continuation-in-part of International Patent Application No. PCT/US2013/065029, filed Oct. 15, 2013, which claims priority to, and the benefit of, U.S. Provisional Patent Application No. 61/713,422, filed Oct. 12, 2012; U.S. Provisional Patent Application No. 61/719,385, filed Oct. 27, 2012; U.S. patent application Ser. No. 13/838,892, filed Mar. 15, 2013; U.S. Provisional Patent Application No. 61/814,962, filed Apr. 23, 2013; and U.S. Provisional Patent Application No. 61/841,218, filed Jun. 28, 2013. The contents of each of these applications are hereby incorporated herein by reference in their entireties and for all purposes.

FIELD

The present disclosure relates generally to systems for capturing, analyzing and authenticating documents and/or images, and more particularly to systems and methods of detecting and authenticating hidden or covert security features using smart devices such as, for example, smart phones.

BACKGROUND

Unless otherwise indicated herein, the materials described in this section are not prior art to the claims in this application and are not admitted to be prior art by inclusion in this section.

For several reasons, it is highly desirable to identify counterfeit or fraudulent documents, such as to identify fraudulent products with counterfeit packaging and/or other identifying information. Advancing technology, such as improved software applications, printers and copiers, has enabled the proliferation of counterfeit documents. For example, grey market or knock-off goods are difficult to distinguish from authentic and/or authorized goods. Identifying a product as authentic based on its packaging or other documentation is especially important when dealing with products, such as pharmaceutical products, where the effect of a counterfeit product may be life-threatening. As additional examples, a counterfeit vehicle title can be very costly to an unsuspecting purchaser, and fake coupons can be costly to a business. Therefore, it is important to develop a method for providing tamper-resistant security information in documents along with the ability to readily authenticate that security information.

Websites may be used to market and sell goods and services. For example, a merchant may operate a website to sell various products to users of the site. For example, a bank of government may operate a website to allow users of the site to access user-specific financial or regulatory information. In some cases, counterfeit or fraudulent products are offered online. In some industries, the bulk of non-authentic goods are sold online as opposed to in brick and mortar retail establishments. In addition, counterfeit websites may be used to induce users into divulging user-specific information, such as financial information, social security information, tax information, etc.

Website security protocols have been developed to allow for secure transmission of information between a user and certain websites using public/private encryption (e.g., a secure socket layer (SSL) encryption and the like). Such security protocols help to prevent information transmitted between a user's terminal and a website server from being intercepted, but they do not generally inform a user whether the website server is an authentic site as opposed to a counterfeit.

SUMMARY

The following disclosure is directed toward detecting and authenticating hidden security features using smart devices. According to some embodiments, a smart device is equipped with a camera and a capture application which combine to provide focusing, filtering, and image capture capability. According to some embodiments, the smart device is configured to capture and preprocess images containing hidden security features, and communicate with a network-based security service for decoding and authentication of hidden security features. According to some embodiments, the smart device is configured to communicate with a decoding application, decision processor, and database on the smart device to decode and authenticate hidden security features. According to some embodiments, information as to the authenticity of the hidden security feature and any related information is then received by the smart device and reported to a user via a variety of available methods, such as text messaging, email, audible alerts, displaying of decoded images, or similar methods.

The present disclosure involves authenticating websites by providing websites with security images to be displayed as a graphic on the site. A user can then validate the site as authentic by taking a picture of the graphic and communicating with a server to determine whether the site is authentic. According to some embodiments, a website server requests an authentication graphic for each new session that is initiated. A network-based security service generates an authentication graphic (for example, based on the session identifier) and outputs the graphic for display on the site. A user of the website can then query the security service to validate the displayed authentication graphic by capturing an image of the graphic and communicating with the security service. For example, the user can use a camera-equipped device that is loaded with an image capture application which operates to provide focusing, filtering, and image capture capability. According to some embodiments, the device is configured to capture and preprocess images containing hidden security features, and communicate with the network-based security service for authenticating the displayed graphic (and thus, the website on which the graphic appears). The network-based security service can analyze the captured image and determine whether the captured image is of a valid authentication graphic and indicate the resulting determination back to the device. The device can then report the result to the user to inform the user whether the site is authentic. On the other hand, negative results may be reported to personnel to initiate an investigation.

In some cases, one or both of the initial request for a security image to display on the website or the request to authenticate a captured image may include information about the user useful for marketing purposes. For example, the initial request may include information specifying the user's session identifier or session token. Additionally or alternatively, the request for authentication may include information useful for marking purposes, such as the user's location, contact information, etc. Using information encoded in the authentication graphic, the security service may operate to associate terminal specific information with mobile device specific information to thereby enable an enhanced understanding of the user of the website.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

The accompanying drawings, which are incorporated into this specification, illustrate one or more example embodiments disclosed herein and, together with the detailed description, serve to explain the principles and example implementations of the present disclosure. One of skill in the art will understand that the drawings are illustrative only, and that what is depicted therein may be adapted based on the text of the specification and the spirit and scope of the teachings herein.

FIGS. 4A, 4B, and 4C are portions of a single flow diagram that illustrates a method of operation of the security feature detection and authentication system, according to an embodiment of the present disclosure.

FIG. 8C illustrates another display screen of the example authentication application shown in FIG. 8A during reporting of a timeout, which may occur when a hidden/covert security feature cannot be detected by capture application.

FIG. 11A illustrates an example in which a serial number is extracted from a pattern of hidden characters using guide elements that serve as a key, according to embodiments of the present disclosure.

FIG. 11B illustrates the pattern of hidden characters shown in FIG. 11A, but with guide elements forming the key shaded.

FIG. 11C illustrates an example of a 3 by 3 coded pattern that defines a serial number according to a decoder, according to an embodiment of the present disclosure.

FIG. 11D illustrates an example of a 3 by 4 coded pattern that defines a serial number according to a decoder.

FIG. 12A illustrates an example configuration for a pattern patterns of characters including alphanumeric characters and key elements to be embedded in security feature, according to embodiments of the present disclosure.

FIG. 12B illustrates an example configuration for a pattern of characters including alphanumeric characters, but no key elements, according to embodiments of the present disclosure.

FIG. 12C illustrates an example configuration for a pattern of characters including alphanumeric characters situated in an orienting box shape, according to embodiments of the present disclosure.

FIG. 12D illustrates an example configuration for a pattern of characters including alphanumeric characters arranged in a 2 by 5 array, according to embodiments of the present disclosure.

FIG. 12E illustrates an example configuration for a pattern of characters including alphanumeric characters arranged in a 5 by 2 array, according to embodiments of the present disclosure.

FIG. 12F illustrates an example configuration for a pattern of characters including alphanumeric characters arranged in a 3 by 4 array, according to embodiments of the present disclosure.

FIG. 12G illustrates an example configuration for a pattern of characters including an array of non-latin alphanumeric characters, according to embodiments of the present disclosure.

FIG. 12H illustrates an example configuration for a pattern of characters including alphanumeric characters arranged in a non-rectangular shape so as to spell out letters, according to embodiments of the present disclosure.

DETAILED DESCRIPTION

Figure 1:
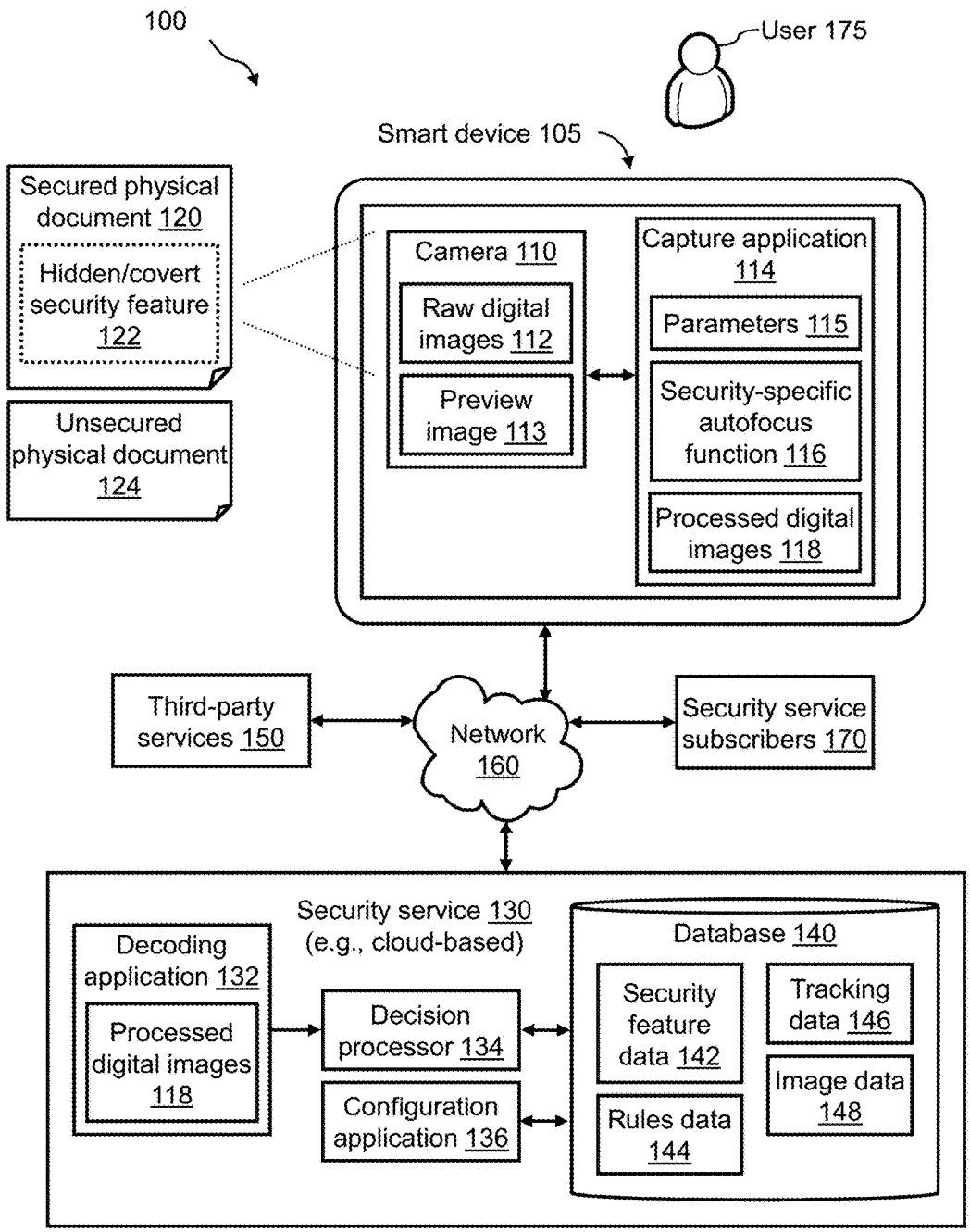
FIG. 1 illustrates a system for providing security feature detection and authentication services using a smart device communicatively coupled to a network based security service, according to one embodiment of the present disclosure.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

As a means of product identification and tracking, a barcode such as a Universal Product Code (UPC) or a Quick Response (QR) code is often printed on the packaging of consumer products. These printed codes are optically scanned for rapid decoding. However, barcodes are readily visible on the product packaging and are susceptible to copying, adjustment, and other forgery. To reduce fraud, it is desirable to add hidden security information to product packaging as an alternative, or in conjunction with, barcode information and/or other tracking and identification information.

The hidden security information can be, for example, objects, symbols, characters, and/or markers that are not easily visible to the human eye, yet can be detected by other means, such as by optical detection. Optimally, it would be desirable to authenticate hidden security information using smart devices, such as a smart phone or tablet, as smart devices are prevalent, configurable, and are often carried on a person thus readily available when authentication is desired. However, several challenges limit the use of smart devices for optical detection of hidden security information. First, the camera systems in smart devices are designed to focus on faces, not hidden security information, and this is problematic if the hidden security information does not have contrast points for use in focusing. Also affecting the process is the effect of varying focal lengths on the image capture process, possibly requiring the smart device camera to be positioned at a predetermined distance and/or angle from the target in order to capture hidden security information. Additionally, mobile smart devices may have reduced computing power and/or battery life.

Systems and methods for hidden security feature detection and authentication using smart devices are provided. In some embodiments, the smart device acts as a remote client in a client-server architecture, capturing an image of a document potentially containing a hidden security feature and communicating with a server to process and authenticate the image. A smart device is a device that (1) includes an operating system that allows it to execute software, firmware, or hardware applications, (2) includes a digital camera, and (3) includes the capability to communicate via a network. According to some embodiments, a smart device is a mobile device, such as a smartphone or tablet device. The system uses the smart device in combination with a hosted security service to process physical documents with respect to covert security features. While hidden or covert security features are not easily visible to the human eye, the document security system uses image processing to determine the presence or absence of hidden or covert security features in digital images of physical documents, wherein the digital images are captured using the smart devices. According to some embodiments, the image processing and identification of the hidden or covert security features is provided via a hosted (e.g., cloud-based) security service that can support a plurality of smart devices and a variety of customized hidden security features.

According to some embodiments, the system provides configurable applications for mobile platforms that decode and authenticate hidden or covert security features. This can be accomplished using internal manipulation of the camera feed, image processing both on the smart device and a cloud-based server, and/or database lookup/authentication capability on the cloud-based server. In one example, the hosted security service supports a plurality of camera-enabled smart devices, wherein the digital image data acquired by each device is used to identify the presence or absence of hidden/covert security features in physical documents. Additionally, the hosted (e.g., cloud-based) security service processes the hidden or covert security features with respect to certain rules that determine what action(s) are returned to an originating smart device. Further, according to some embodiments, the hosted security service can, for audit purposes, maintain a record of all images processed using the document security system described herein. Accordingly, in some embodiments, a camera-enabled smart device in combination with a hosted security service of the document security system provides a configurable and convenient method of processing hidden/covert security features in physical documents that is otherwise not possible using conventional methods.

II. Example System for Security Feature Verification

FIG. 1 illustrates a block diagram of an example system 100 for providing security feature detection response services to smart devices. In one example, system 100 includes one or more smart devices 105, a security service 130, and one or more third-party services 150 that are communicatively connected via a network 160. Network 160 may be, for example, a local area network (LAN) and/or a wide area network (WAN), including a cellular network, for connecting to the Internet or any cloud computing environment, or any private or public network. Entities of system 100 may connect to network 160 by any wired and/or wireless means. Security service 130 is, for example, a document authentication service. Security service 130 may be implemented as a hosted (e.g., cloud-based) service to which entities (or customers) may subscribe. For example, one or more security service subscribers 170 may be associated with system 100, wherein security service subscribers 170 are the subscribers to the security service 130 supported by system 100. Certain users 175 are associated with each respective security service subscriber 170.

2a) Example Smart Device(s)

A user 175 accesses security service 130 via a smart device 105 and then uses the smart device 105 as a convenient and portable mechanism for authenticating documents. Smart device 105 may comprise, for example, any smart mobile device that (1) includes an operating system (OS) that allows execution of software applications, (2) includes a built-in digital camera, and (3) includes network capability. Examples of smart device 105 include, but are not limited to, Android-based phone, the Apple iPhone, the Apple iPad, the Samsung Galaxy tablet, Windows phone, and Blackberry phone or tablet. As such, smart device 105 may include mobile operating system(s), such as, but not limited to, the Android OS from Google, Inc., the BlackBerry OS from Research In Motion Limited (RIM), the iOS from Apple Inc., the Series40 (S40) OS from Nokia, the Symbian OS from Nokia and Accenture, the Bada OS from Samsung Electronics, the Windows Phone OS from Microsoft, and the webOS from Hewlett Packard.

However, smart device 105 of system 100 is not limited to smart mobile devices only. Smart device 105 of system 100 may be any computing device that is capable of running software applications, that includes a built-in digital camera or that is otherwise connected to a digital camera, and that has network capability. Namely, smart device 105 can be, for example, a personal digital assistant (PDAs), mobile phone, scanning/imaging device, tablet device, desktop computer, laptop computer, dedicated document scanning device, and/or server.

Each smart device 105 includes or is otherwise connected to a digital camera 110. Raw digital images 112 are any images captured using camera 110 of the smart device 105. A user 175 can use camera 110 of their smart device 105 as a convenient means to capture raw digital images 112 of a physical document to be analyzed via security system 130. For example, user 175 can use camera 110 of their smart device 105 to capture raw digital images 112 of secured physical document 120 that include hidden/covert security feature(s) 122 or of unsecured physical document 124, wherein unsecured physical documents 124 do not include hidden/covert security feature 122. Both secured physical document 120 and unsecured physical document 124 can be any hardcopy document (e.g., hardcopy paper document, credit card, government-issued ID, currency, etc) or physical surface of any object (e.g., product packaging or product itself) that have, for example, alphanumeric characters, symbols, markers, and/or graphics thereon, such as applied by printing. The print density of the document may be between a range from about 1% to 90%, but will commonly be in the range from approximately 5% to 70%.

2b) Example Security Feature(s)

Hidden/covert security feature 122 of secured physical document 120 is, for example, alphanumeric characters, objects, symbols, or markers that are not easily visible to the human eye, yet can be detected using features of document security system 100. In some embodiments, hidden/covert security feature 122 comprises a background/foreground image including big dot configurations, little dot configurations, ODT pantographs, AGPantograph 4000, Prism™ technology, barcodes (including UPC, GS1, Data Matrix, QR, PDF417, Aztec, or other barcodes), dots and lines over pantograph, microprint over pantograph, pantograph under/over the VeriGlow™ technology from Document Security Systems, Inc (Rochester, N.Y.), and/or Prism™ technology combined with VeriGlow™ technology. Examples of hidden/covert security feature 122 have been previously described in International Patent Application Publication WO 2013/067092, filed Nov. 4, 2011, entitled "System and Method for Dynamic Generation of Embedded Security Features in a Document;" U.S. patent application Ser. No. 11/495,900 entitled "Covert Document System;" U.S. patent application Ser. No. 11/741,394 entitled "Document with Linked Viewer File for Correlated Printing;" U.S. Pat. No. 7,906,198 entitled "Document Containing Security Images;" U.S. Pat. No. 7,845,562 entitled "Solid-Color Embedded Security Feature;" U.S. Pat. No. 7,976,068 entitled "Double-blind Security Features;" and U.S. Pat. No. 7,982,917 entitled "Document Containing Scanning Survivable Security Features;" U.S. Pat. No. 8,444,181 entitled "Single Color Screen Patterns for Copy Protection;" each of which is incorporated herein by reference in its entirety.

Any information may be encoded into hidden/covert security feature 122. For example, hidden/covert security feature 122 may convey unique product information, unique promotional codes, ownership information (e.g., name, address, phone number), any user-defined information, any mark indicating authenticity, and the like.

According to some embodiments, secured physical document 120 and unsecured physical document 124 may be documents that are specific to entities that subscribe to security service 130 of system 100. Therefore, the hidden/covert security feature 122 that is embedded in secured physical document 120 may be designed according to certain parameters provided by each respective security service subscriber 170. In other words, hidden/covert security feature 122 may be a subscriber-specific security feature or combination of features. To support multiple security service subscribers 170, a capture application 114 is provided on smart device 105, wherein the capture application 114 is a software application that is a configurable to meet the security specifications of a given security service subscriber 170. In one example, capture application 114 is implemented as a smartphone app, such as an Android app or an iPhone app. In another example, capture application 114 is implemented as a tablet app, such as an iPad app or Galaxy Tab app.

Hidden/covert security features 122 are constructed, for example, using lines, dots, dashes, whitespaces, or microprint whose features are spaced too closely to be visible by the human eye. To the eye, these lines, dots, dashes, whitespace, or microprint simply appear as, for example, a tinted region revealing no discernable content. However, these lines, dots, dashes, whitespaces, or microprint are optically detectable via camera 110. According to some embodiments, the lines, dots, dashes, whitespaces, or microprint that form the hidden/covert security feature 122 are designed according to parameters provided by the security service subscriber 170, wherein the parameters may be different from one security service subscriber 170 to another. Accordingly, in some embodiments, capture application 114 includes a set of parameters 115.

In some examples, the security feature 122 can include a background region and a latent image that is discernible via the camera 110 and associated image processing techniques (e.g., executed by the smart device 105 and/or security service 130). The background and/or latent image may be formed by a line screen pattern of spatially periodic lines, dots, line segments, or other printed elements. In some cases, the background and latent image can occupy substantially non-overlapping regions (i.e., the background does not occupy the same spatial region as the latent image). In other cases, the background may form a visually integrated setting that spans an entire region of the security feature 122 while the latent image is also included in some portions thereof. The background and the latent image may have a print density, color, and line spacing that complement one another such that the latent image is not readily discernible from the background using the naked eye. In examples in which the background and/or latent image(s) are formed using line screen patterns, the orientations of the line screen patterns for the background and latent image may have a relative orientation that allows the smart device 110 to detect the latent image from the background, and thereby extract the hidden content. In some examples, the security feature 122 may be printed with an ink (or dye, toner, etc.) that is not visible in the visible spectrum (e.g., an ultraviolet ink, infrared ink, etc.). Further still, only a portion of the security feature 122 may be rendered with such non-visible ink (e.g., only the background region or the latent image region, for example). To detect such non-visible security features, the camera 110 of the smart device 105 may be equipped with a suitable filter and/or active imaging system (e.g., so as to stimulate fluorescent inks, dyes, etc.) to sensitize the imaging capability of the smart device 105 to such a non-visible security feature. Further still, such security features may be rendered on an electronic display (e.g., a pixelated transmissive, emissive, and/or reflective display) configured to render visual content on an active region thereof according to display instructions.

2c) Security Feature Image Capture

According to some embodiments, any information in parameters 115 can be modified to customize the detection capability for security purposes. Parameters 115 include, for example, line frequency, screen angles, text/content, image structure, color, and related data. Further, in some embodiments, the contents of parameters 115 are subscriber-specific. For example, a smart device 105 associated with a first security service subscriber 170 may include parameters 115 that are specific to the first security service subscriber 170. However, a smart device 105 associated with a second security service subscriber 170 may include parameters 115 that are specific to the second security service subscriber 170, thus allowing the capture application 114 to be configured based on security service subscribers 170. Also, parameters 115 may comprise specific configuration information for patterns used within hidden security features 122, such as the configuration of the pattern shown in FIG. 6, allowing the particular configuration information for a recognized pattern to be available for analysis and/or comparison during the decoding process.

According to some embodiments, capture application 114 installed on a smart device 105 further includes a security-specific autofocus function 116 that is used for controlling the focus of camera 110. As is well-known, autofocus is a function that automatically focuses the camera lens on a subject. The mechanisms of autofocus functions found on cameras can be roughly classified into two categories—phase detection and contrast detection. However, according to some embodiments, security-specific autofocus function 116 differs from the standard autofocus function included in standard digital cameras in that it tailors the autofocus function based on the information in parameters 115, and combines the autofocus process with a filtering process to attempt to identify image data corresponding to hidden/covert security features 122. In some embodiments, security-specific autofocus function 116 uses the information in parameters 115, which corresponds to the design of a hidden/covert security feature 122 to be detected, to control the focal length adjustment during the autofocus and filtering process in such as way as to optically reveal the image data corresponding to hidden/covert security feature 122. This process may be aided by a focusing target or pattern embedded in hidden/covert security feature 122, which will allow the capture application 116 to optimally capture the latent image and/or text in hidden/covert security feature 122 using the focusing target or pattern. Because the information in parameters 115 can differ from one security service subscriber 170 to another, the security-specific autofocus function 116 of capture application 114 is configurable from one security service subscriber 170 to another.

The presence of security-specific autofocus function 116 in capture application 114 allows the smart device 105 to be positioned at a wide range of acceptable distances and angles from the target. Alternatively, in some embodiments, the smart device 105 can be positioned at a pre-determined angle and/or range, such as, for example, a fixed smart device system used for applications such as airport gate ticket verification, event ticketing, or store checkout. During the autofocus operation, with each focal length adjustment a preview image 113 is streamed in real time from camera 110 to capture application 114. Security-specific autofocus function 116 attempts to focus and filter preview image 113 to optically reveal image data corresponding to the hidden/covert security feature 122. If the hidden/covert security feature 122 is in focus and optically revealed, a raw digital image 112 that includes the hidden/covert security feature 122 is captured. In the case of unsecured physical document 124 in which no hidden/covert security feature 122 is present, the security-specific autofocus function 116 ends the focus and filtering process after a configurable number of attempts and then captures the raw digital image 112. In some embodiments, the smart device 105 may then report to the user 175 that no hidden/covert security feature 122 was found.

According to some embodiments, capture application 114 may generate an audible indicator, a visual indicator, a tactile indicator, or any combinations thereof when the autofocus function is complete and the raw digital image 112 has been captured. For example, using the capabilities already built into the smart device 105, capture application 114 can generate a beeping or buzzing sound, a readable message on the display, or a vibration to indicate that the raw digital image 112 has been captured.

System 100 provides benefits over current smart device applications for detecting hidden/covert security features in documents. In one example, system 100 provides a security specific autofocus function, whereas existing smart device applications do not provide such function. The system 100 allows the smart device 105 to detect hidden/covert security features from a wide range of focal lengths and angles. Thus, the smart device 105 is not required to be oriented in a specific manner or at a specific distance relative to the secured physical document 120. Additionally, system 100 allows for configurable security features, such that the hidden/covert security feature(s) 122 can be adjusted and/or optimized for particular customers and/or secured physical documents 120, yet multiple types of hidden/covert security features 122 can be analyzed by a smart device 105. Thus, the system 100 is sufficiently flexible to support a variety of security service subscribers 170, smart devices 105, and hidden/covert security features 122

According to some embodiments, the purpose of the security-specific autofocus function 116 is not to perform the decoding process, which is the process of identifying and authenticating hidden/covert security features 122. Instead, the purpose of the security-specific autofocus function 116 is to acquire a raw digital image 112 in which the hidden/covert security feature 122 is revealed with enough clarity or detail that the feature can be decoded automatically using image processing software. According to some embodiments, once a raw digital image 112 is captured using camera 110, parameters 115, and security-specific autofocus function 116, the capture application 114 is used for pre-processing the image data of raw digital images 112. For example, the preprocessing performed by capture application 114 is to modify the original image data of raw digital images 112 in a manner that is useful for further image processing at security service 130, and more particularly for detecting hidden/covert security feature 122 at security service 130. In image processing, the preprocessing operation can be, for example, smoothing. According to some embodiments, based on the subscriber-specific information in parameters 115, capture application 114 can be used to apply certain optical filtering, certain angles, certain line frequency, certain color, certain density, certain micro-printing to raw digital images 112. Capture application 114 can segment a portion of raw digital images 112 according to predetermined locations at which security features would be expected to appear. In this way, raw digital images 112 are processed using capture application 114 to produce processed digital images 118 that are more appropriately suited for security feature decoding. According to some embodiments, in processed digital images 118 a certain amount of, for example, the background image, opposite angle image, dot size, and/or dot shape has been filtered out, thereby revealing, for example, the lines, dots, dashes, whitespaces, and/or microprint of the foreground image (i.e., the hidden security feature(s)) to at least some degree.

Then, in some embodiments, using the information in parameters 115 that is supplied by capture application 114 combined with certain image processing methods, the hidden/covert security feature 122 in processed digital images 118 is detectable and/or decoded at security service 130. For example, processed digital images 118, along with subscriber-specific information from parameters 115, are transmitted via network 160 to a decoding application 132 at security service 130. Using subscriber-specific information in parameters 115, decoding application 132 performs additional image processing to further enhance processed digital images 118 in order to detect image data corresponding to hidden/covert security features 122 embedded therein. According to some embodiments, decoding application 132 is based, for example, on image processing algorithms, such as algorithms based on the Prism™ technology from Document Security Systems, Inc (Rochester, N.Y.) as well as standard digital image processing algorithms, such as linear filtering, pixilation, fractals, and other known processes.

According to some embodiments, if an acceptable original raw digital image 112 is obtained from of a secured physical document 120, decoding application 132 will detect information related to a hidden/covert security feature 122 embedded therein according to parameters 115. However, if the original raw digital image 112 is an image of an unsecured physical document 124, no hidden/covert security feature 122 will be detected by decoding application 132. Additionally, with respect to secured physical documents 120, the hidden/covert security feature 122 thereof may be authentic; however, there is also the possibility of counterfeit hidden/covert security feature 122, e.g. hidden/covert information in the document 102 that is fake, forged, or otherwise inauthentic. In the latter case, secured physical documents 120 are counterfeit secured physical documents 120.

2*d*) Security Feature Authentication

In the case of secured physical document 120, decoding application 132 passes data relating to the hidden/covert security feature 122 that it detected, to a decision processor 134 of security service 130. In one example, decoding application 132 only passes the image data of the hidden/covert security feature 122 found in processed digital image 118 to decision processor 134, e.g. via filtering, cropping, or otherwise screening the image data to remove unnecessary information. In another example, decoding application 132 passes the image data of the entire processed digital image 118 (including the image data relating to hidden/covert security feature 122) to decision processor 134. However, in the case of unsecured physical documents 124, decoding application 132 may optionally pass information to decision processor 134 that information relating to a hidden/covert security feature 122 is absent from the processed digital image 118. In either case, in processing the information received from decoding application 132, decision processor 134 queries a database 140 of security service 130. In yet another embodiment, the decoding application 132 and decision processor 134 are combined into a single function or process, and/or the decoding application 132 communicates directly with database 140.

Stored in database 140 are, for example, security feature data 142, rules data 144, tracking data 146, and image data 148. Security feature data 142 includes a record of unique hidden/covert security features 122 that have been verified as authentic. Additionally, security feature data 142 includes a record of hidden/covert security features 122 that have been identified as counterfeit. Like parameters 115, the information in security feature data 142 may be subscriber-specific. Using decision processor 134, the image data associated with a hidden/covert security feature 122 detected by decoding application 132 is compared to information in security feature data 142 in order to uniquely identify the associated hidden/covert security feature 122. According to some embodiments, there are unique identifying marks, data, and the like in hidden/covert security features 122 so that the data from hidden/covert security features 122 can be properly associated with additional metadata upon lookup on the security service 130, as further discussed below and illustrated in FIG. 7.

2e) Authentication Feedback

Once the data relating to hidden/covert security feature 122 has been verified, decision processor 134 queries rules data 144 for information about actions to be taken. Like parameters 115, the information in rules data 144 may be subscriber-specific. In one example, rules data 144 may indicate to transmit a text message (e.g., via SMS) to the originating smart device 105. Using the example of a hidden/covert security feature 122 on a product package, wherein the hidden/covert security feature 122 indicates product information, examples of text messages include AUTHENTIC PRODUCT, NOT AUTHENTIC PRODUCT, FOR USE IN USA ONLY, or any other customized message as appropriate for a particular product package. Using the example of a hidden/covert security feature 122 on a paper document, wherein the hidden/covert security feature 122 indicates authenticity, examples of text messages include AUTHENTIC DOCUMENT, NOT AUTHENTIC DOCUMENT, and the like.

In another example, rules data 144 may indicate to engage a certain third-party service 150. For example, if a counterfeit hidden/covert security feature 122 is detected, security service 130 may electronically mark the associated image data to indicate the counterfeit and/or transmit a message to an administrator, a document author, a document controller, a product manufacturer or distributor, a law enforcement agency or other authoritative entity, and the like, which are examples of third-party services 150. In another example, if the hidden/covert security feature 122 is associated with a marketing promotion, security service 130 may transmit a message to a marketing agency or a product manufacturer or distributor, which are other examples of third-party services 150. In response, the marketing agency may transmit marketing information (e.g., a coupon, a promotion code, etc.) to the originating smart device 105. Third-party services 150 may communicate directly with the originating smart device 105 via network 160. Additionally or alternatively, third-party services 150 may pass all or certain communications with smart device 105 through security service 130.

III. Example Application: Consumer Feedback and Interaction

The smart device 105 may additionally or alternatively receive promotional materials associated with a product identified by the hidden/covert security feature 122. For instance, the security feature may include embedded/encoded data that can be extracted during analysis of the captured image by the security service 130, and the encoded data can then be used to identify particular promotional materials. The particular promotional materials and corresponding user-deliverable content can be identify according to processes performed by the security service 130 and/or other cloud-based services (e.g., network connected servers). The user-deliverable content may be determined on the basis of a lookup table or other correlation data for associating encoded data with user-deliverable content stored in one or more of the cloud-based services. For instance, the security serviced 130 may determine a code (e.g., serial number or the like) indicated by a pattern within the security feature 122. In some examples, information can be encoded by the relative position and/or shape of printed elements within the security feature 122. In some examples, information can be encoded using alphanumeric characters included within the security feature 122. Examples of security features including encoded information, and techniques for extracting identifying information (e.g., a serial number or the like) are provided below in connection with FIGS. 6-12, and the discussions thereof. Once any encoded information is extracted, the security service 130 may associate the information with a particular product, promotion, and/or other information to be delivered to the smart device 105 (e.g., according to a lookup table or the like in the database 140).

3a) Encoding Product-Specific Information

Moreover, product information and/or promotional materials may be provided to the smart device 105 through coordination between more than one servers (e.g., cloud services). For example, product-identifying information may be extracted by the security service 130, during analysis of the digital image captured by the smart device 105, then the product-identifying information can be sent to another server to be associated with a particular product and/or promotional material. For example, information may be extracted by the security service 130, and sent to a third-party service, which can then use the product-identifying information to identify a particular product, promotion, and/or other information to be delivered to the smart device 105 (e.g., according to a lookup table or the like). In some cases, such user-deliverable content may be sent to an email address, text message (SMS) or the like associated with the user 175, in which case the user-deliverable content may or may not be received at the smart device 105 (depending on the connectivity of the smart device). Moreover, such user-deliverable content, such as a printed offer certificate, coupon, loyalty rewards, etc., may be delivered via non-electronic means, such as via a mail delivery service (e.g., a postal service or the like).

Once encoded information is extracted from the image of the security feature 122 (captured by the camera 110), and the extracted information is associated with a particular product and/or promotion, corresponding data can be delivered to the smart device 105. For example, if the encoded information is associated with a particular product, information about the particular product (e.g., product description, images, instructions for use, warnings, and the like) can then be delivered to the smart device 105 for viewing by the user 175. The information can generally be delivered over any wireless communication protocol. Such information may be communicated directly with the capture application 114 and displayed via an interface of the capture application 114 and/or information may be sent to an email address or text message (SMS) address associated with the user 175 for viewing on the smart device 105. Moreover, such user-deliverable content, such as a printed offer certificate, coupon, loyalty rewards, etc., may be delivered via non-electronic means, such as via a mail delivery service (e.g., a postal service or the like).

In examples in which warnings are included in the information delivered to the smart device 105, the warnings may include, for example, disclosures related to allergies, side-effects, and so on, similar to disclosures regulated by the Food and Drug Administration for certain pharmaceuticals and medical devices. Thus, certain pharmaceutical/medical products may be packaged in product packaging that includes the hidden/security feature encoded with information for identifying, at least, the particular pharmaceutical/medical product and perhaps more detailed information, such as batch, source, etc. The user 175 can operate the smart device 105, using the capture application 114, to capture an image of the security feature. Data indicative of the captured image (e.g., the processed digital images 118) is sent to the security service 130, where the encoded information can be extracted. The extracted information is then associated with a particular warning to provide to the user 175 (e.g., a product warning, allergen statement, side-effect listing, etc. for the particular pharmaceutical/medical product indicated by the extracted information). The warning information is then delivered to the user 175 by wirelessly communicating information indicative of the particular warning to the smart device 105. For example, the warning information can be viewable on the smart device 105 through an interface of the capture application 114 and/or delivered by email or text message (SMS) to an address associated with the user 175.

Generally, delivery by email or text message may be allowed only for services operating on the smart device 105 that have received sufficient permissions/approval from the user 175 to access such content, and a user 175 may be given an option to opt out of any such deliveries, so as to safeguard privacy sensitivities of some users. Additionally or alternatively, email and/or text message delivery may be carried out via a proxy address (e.g., a forwarding address) provided by the security service 130 to allow communication with the user 175 by, for example, a product-specific cloud-based service (e.g., the third party service 150) without disclosing the email and/or phone number for the user 175. In some cases, clients (e.g., third party services 150) that are not previously specifically approved may be limited to communicating with the user 175 via a proxy account established by the security service 130 for such purpose.

3b) Negotiation of Product-Specific Promotion(s)

If the encoded information is associated with a particular marketing promotion, information about the marketing promotion (e.g., a reduced sale price, reward points, customer loyalty program benefits, and the like) can then be delivered to the smart device 105 for viewing by the user 175. Moreover, any marketing promotion information delivered to the smart device 105 can enable the user 175 to redeem any benefits of the specified promotions. In some examples, marketing promotions may be redeemable by the user substantially in real time, to allow the user 175 that scans the security feature 122 on product packaging in a retail store environment to take advantage of any available promotions before leaving the particular store. Thus, information about available marketing promotions may be displayed via the user interface of the smart device 105 to allow the user 175 to negotiate the benefits of the promotions during checkout, if applicable. The promotional information may therefore include a scannable barcode or otherwise recognizable image that can be rendered on the display on the smart device 105 (e.g., via an interface of the capture application 114 or another application) and then negotiated at checkout. Additionally or alternatively, information allowing redemption of the marketing promotion (e.g., scannable barcode images, etc.) may be delivered to an email address or text message (SMS) address associated with the user 175, which information can then be viewed via a suitable application on the smart device 105.

In other examples, the promotional information delivered to the smart device 105 can enable the user 175 to access a negotiable instrument, such as a coupon, gift certificate, promotional certificate, etc. Such negotiable instruments may be made available via an in-store kiosk, a customer service window, etc. Retrieving such negotiable instruments from a kiosk, window, etc., may require entering a code, or providing a scannable barcode, etc., to allow the kiosk to recognize the particular negotiable instrument to provide.

Moreover, the marketing/promotional information delivered to the smart device 105 may allow the smart device to retrieve the benefits by communicating secure information directly with a store payment system and/or kiosk (e.g., via a wireless communication between the smart device 105 and a checkout register, kiosk, etc.). In some cases, the smart device 105 may even be used itself to tender payment wirelessly (e.g., via near field communication protocols) in coordination with digital wallet systems, and as such, the marketing/promotional information (e.g., coupons, discounts, etc.) may be communicated simultaneously with payment information.

In addition to providing real time marketing/promotional information that can be used at point of sale for users scanning security features on product packaging of merchandise sitting on the shelf of retail environment, some marketing/promotional information can be delivered to be used at a later time. For instance, the marketing promotion information delivered to the smart device 105 can allow the user 175 to request delivery of a negotiable instrument, such as a coupon, gift certificate, promotional certificate, etc. The negotiable instrument may be delivered, for example, through a delivery service to a mailing address specified by the user 175. Further still, such a negotiable instrument may be automatically delivered to the user 175 according to predetermined delivery parameters (e.g., a mailing address) stored in the capture application 114 on the smart device 105 (or perhaps stored on a server associated with the capture application and accessible via the network 160 for such purpose). In some examples, marketing/promotional information may be delivered directly to be redeemable using the smart device 105 directly (e.g., images of scannable barcodes, data for near field communication payment systems, etc.), but the promotion is only activated at a future date. Such a promotion may be used to encourage a user's repeat visit to a particular retail environment, or include a promotional offer for a repeat purchase refill product (e.g., cosmetics, cleaning products, toner cartridge, safety razor blades, etc.) or another related product.

Generally, as described herein, the product information and/or marketing/promotion information delivered to the smart device 105 can be provided from one or more network-connected servers (e.g., cloud services) operating alone or in coordination. For example, the security service 130 and one or more other servers may operate to extract encoded information from the image captured by the smart device 105, associate the extracted information with a particular product and/or marketing promotion, and deliver suitable information back to the smart device 105. Thus, upon identifying suitable information to be delivered back to the smart device 105 (e.g., user-deliverable content), the security service 130 and/or another server may send the information to the smart device 105. In some cases, one or more servers may even operate in a coordinated manner without communicating directly with one another. For example, the information provided to the smart device 105 can include an address and access code to function as a pointer to allow the smart device 105 to access content on a third party server 150. The smart device 105 can then access such content automatically and seamlessly (e.g., via the capture application 114) to operate to display the content to the user 175.

3c) Consumer Information Harvest

Moreover, the smart device 105 can also send consumer information to one or more of the network-connected servers (e.g., cloud-based services). In some examples, consumer information can be sent automatically when sending the captured image to the security service 130 for authentication. Additionally or alternatively, the consumer information can be provided only upon specific authorization from the user, such as in exchange for access to particular user-deliverable content. The consumer information may include, for example, information about the location of the smart device 105 when capturing the image (e.g., identity of a retail establishment, city/state, etc.). The consumer information may include, for example, information about the user 175, such as contact information (e.g., email, phone, mailing address, etc.) and/or demographic information useful for marketing purposes (e.g., age, family size, income, shopping preferences, vacation frequency or another indicator of disposable income, etc.). In some examples, the consumer information may even include real time feedback about the consumer's feedback on a particular product associated with the captured image. In some examples, a certain amount of consumer information may be automatically provided to the security service or an associated cloud-based service (e.g., upon uploading a captured image), while additional information may be provided after receiving suitable permission from the user 175 (e.g., upon the user responding to a query).

Thus, in some embodiments, the user-deliverable content (e.g., product information, ticket, promotion information, product warning information, etc.) can be sent to the smart device 105 in exchange for consumer information useful for marketing purposes being sent to a marketing service (e.g., the third party service 150). The consumer information can then be aggregated and used for marketing research and/or used to facilitate targeted marketing campaigns directed to the particular users that provided feedback or those similarly situated according to one or more metrics used to characterize consumer behavior.

In some examples, the security service 130 and/or one or more other cloud-based services can communicate with the smart device 105 to gather information about the authenticity of the physical document 120 (based on the analysis of the security feature 122) and/or about consumer for marketing purposes. In some cases, the authenticating features of the security service 130 may be substantially opaque to the user 175 during operation of the capture application 114 on the smart device 105. That is, from the perspective of the user 175, the capture application 114 may operate by capturing an image of a specified region of product packaging including a security feature with encoded information. The smart device 105 can then communicate with one or more cloud-based services, such as the security service 130 and/or third-party services 150 to retrieve user-deliverable content, such as product information (e.g., reviews, instructions, product safety warnings, etc.) and/or product promotions (e.g., coupons, discounts, customer loyalty rewards, etc.), and provide such content to the smart device 105. At the same time, the security service 130 can analyze the captured images to determine whether the security feature 122 is authentic. Indications of authenticity can then be stored, along with information about the product being scanned and/or retail location of the scanned product by the security service for use in future investigations of product authenticity (e.g., for determining product diversions, counterfeits, and the like). In some cases, initial indications of non-authenticated goods may be used to prompt an investigator to investigate the particular product or the particular retail location.

Advertisements alerting consumers to the presence of consumer-interactive scannable content on particular product packaging may also be provided generally in an atmosphere adjacent to (or otherwise nearby) a retail venue, such as on posters, billboards, taxi advertisements, magazine stands, and the like. Such user alerts may be provided by, for example, email alerts delivered to the user 175 and/or via information displayed on the smart device 105 (e.g., via the capture application 114). Moreover, such alerts may be provided via advertisements for the retail environment (e.g. television, radio, or other broadcast media, newspaper, magazine, or other print media, and/or internet-delivered advertisements, and so on).

3d) Crowd-Source Authenticity Investigation

The capture application can therefore operate to crowd source information gathering for product authenticity investigation. That is, the security service 130 can optionally be configured to substantially rely on information gathered by captured images provided by individual consumers, such as the user 175, rather than relying on investigators that survey products in particular retail establishments for authenticity by capturing images of product packaging. In some cases, the security service 130 can direct relatively scarce resources for supplemental product-authenticity investigations to regions and/or product lines that are not well represented in the crowd-sourced data.

In some examples, a crowd-sourced product-authenticity investigation system may operate by offering user-negotiable marketing promotions (or other benefits) to be delivered to the smart device 105 in exchange for the user providing captured images of security features on product packaging. The user 175 may be alerted that particular promotions will be provided for a particular number of captured images from a particular location (e.g., city/state, retail store, etc.). Such user alerts may be used to, for example, advertise particular rewards (e.g., bounties) for capturing images of particular products that are not well represented in crowd-sourced data to thereby induce users to seek out the desired products and capture images from the requested store(s). In such an example, users may be informed that the captured images are used to authenticate the products and/or detect counterfeit goods. However, the users may not be informed of the outcome of particular authenticity determinations so as to avoid embarrassing or otherwise detrimental effects on particular retailers and/or marketing campaigns associated with particular products.

3e) Product Registration

The user 175 could also use the capture application 114 on the smart device 105 after purchasing a particular product to register a newly registered product for warranty and/or insurance/theft purposes. For example, after purchasing a particular product, the user 175 can capture an image of a security feature located on the product packaging, the smart device 105 can then communicate data indicative of the captured image to the security service 130. The security service 130 can then analyze the received image and extract encoded information indicated by the security feature. The extracted information can then be used to identify a particular product associated with the extracted information, and optionally a serial number or the like for the purchased product. The security service 130 and/or one or more other cloud-based services (e.g., the third party service 150) can then operate to register the user 175 according to user-provided information and/or according to pre-loaded information associated with the user 175 that is stored on the smart device 105 and accessible by the capture application 114 for such purpose.

3f) User-Sensitive Data

Furthermore, the printed security features described herein, and the image capture application 114 for capturing images of such security features, extracting encoded information, and retrieving user-deliverable content associated with the extracted information can be used in applications other than product packaging. Some embodiments of the present disclosure may find application in various settings in which it is desirable to provide indications of authenticity and/or to retrieve user-deliverable content based on encoded information. Some non-limiting examples may include: medical records, veterinary records, vehicle records, and so on. For instance, a printed security feature can be included on a printed original version of a patient's medical records. A captured image of such printed security feature can be sent to the security service 130 where the authenticity of the medical records can be determined and/or encoded information can be extracted from the captured image. The extracted information can be used to look up pertinent information corresponding to the patient and/or the patient's medical history, or some other user-deliverable content, and the user-deliverable content can then be delivered to the smart device 105 with or without an indication of the authenticity of the medical record. Similarly, security features printed on veterinary records can be used to verify authenticity of the record(s) and/or to retrieve user-deliverable content associated with the record(s). Similarly, a security feature printed on a vehicle title, registration, or even on a sticker affixed to a vehicle (such as in connection with a service record, a vehicle identification number, an emission test verification, etc.) can be used to verify authenticity of the record(s) and/or to retrieve user-deliver content associated with the record(s). In one example, the encoded information can be used to retrieve a vehicle history report of service records, collision reports, and the like compiled from public and/or private sources.

According to some embodiments, tracking data 146 of database 140 of security service 130 includes records of all processed digital images 118 that are received and processed via security service 130. In some embodiments, each record in tracking data 146 includes tracking information for a particular digital image transaction, such as, for example, user ID, device ID, network address, timestamp, etc. Additionally, for each record in tracking data 146, the image data of the processed digital image 118 itself and/or other data relating to the hidden/covert security feature 122 may be stored for auditing purposes in image data 148 of database 140.

According to some embodiments, configuration application 136, which is an optional component of security service 130, is an administrator tool that is used to pre-configure security feature data 142, rules data 144, tracking data 146, and image data 148. In addition to information as previously described, rules data 144 may also include user-level or group-level permissions with respect to access to security service 130 of system 100 and/or with respect to access to secured physical document 120.

Document security system 100 provides the capability to maintain a single, centralized repository of data relating to hidden/covert security features 122 against which digital images of secured physical documents 120 and unsecured physical documents 124 can be compared, regardless of origin. According to some embodiments, when certain hidden/covert security features 122 are changed or new hidden/covert security features 122 are created, the database 140 is updated thereby affecting how secured physical documents 120 are serviced in the future.

IV. Example Operations

According to some embodiments, an example of the operation of system 100 is as follows. The user 175 uses his/her smart device 105 to capture a digital image of the secured physical document 120 that he/she wishes to authenticate. For example, the user 175 points the camera 110 of his/her smart device 105 at the secured physical document 120 and initiates the authentication process. In so doing, security-specific autofocus function 116 of the capture application 114 queries parameters 115 and then performs the autofocus function. Once the camera 110 is focused on the hidden/covert security feature 122, to begin the decoding process, a raw digital image 112 is captured. The capture application 114 performs preprocessing operations on the raw digital image 112 and generates a processed digital image 118. The processed digital image 118 of the document to be authenticated is transmitted via network 160 to security service 130 for decoding and/or verification. According to some embodiments, decoding application 132 of security service 130 uses image processing algorithms for analyzing the processed digital image 118 in order to detect data relating to hidden/covert security features 122 embedded therein. Then, decision processor 134 and information stored on database 140 are used to verify the hidden/covert security feature 122 and determine its authenticity. Security service 130 then returns the authentication results to the originating smart device 105. Once the authentication results are received at the originating smart device 105, notifications may optionally be provided such as, for example, audible, visual, or tactile indicators indicating whether the target secured physical document 120 is authentic or not authentic. For example, audible beeps at the originating smart device 105 can be used to indicate authenticity—one beep=authentic, two beeps=not authentic. As another example, a text message can be used to report the authenticity information. According to some embodiments, additional information relating to the hidden/covert security feature 122, including but not limited to image information associated with the security feature (e.g. a barcode such as a UPC, GS1, Data Matrix, QR, PDF417, Aztec, or other barcodes), location information, the image itself enhanced to show the hidden security information, and/or other related information is displayed on the smart device 105.

According to another embodiment, the system 100 can operate to display a preview of a security image on a smart device 105 as follows. The user 175 uses his/her smart device 105 to capture a digital image of the secured physical document 120 that he/she wishes to authenticate. For example, the user 175 points the camera 110 of his/her smart device 105 at the secured physical document 120 and initiates the authentication process. In so doing, security-specific autofocus function 116 of the capture application 114 queries parameters 115 and then performs the autofocus and filtering functions. In some embodiments, the autofocus function 116 is aided by a preferred focus target within the hidden/covert security feature 122, such as the examples shown in FIGS. 6, 7A-D, 9A-D, and 10A-G discussed below. Once the data related to hidden/covert security feature 122 is revealed with enough clarity or detail that the feature can be decoded using image processing software, a preview image 113 of the target secured physical document 120 is displayed to the user 175 on his/her smart device 105. The capture application 114 performs preprocessing operations, e.g., smoothing, on the preview image 113 and generates a processed digital image 118. The processed digital image 118 of the secured physical document 120 to be authenticated is transmitted via network 160 to security service 130 for decoding. Namely, decoding application 132 of security service 130 uses image processing algorithms for analyzing the processed digital image 118 in order to detect hidden/covert security feature 122 embedded therein. Then, an enhanced image that is generated by the decoding application 132 is returned to the originating smart device 105 and displayed to the user 175 in preview mode. The user 175 can then visually verify the presence of the expected hidden/covert security feature 122 on the target secured physical document 120 and determine authenticity.

Figure 2:
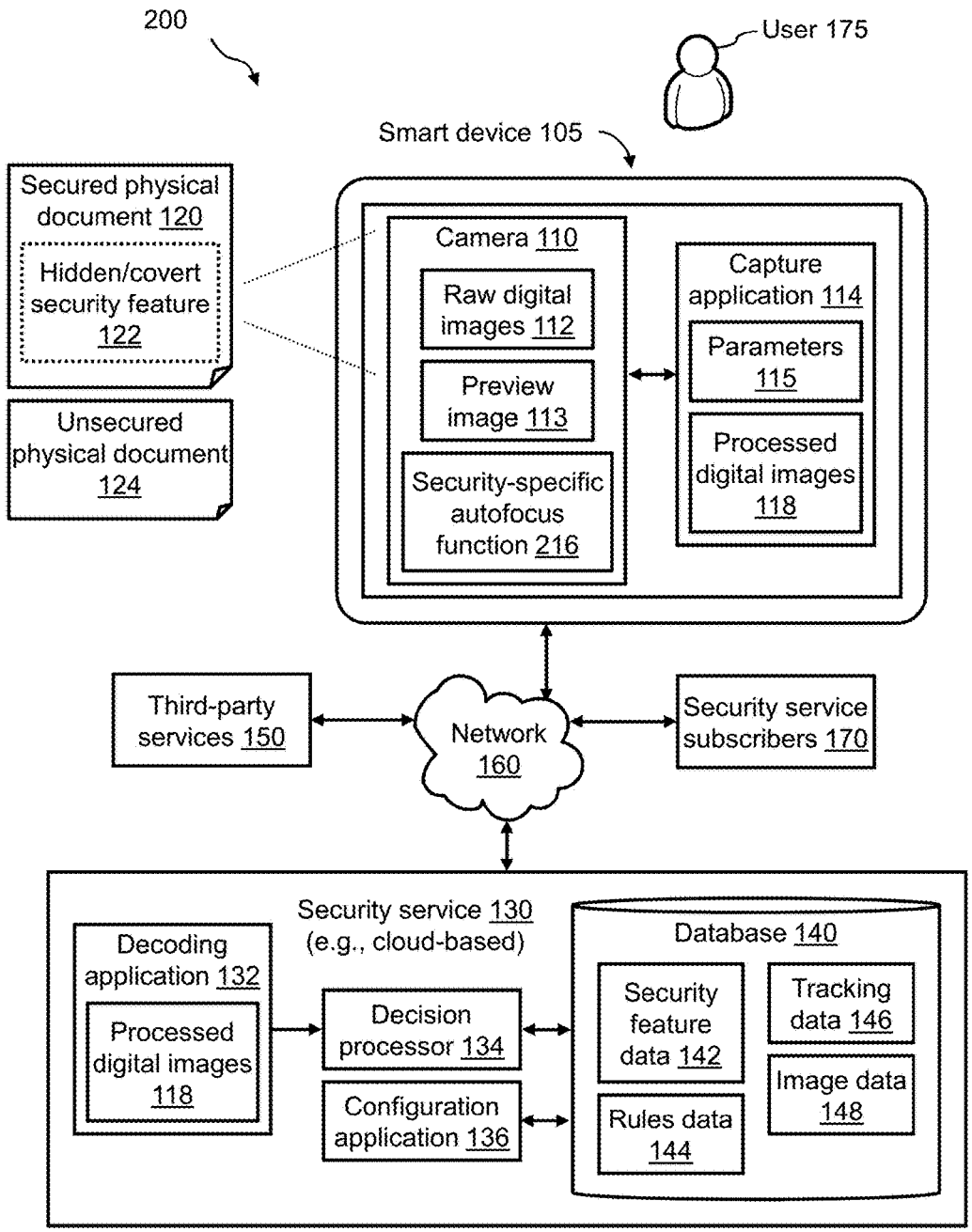
FIG. 2 illustrates a system for providing security feature detection and authentication services using a smart device communicatively coupled to a network based security service, according to another embodiment of the present disclosure.

FIG. 2 illustrates a block diagram of an example of a document security system according to another system configuration. In system 200, the smart device 105 is configured such that the security-specific autofocus function 216 is implemented in camera 110 of the smart device 105 instead of in capture application 114. In some embodiments, this configuration is accomplished by adding the security-specific autofocus function 216 to the hardware, firmware and/or software of the smart device 105, which may allow for more efficient and/or faster processing of security information during the authentication process.

Figure 3:
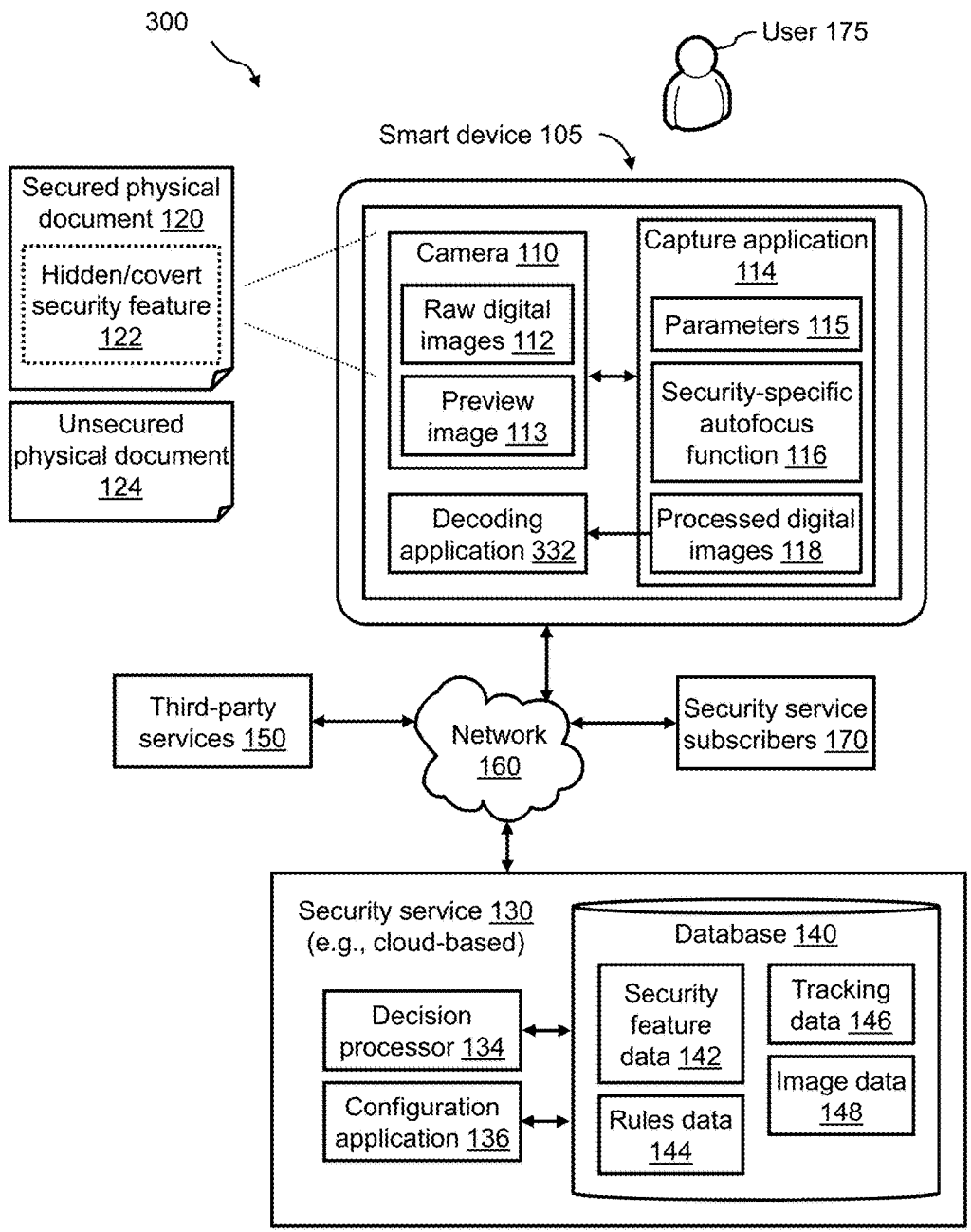
FIG. 3 illustrates a system for providing security feature detection and authentication services using a smart device communicatively coupled to a network based security service, according to yet another embodiment of the present disclosure.

FIG. 3 illustrates a block diagram of an example of a document security system according to yet another system configuration. Namely, whereas the decoding function in document security system 100 of FIG. 1 is implemented on the server 130, FIG. 3 illustrates a system configuration in which the decoding function 332 is implemented locally on the smart device 105. For example, system 300 of FIG. 3 is substantially the same as document security system 100 of FIG. 1, except that an instance of decoding application 332 is installed on each smart device 105, rather than having a single instance of decoding application 132 installed at security service 130 that supports all smart devices 105.

The system is not limited to the system configurations shown in FIGS. 1, 2, and 3. Other system configurations are possible. For example, instead of security service 130 being implemented on a global cloud-based server, security service 130 can be implemented on a local server of an enterprise, wherein the local server supports smart devices 105 and users 175 that are associated with the enterprise. In this example, the document security system is provided as an enterprise-based system configuration. In other embodiments, some or all of the functions of the security service 130 are instead performed on the smart device 105, e.g. the decoding application 132, decision processor 134, database 140 (including security feature data 142, rules data 144, tracking data 146, and/or image data 148), and/or configuration application 136 are provided directly on the smart device 105, such as, for example, the embodiment shown in FIG. 5 and discussed further below.

The disclosure described herein is not limited to documents containing hidden/covert security features, instead, the concepts of this disclosure may be applied to any media capable of including hidden/covert security feature 122, including but not limited to documents and/or images displayed electronically (e.g. on a video monitor, smart device, television, etc.), tattoos or similar markings, artwork, labels, packaging, and any other media capable of incorporating hidden/covert security feature 122 as discussed herein.

Figure 4B:
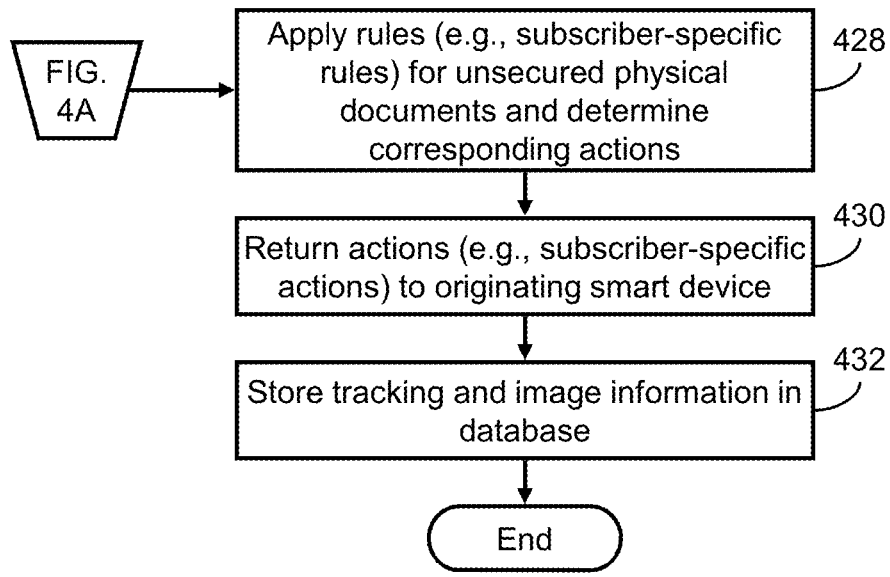
Figure 4C:
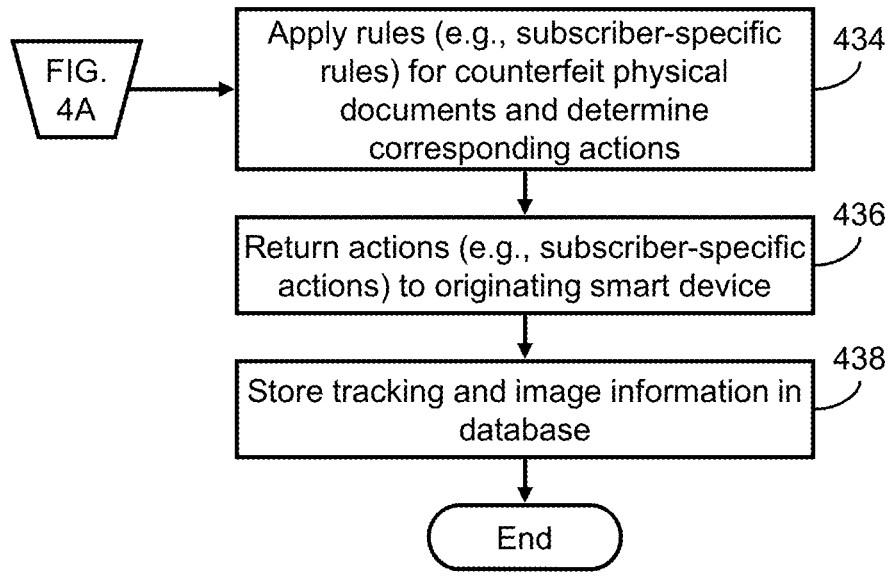

FIGS. 4A, 4B, and 4C illustrate a flow diagram of a method 400, which is an example of a method for performing the detection and authentication of hidden security features. In the example of method 400, hidden/covert security feature 122 of secured physical document 120 is used to indicate the authenticity of the physical document. Method 400 may include, but is not limited to, the following acts.

At 410, using the security-specific autofocus function 116, a digital image of a physical document, or portion thereof, is captured using a mobile device camera. For example, the user 175 points the camera 110 of his/her smart device 105 at secured physical document 120 containing hidden/covert security feature 122 and initiates the authentication process. In so doing, security-specific autofocus function 116 of the capture application 114 queries parameters 115 and then uses the information in parameters 115 as part of the focusing and filtering process used to reveal an image of hidden/covert security feature 122 during the autofocus function. According to some embodiments, the capture application 114 applies filtering at the same time as focusing to simultaneously adjust focal length and attempt to recognize hidden patterns and text in preview image 113 corresponding to hidden/covert security feature 122. The focusing and filtering operations may take place many times per second until the capture application 114 recognizes a pattern corresponding to hidden/covert security feature 122. In some embodiments, the capture application 114 has a set time period to recognize hidden patterns and/or text, and upon timeout determines the hidden/covert security feature 122 to be invalid or not present, and optionally captures an image for investigation purposes and/or storage in the database 140 under the assumption that the image may be an image of a counterfeit mark. Once a hidden/covert security feature 122 is sufficiently focused to begin the decoding process, as determined by the capture application 114, a raw digital image 112 is captured. According to some embodiments such as those shown in FIGS. 7A-D and FIGS. 9A-D, a barcode or other image may optionally be positioned adjacent to the hidden/covert security feature 122. According to some embodiments, if a barcode is present that information is also captured in raw digital image 112. Optionally, in embodiments storing location information, the capture application 114 will also store applicable Global Positioning System (GPS) information associated with location of the smart device 105 at the time an image is captured.

At 412, image data associated with the captured image is preprocessed and then the preprocessed image is passed to the decoding application 132. For example, capture application 114 preprocesses the image data of the raw digital image 112, thereby producing a processed digital image 118. In some embodiments, based on the subscriber-specific information in parameters 115, capture application 114 applies certain optical filtering, angles, line frequency, color, density, and/or micro-printing to raw digital images 112 and generates the corresponding processed digital image 118 in which a portion of, for example, the background image, opposite angle image, dot size, or dot shape has been filtered out, thereby revealing, for example, the lines, dots, dashes, whitespaces, or microprint of the foreground image (i.e., the hidden security feature) to at least some degree. Additionally or alternatively, capture application 114 can segment a portion of raw digital images 112 according to predetermined locations at which security features would be expected to appear, using standard image segmentation algorithms according to known references and/or software.

Algorithms for performing image processing can be found in many engineering textbooks relating to image processing, such as "Digital Image Processing" by Rafael C. Gonzalez & Richard E. Woods ($3^{rd}$ edition 2008) which is incorporated herein by reference in its entirety. In some embodiments, open source software libraries may be used for image detection. According to some embodiments, GPUImage software (see http://www.sunsetlakesoftware.com/2012/02/12/introducing-gpuimage-framework) can be used for image processing capabilities including live video stream filtering, to view the target image and adjust for pattern detection. This software may be used to apply a convolution matrix to detect horizontal or vertical lines, adjust exposure based on image brightness, adjust contrast to increase edge sharpness within the image, adjust to median settings to remove stray pixels, filter out noise based on a threshold, and perform other functionality applicable to the present disclosure. Additionally or alternatively, in some embodiments, Zebra Crossing software (see http://code.google.com/p/zxing/) can be used for image processing of barcodes in addition to other functionality applicable to the present disclosure. Additionally or alternatively, in some embodiments, OpenCV software (see http://opencv.willowgarage.com/wiki/) can be used for image processing capabilities such as enhanced edge detection and shape recognition, including Hough Circle Transform, to provide enhanced circle detection within a raw digital image 112.

After pre-processing, the processed digital image 118 is transmitted via network 160 to decoding application 132 at security service 130. Alternatively, in document security system 100 of FIG. 3, the processed digital image 118 is passed to decoding application 332 of smart device 105, or according to some embodiments such as FIG. 5, to local security service 530.

At 414, an image analysis operation is performed of the processed digital image 118 and then the resulting decoded image is passed to the decision processor 134. In some embodiments, using subscriber-specific information in parameters 115, decoding application 132 performs additional image processing to further enhance processed digital images 118 in order to reveal the image of hidden/covert security feature 122 to a greater degree than in the original processed digital images 118. Image data and/or other information relating to the hidden/covert security feature 122 is then passed from decoding application 132 to decision processor 134.

At 416, it is determined whether the information received from decoding application 132 is associated with a hidden/covert security feature 122. If the decoded information sufficiently matches a stored image and/or other data associated with a security feature 122, the document is determined to be a secured physical document 120. Otherwise, the document is determined to be an unsecured physical document 124. For example, if decision processor 134 determines that a hidden/covert security feature 122 is detected, method 400 proceeds to 418. However, if decision processor 134 determines that no hidden/covert security feature 122 is detected, method 400 proceeds to 428 (shown in FIG. 4B).

At 418, the image of the security feature in the decoded image is identified. For example, using decision processor 134, any image data related to hidden/covert security feature 122 detected by decoding application 132 and/or decision processor 134 is compared to information in security feature data 142 in order to identify the hidden/covert security feature 122.

In some cases, the decoded image of the security feature may be processed by an optical character recognition (OCR) module to identify and/or characterize recognizable characters in the decoded image. An example of an OCR engine that may be used is the Tesseract OCR engine, although other OCR engines may be used. For example, the decision processor 134 and/or decoding application 132 may include an OCR module that identifies characters in the decoded image, and then characterizes the security feature 122 on the basis of the identified characters. In some cases, the security feature 122 may include a substantially unique set of characters, and may be associated with a serial number, for example. Examples of patterns (arrays) of characters that may be included in an image are included, by way of example, in FIGS. 12A-12G.

At 420, it is determined whether the secured physical document 120 is authentic. For example, if the data relating to hidden/covert security feature 122 matches a verified hidden/covert security feature in security feature data 142, method 400 proceeds to 422. However, if no match is found in security feature data 142 to the data relating to hidden/covert security feature 122, method 400 proceeds to 434 (shown in FIG. 4C). In some cases, the authenticity of the of the physical document 120 may be determined, at least in part, on the basis of a code (e.g., a serial number) associated with a set of characters included in the image, which characters may be recognized through use of an OCR engine.

At 422, rules are applied for the authenticated security feature and certain actions are determined. For example, decision processor 134 queries rules data 144 of database 140 for rules that apply to the authentic hidden/covert security feature 122 and determines what actions, if any, are to be performed (e.g., transmit a text message to originating smart device 105). Further, the rules that are applied may be subscriber-specific because rules data 144 may include subscriber-specific information.

At 424, actions/instructions are returned to the originating mobile device. The actions/instructions that are returned may be subscriber-specific because rules data 144 may include subscriber-specific information. In one example, security service 130 transmits a text message (e.g., via SMS) to the originating smart device 105, wherein the text message is AUTHENTIC PRODUCT, AUTHENTIC DOCUMENT, VALID-EXPIRED MARK, VALID MARK: INVALID-LOCATION, or similar message based on rules data 144. In another embodiment, security service 130 transmits data directing the smart device to display the enhanced image showing the hidden data in the hidden/covert security feature 122. Additionally or alternatively, this information is combined with information decoded from a barcode or similar image associated with the hidden/covert security feature 122 and/or location information.

At 426, tracking and image information is stored in the database 140. In some embodiments, each record in tracking data 146 includes tracking information for a particular digital image transaction, such as, for example, user ID, device ID, network address, timestamp, etc. Additionally or alternatively, for each record that is created, the image data of the processed digital image 118 and/or the image data of the identified hidden/covert security feature 122 are stored in image data 148 of database 140. Method 400 ends.

At 428 (FIG. 4B), rules are applied for unsecured physical documents and certain actions are determined. For example, decision processor 134 queries rules data 144 of database 140 for rules that apply to unsecured physical documents 124 and determines what actions, if any, are to be performed (e.g., transmit a text message to originating smart device 105). Further, the rules that are applied may be subscriber-specific because rules data 144 may include subscriber-specific information.

At 430, actions/instructions are returned to the originating mobile device. The actions/instructions that are returned may be subscriber-specific because rules data 144 may include subscriber-specific information. In one example, security service 130 transmits a text message (e.g., via SMS) to the originating smart device 105, wherein the text message is UNSECURED DOCUMENT. In another example, the absence of a hidden/covert security feature 122 may indicate a fraudulent or counterfeit product, such as when the product packaging is required to have a security feature to verify authenticity. Therefore, a text message (e.g., via SMS) is transmitted to the originating smart device 105, wherein the text message is COUNTERFEIT PRODUCT. Further, security service 130 optionally transmits a message to a law enforcement agency or other authoritative entity, which are third-party services 150.

At 432, tracking and image information is stored in the database. For example, a record is created in tracking data 146 that includes, for example, user ID, device ID, network address, and timestamp. Additionally, for the record that is created, the image data of the processed digital image 118 is stored in image data 148 of database 140. Method 400 ends.

At 434 (FIG. 4C), rules are applied for counterfeit physical documents and certain actions are determined. For example, decision processor 134 queries rules data 144 of database 140 for rules that apply to the counterfeit secured physical document 120 and determines what actions, if any, are to be performed (e.g., transmit certain text message to originating smart device 105 and transmit message to law enforcement). Further, the rules that are applied may be subscriber-specific because rules data 144 may include subscriber-specific information.

At 436, actions/instructions are returned to the originating mobile device. The actions/instructions that are returned may be subscriber-specific because rules data 144 may include subscriber-specific information. In one example, security service 130 transmits a text message (e.g., via SMS) to the originating smart device 105, wherein the text messages is COUNTERFEIT DOCUMENT. Further, security service 130 optionally transmits a message to a law enforcement agency or other authoritative entity, which are third third-party services 150.

At 438, tracking and image information is stored in the database 140. For example, a record is created in tracking data 146 that includes, for example, user ID, device ID, device location, and timestamp. Additionally, for the record that is created, the image data of the processed digital image 118 and/or the identified hidden/covert security feature 122 are stored in image data 148 of database 140. Method 400 ends.

V. Additional Example System Configurations

Figure 5:
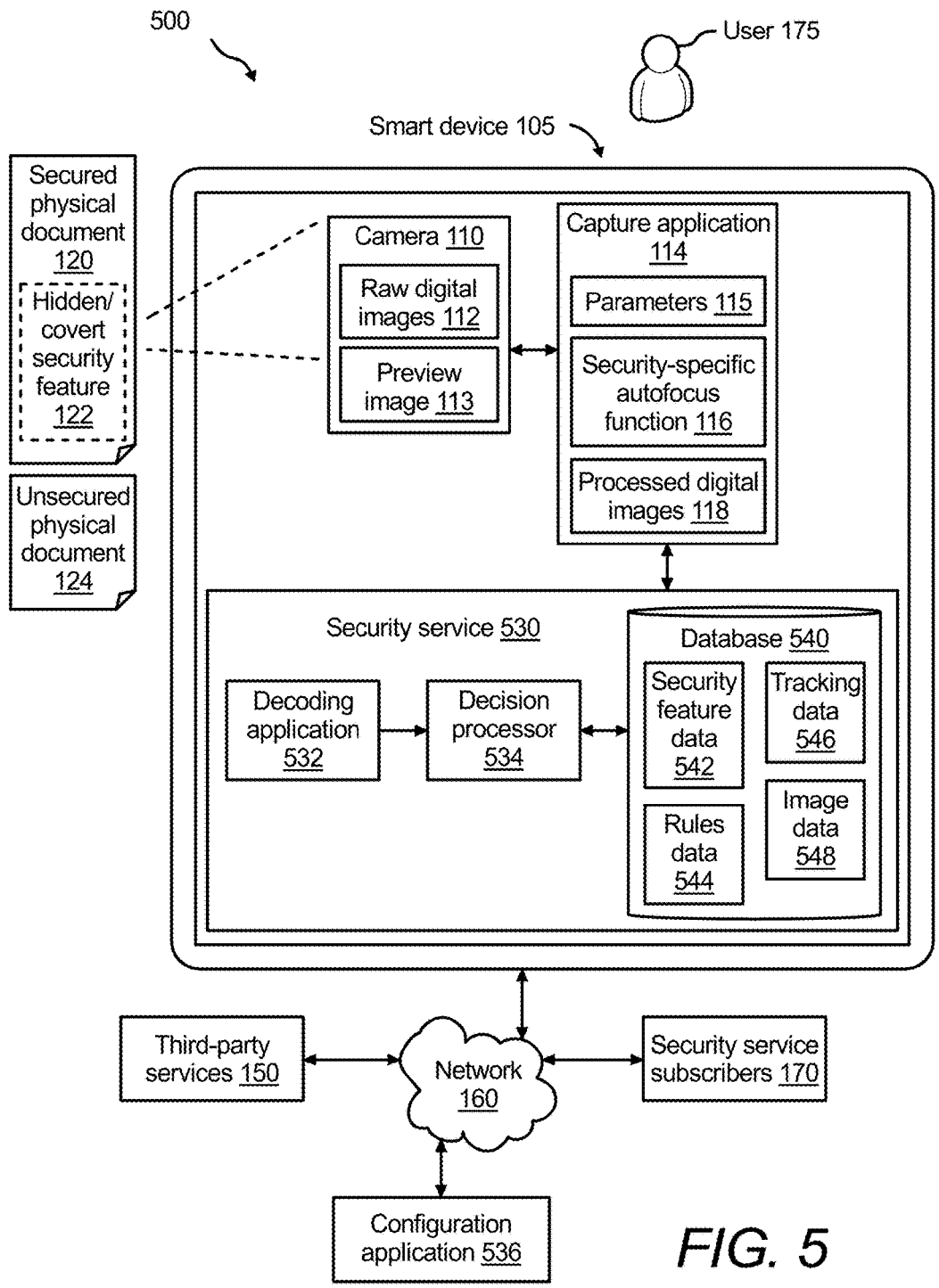
FIG. 5 illustrates a system for providing security feature detection and authentication using a smart device, where the database with security feature data and related information is provided on the smart device, according to an embodiment of the present disclosure.

Turning to FIG. 5, a system configuration is illustrated wherein information in the database 540 is stored directly on the smart device 105, according to an alternative embodiment of the present disclosure. Similar to system configurations previously discussed, system 500 comprises a smart device 105 which has camera 110 and capture application 114 which allow for capture and preprocessing of an image potentially containing data relating to a hidden/covert security feature 122 substantially as discussed above. But, according to an embodiment of system 500, instead of sending processed digital images 118 over a network 160 to a cloud-based security service 130, a security service 530 is provided locally on the smart device 105. Thus, the capture application 114 is communicatively coupled with the security service 530, and data relating to the processed digital images 118, along with other data potentially required by security service 530 (such as, for example, parameter data 115) is communicated to the security service 530.

In some embodiments, security service 530 comprises a decoding application 532, decision processor 534, and database 540. Database 540 comprises security feature data 542, rules data 544, tracking data 546, and image data 548. According to some embodiments, security service 530 is communicatively coupled, via network 160, to configuration application 536, third-party services 150, and/or security service subscribers 170.

The functionality of security service 530 is similar to the security service 130 described in relation to system 100, with the exception that the security service 530 is provided directly on smart device 105. For example, according to some embodiments, if an acceptable original raw digital image 112 is obtained from of a secured physical document 120, decoding application 532 detects information related to a hidden/covert security feature 122 embedded therein according to parameters 115 and/or processed digital images 118. Accordingly, decoding application 532 passes data relating to the detected hidden/covert security feature 122 to a decision processor 534 of security service 530. In order to evaluate the data from decoding application 532, decision processor 534 queries a database 540 of security service 530. Stored in database 540 are, for example, security feature data 542, rules data 544, tracking data 546, and image data 548.

According to some embodiments, security feature data 542 includes a record of unique hidden/covert security features 122 that have been verified as authentic. Additionally, security feature data 542 may include a record of hidden/covert security features 122 that have been identified as counterfeit. Like parameters 115, the information in security feature data 142 may be subscriber-specific. Using decision processor 534, the image data associated with a hidden/covert security feature 122 detected by decoding application 532 is compared to information in security feature data 542 in order to uniquely identify and/or verify the associated hidden/covert security feature 122. According to some embodiments, there are unique identifying marks, data, and the like in hidden/covert security features 122 so that the data from hidden/covert security features 122 can be properly associated with additional metadata upon lookup on the security service 530.

Once the data relating to hidden/covert security feature 122 has been verified, decision processor 534 queries rules data 544 for information about actions to be taken. The information in rules data 544 may be subscriber-specific. In one example, rules data 544 may indicate a message to be displayed on the smart device 105. According to some embodiments, rules data 544 may indicate that selected image data from secured physical document 120 be displayed on the smart device 105, such as, for example, the enhanced image data allowing the image associated with hidden/covert security feature 122 to be easily viewed with the unaided eye. According to some embodiments, rules data 544 may indicate to provide messages as to the authenticity of the document 120 or 124, and/or engage network based third-party services 150 as described in regards to FIG. 1, above.

According to some embodiments, tracking data 546 of database 540 of security service 530 includes records of all processed digital images 118 that are received and processed by smart device 105 via security service 130. In some embodiments, each record in tracking data 546 includes tracking information for a particular digital image transaction, such as, for example, user ID, device ID, network address, timestamp, etc. Additionally, for each record in tracking data 546, the image data of the processed digital image 118 itself and/or other data relating to the hidden/covert security feature 122 may be stored for auditing purposes in image data 548 of database 540.

According to some embodiments, configuration application 536, which is an optional component of security service 530, is an administrator tool that is used to configure and/or adjust information in database 540 relating to security feature data 542, rules data 544, tracking data 546, and image data 548. According to some embodiments, configuration application 536 communicates with database 540 via network 160, allowing for a centralized control and/or administration of data in database 540. In some embodiments, configuration application 536 includes data relating to pattern recognition, void marks, expired marks, and/or other administrative information. For example, when information is available regarding a counterfeit hidden/covert security feature 122, the configuration application 536 may communicate with database 540 to provide image data and processing rules related to the counterfeit security feature.

Document security system 500 provides the capability to maintain a security service 530 directly on the smart device 105, which is desirable for applications requiring, for example, enhanced security. According to some embodiments, the image data and/or parameters relating to hidden/covert security feature 122 are not sent over a network and therefore are less susceptible to unintended or fraudulent access, e.g. hacking Thus, system 500 provides a document analysis and authentication solution for environments where a network is not immediately available and/or it is undesirable to communicate certain data over a network, such as for systems used by customs personnel that are required to meet specific security protocols.

In some embodiments, the security service 530 on smart device 105 is not directly accessible to a user 175 of smart device 105 and/or is only configurable via configuration application 536. According to some embodiments, security service subscribers 170 and/or third-party services 150 are configured to push updated information to database 540 via network 160. In some embodiments, when certain hidden/covert security features 122 are changed or new hidden/covert security features 122 are created, the database 540 is updated thereby affecting how secured physical documents 120 are serviced by smart device 105 in the future. According to some embodiments, individual or aggregate data collected by database 540 is periodically communicated to third-party services 150, security service subscriber 170 and/or configuration application 536.

VI. Example Security Pattern

Figure 6:
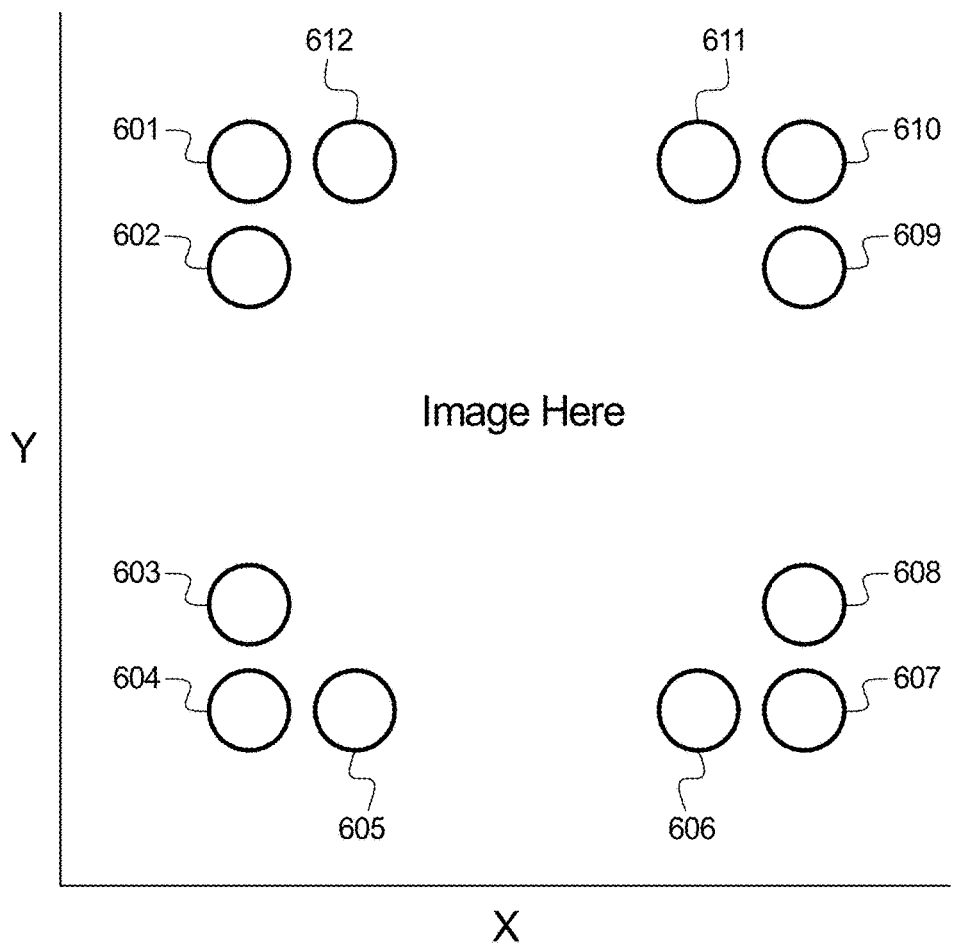
FIG. 6 illustrates an example embodiment of a hidden focus pattern that may be used with the system, showing relative positioning of elements within the example pattern, according to an embodiment of the present disclosure.

In FIG. 6, an example pattern (a "four-corner triangle" pattern) is disclosed, showing the relative spacing used for the elements 601-612 of the pattern. The pattern of FIG. 6 is an example embodiment of a pattern used during the focus process and optionally to convey additional information via data lookups in the database (140 or 540) and/or via the network 160. The pattern embedded in the hidden security feature comprises a pre-determined, variable pattern of shapes (in FIG. 6, circles 601-612 are shown as an example, but other shapes may be used). The pattern may be generated using mathematical processes, such as vector algebra or pattern calculus. In some embodiments, information relating to the structure of the pattern such as shown in FIG. 6 can be stored in parameters 115, and that information is used when analyzing the pattern to determine authenticity. According to some embodiments, when analyzing an image containing a pattern such as shown in FIG. 6, the application operating on the smart device 105—e.g. capture application 114—recognizes the mathematically generated pattern by reversing the formula(s) used to generate the pattern. The pattern recognition capabilities of the capture application 114 can then be used to establish the focal length, authenticate the pattern, and/or perform lookups based on the data in a local or network database.

In FIG. 6, an X and Y axis are illustrated to illustrate the positioning of elements 601-612 according to commonly used graphical nomenclature. According to the embodiment of FIG. 6, the elements 601-612 are arranged according to the relative positioning and spacing described below and illustrated in FIG. 6 to create the four-corner triangle pattern. Elements 601-612 are depicted as circles in the illustrated embodiment, although as discussed below (e.g. FIG. 10A-10G) many other shapes and configurations are permissible.

In FIG. 6, each element has the following relative horizontal positioning:

Element 601, 602, 603 and 604 have the same positioning on the X-axis Element 605 and 612 have the same positioning on the X-axis Element 606 and 611 have the same positioning on the X-axis Element 607, 608, 609, and 610 have the same positioning on the X-axis In FIG. 6, each element has the following relative vertical positioning:

Element 601, 612, 611, and 610 have the same positioning on the Y-axis Element 602 and 609 have the same positioning on the Y-axis Element 603 and 608 have the same positioning on the Y-axis Element 604, 605, 606, and 607 have the same positioning on the Y-axis Additionally, the relative spacing between elements of each corner of the pattern is uniform. For example, the spacing between element 601 and 612 is approximately the same as the spacing between elements 601 and 602. In some embodiments, the spacing between the elements in a corner grouping is approximately 40 pixels. Furthermore, the relative spacing between corner groups is uniform, for example, the distance from element 601 to 610 is approximately the same as the distance from element 604 to 607, from 601 to 604, or from 610 to 607. According to some embodiments, additional textual and/or data can be added inside the four corners of the pattern. According to some embodiments, the thickness of the line denoting the circle in elements 601-612 is at least approximately $\frac{1}{8}^{th}$ inch thick.

According to some embodiments, the pattern of FIG. 6 or similar pattern is concealed within the hidden/covert security feature 122, using previously described security features such as Prism™, Veriglow™, and/or other security features. The pattern may be positioned such that it is adjacent to, surrounding or otherwise in close proximity to additional image and/or text information. In some embodiments, the additional image information is a one dimensional barcode (UPC), two dimensional barcode (for example, QR, data matrix, PDF417, or Aztec), or other image information. Examples of the combination of a barcode with a pattern and additional hidden text are illustrated in FIG. 9A-9D.

In some embodiments, the pattern is screened to match the hidden/covert security feature 122. According to some embodiments, the hidden/covert security feature 122 contains the phrase "VALID" or similar language to indicate the authenticity of a barcode or other image adjacent to the hidden/covert security feature 122. In some embodiments, red dots over black pantograph is used as the hidden/covert security feature 122 to conceal the "VALID" text, or similar language, as the red dots camouflage the black pantograph. Accordingly, once the text is revealed according to the authentication process, the smart device may report the authentication of the barcode, along with inventory information or other information contained via reading the barcode.

VII. Example Security Pattern Serialization

Turning to FIGS. 7A-7D, several example configurations containing target patterns, barcodes and additional text (shown as "TEXT HERE" to be replaced by the desired text for a particular document and/or product, such as brand information associated with particular product or additional security information) are shown on the left of each FIG. 7A-7D, alongside data reported for that configuration on the right side of the arrow in each of FIG. 7A-7D. In some embodiments, some or all of the data reported is obtained from a database lookup based on information contained in the pattern and/or associated text information and image. As an example, a customer may choose to use a certain configuration for all deliveries to the United States (such as the configuration shown on the left side of FIG. 7A), and another type of configuration for all deliveries to Mexico (such as the configuration shown on the left side of FIG. 7B). Thus, the pattern recognition capability in combination with the database lookup will confirm the destination country based on the configuration information. Similarly, city, state, date, and other tracking information can be associated with and accessed via the pattern and/or text embedded in the hidden/covert security feature 122. This tracking information can be combined with information based on barcoded information, such as a QR code, data matrix, PDF417, Aztec, UPC code, or other indicia, to allow for an additional level of verification, for example, by duplicating certain barcode information in the pattern and checking for data consistency.

Figure 7A:
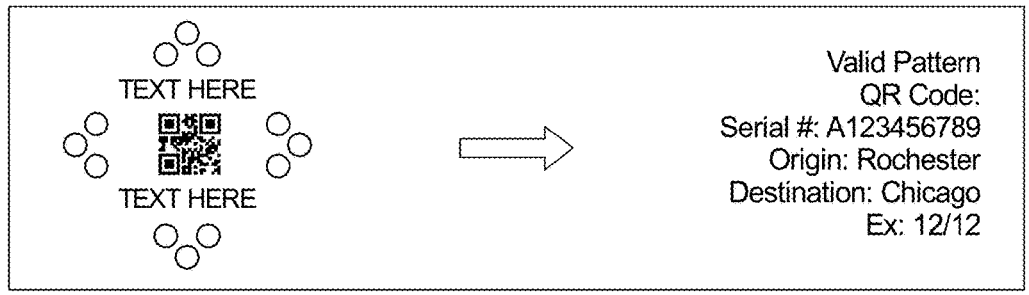
FIG. 7A illustrates an example image and the results displayed upon analysis of the image, according to an embodiment of the present disclosure.

In FIG. 7A, the configuration shown on the left side of the figure includes a target pattern, textual information, and a two dimensional bar code. According to some embodiments, when the data related to configuration shown in FIG. 7A is processed—e.g. by capture application 114 and/or decoding application 132—the application recognizes a mathematically generated pattern used to prepare the pattern by reversing the formula(s) used to generate the pattern. In some embodiments, the mathematical information used to generate the pattern corresponds to a unique index, and that unique index is used to perform a lookup for corresponding data in database 140. Thus, database 140 can provide any desired information about the particular document such as its origin, destination, expiration date, etc. In FIG. 7A, the database lookup has provided the origin information (Rochester), destination information (Chicago), and expiration date (December 2012). In FIG. 7A, this information is combined with the information provided by the barcode (identified as a QR code with a serial number as shown) and validity information based on information provided by decision processor 134, to provide a complete set of status and authentication information to user 175. Note that, in some embodiments, information from the database lookup can be analyzed in combination with information from other sources, such as GPS information, data from bar code information, textual data embedded in the hidden/covert security feature 122, and other information in order to check for consistency and to provide multi-level verification capability. Example arrangements of characters/symbols that are associated with customizable identifiers (e.g., serial numbers) according to a decoder pattern are described further herein in connection with FIGS. 11A-11D below. Moreover, example arrangements of characters/symbols that may be included in a security feature are described further in connection with FIGS. 12A-12G. For example, an arrangement of characters/symbols in the security feature may be recognized via an OCR module, and the recognized arrangement of characters can then be associated with a substantially unique identifier such as a serial number. The association between the pattern of characters/symbols and the serial number may be based on the particular recognized characters and/or the relative locations of the characters, and may be completed in accordance with a lookup table, for example.

Figure 7B:
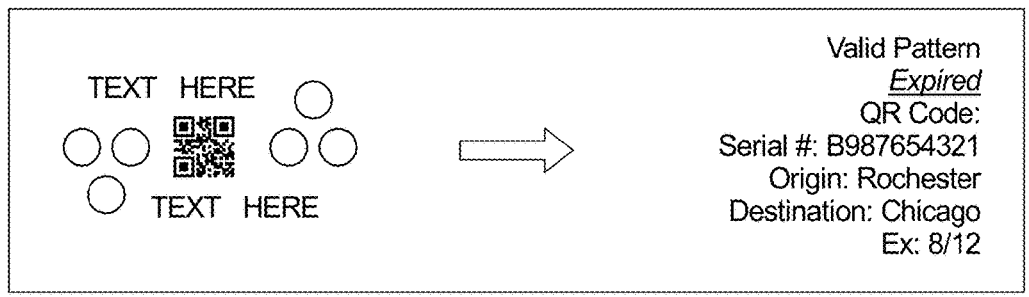
FIG. 7B illustrates another example image and the results displayed upon analysis of the image, according to an embodiment of the present disclosure.
Figure 7C:
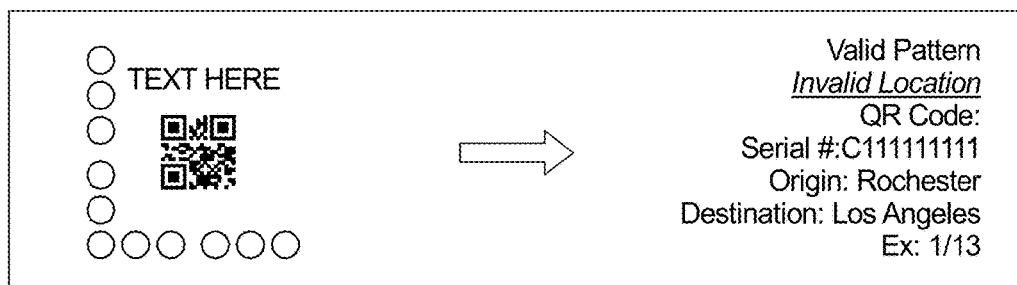
FIG. 7C illustrates another example image and the results displayed upon analysis of the image, according to an embodiment of the present disclosure.
Figure 7D:
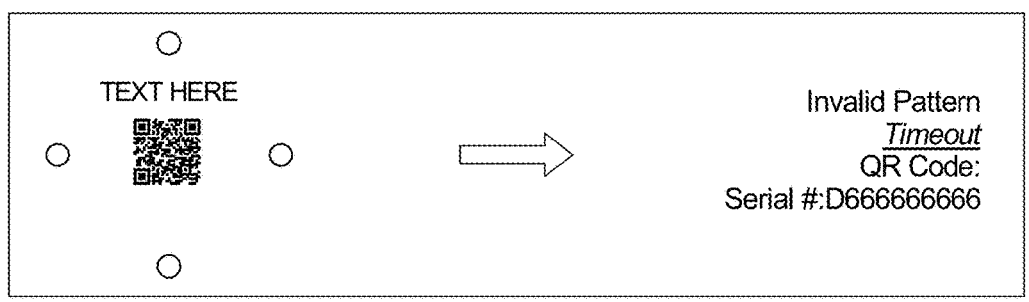
FIG. 7D illustrates another example image and the results displayed upon analysis of the image, according to an embodiment of the present disclosure.

In FIGS. 7B-7D, examples of alternative configurations and reported data relating to those configurations are provided. In FIG. 7B, information received from database 140 based on the configuration on the left of FIG. 7B identifies an expiration date of August 2012, and therefore the result is reported as "Expired." An alternative example is shown in FIG. 7C, wherein the destination location of Los Angeles is identified as an "Invalid Location." In FIG. 7D, the hidden/covert security feature 122 was not successfully read and the results report "Timeout" along with the barcode information only, as no database lookup could be performed on the image data related to the hidden/covert security feature 122. FIGS. 7A-7D are provided as examples of potential configurations and resulting reported data, and are not intended to be exhaustive, as the information retrieved from database 140 based on the data lookup is configurable, and additional reporting options are also configurable based on rules data 144.

In some embodiments, in addition to capturing information relating to the hidden/covert security feature 122, the capture application 114 will also interact with the Global Positioning System (GPS) capabilities of the smart device to determine and record the location of the smart device at the time of the capture process. Location information can then be locally stored on the smart device and/or provided to the network 160 for further use, such as storing location data as part of tracking data 146 in database 140.

In some embodiments, the smart device allows for additional data to be received from a user and/or for information to be sent by a user (for example, via email or text message) after the capture/decode process. Additionally or alternatively, the smart device allows for storage of the enhanced image revealing the hidden security information. In some embodiments, these user functions are only enabled after verification of the authenticity of the hidden/covert security feature 122 and/or confirmation of additional permissions according to security service subscriber 170. According to some embodiments, successful authentication of the document allows for printing of a second document (e.g. a ticket) or display of a corresponding image on the smart device.

7a) Example Smart Device Authentication Application

Figure 8A:
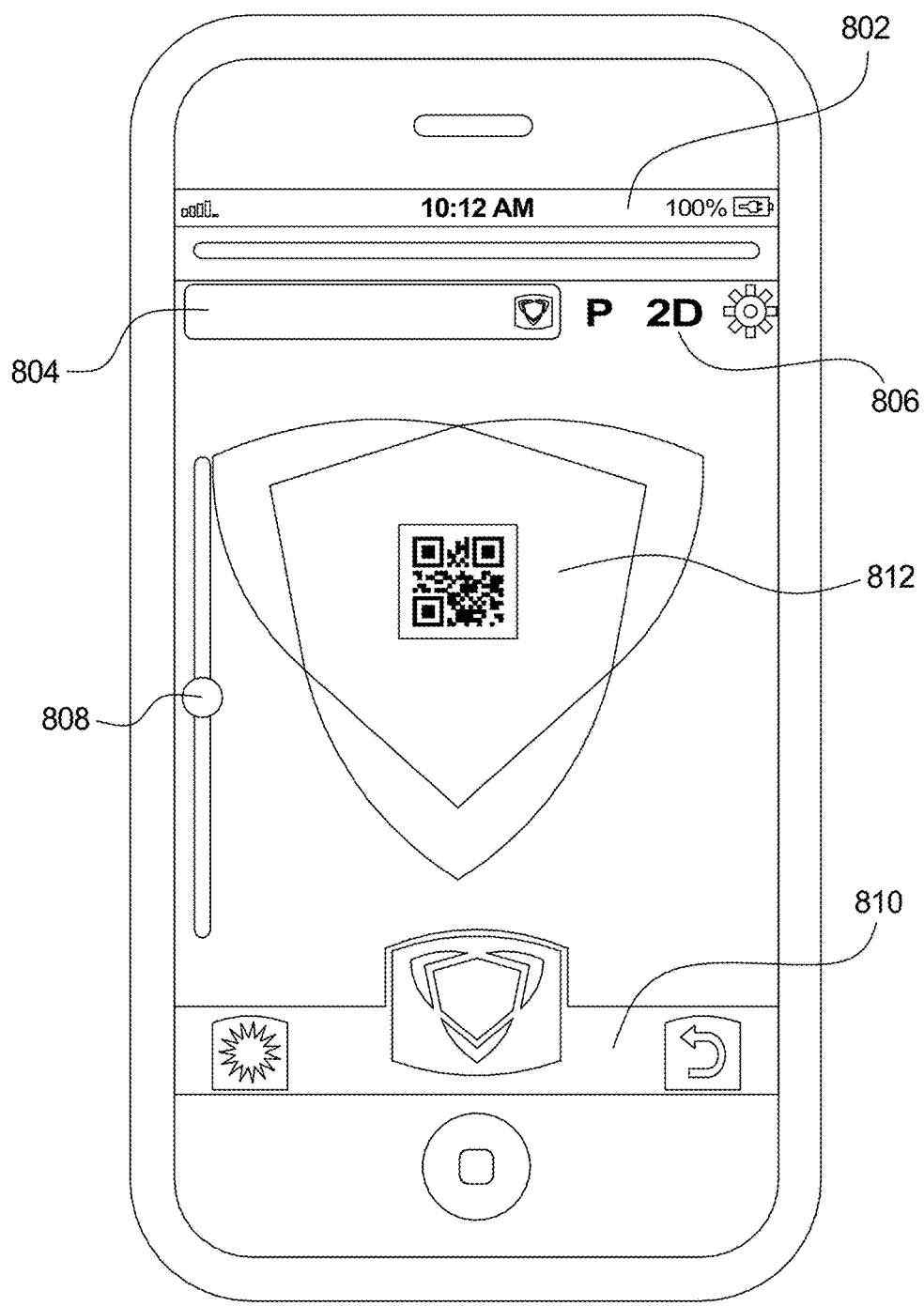
FIG. 8A illustrates a display screen of an example authentication application operating on a mobile device during an image capture process, according to an embodiment of the present disclosure.
Figure 8B:
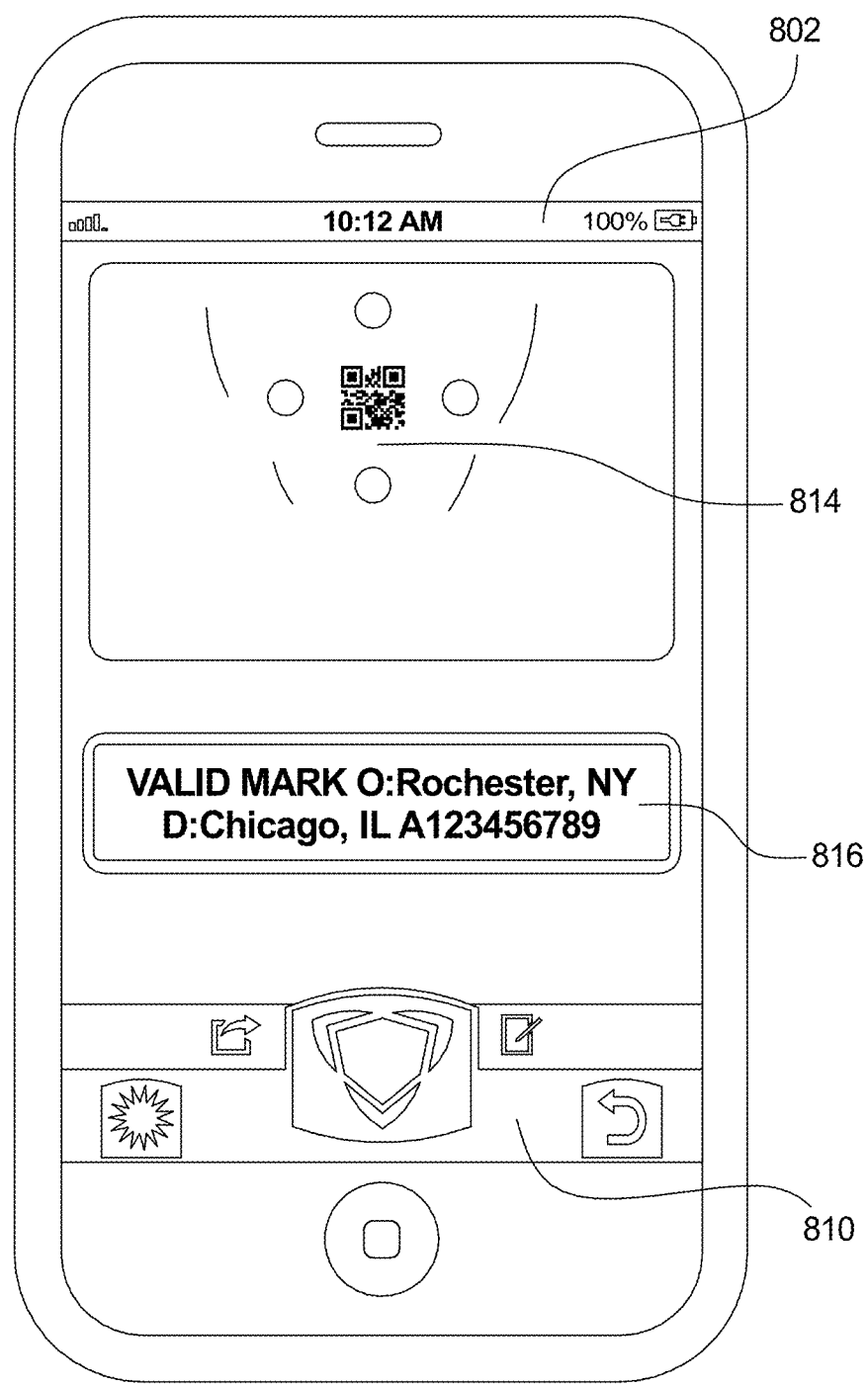
FIG. 8B illustrates another display screen of the example authentication application shown in FIG. 8A during reporting of a successful authentication, according to an embodiment of the present disclosure.
Figure 9A:
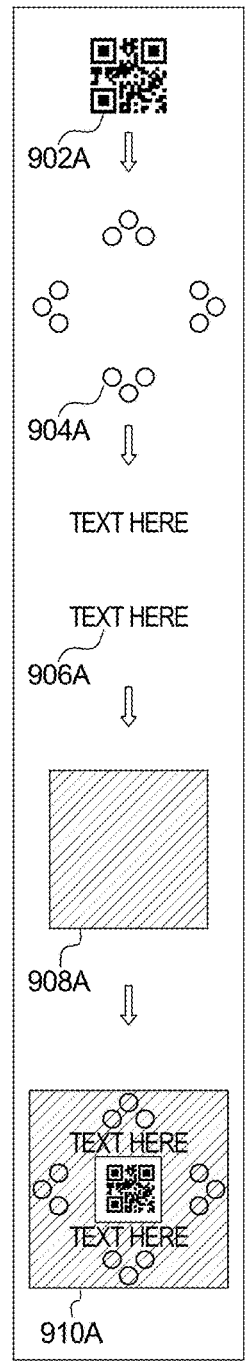
FIG. 9A illustrates an example of the code, optical target pattern, hidden information, and background components that are combined to create a hidden security feature to be authenticated, according to an embodiment of the present disclosure.
Figure 9B:
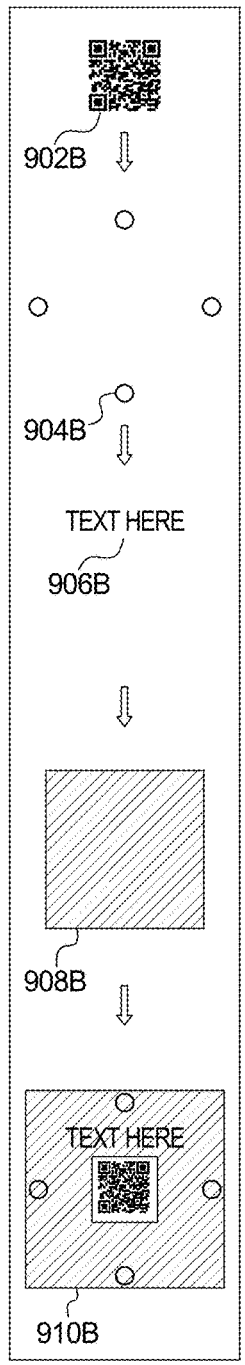
FIG. 9B illustrates another example of the code, optical target pattern, hidden information, and background components that are combined to create a hidden security feature to be authenticated, according to an embodiment of the present disclosure.
Figure 9C:
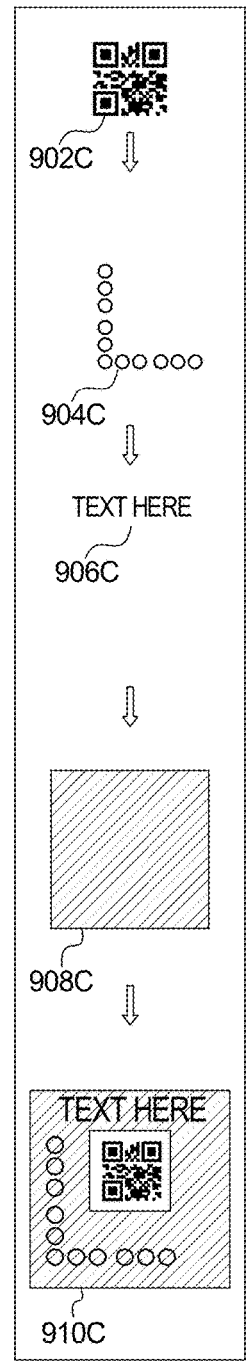
FIG. 9C illustrates another example of the code, optical target pattern, hidden information, and background components that are combined to create a hidden security feature to be authenticated, according to an embodiment of the present disclosure.
Figure 9D:
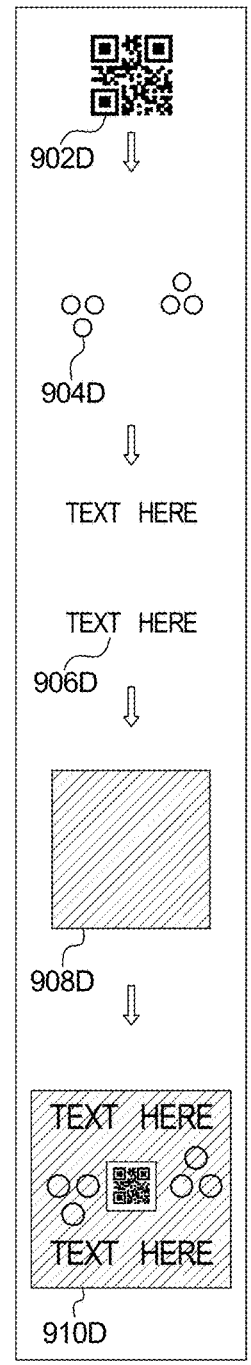
FIG. 9D illustrates another example of the code, optical target pattern, hidden information, and background components that are combined to create a hidden security feature to be authenticated, according to an embodiment of the present disclosure.

In FIGS. 8A-8C, an example embodiment of the disclosure is illustrated on a smart device 105. In the embodiment shown in FIGS. 8A-8C, the smart device 105 is a smart phone. In FIG. 8A, a display screen on the smart device 105 corresponding to the image capture process is illustrated. In FIG. 8A, smart device 105 displays phone status information 802, application status information 804, settings information 806, exposure control 808, input buttons 810, and a targeted image 812. Phone status information 802 displays general information about the phone such as signal strength and battery life. Application status information 804 displays specific status information for the capture application 114, such as scanning status or other diagnostic information. Settings information 806 displays information corresponding to specific application settings, such as 2D barcode detection, Prism feature detection, video stabilization, and other configurable settings. Exposure control 808 can be adjusted to compensate for varied photography environments. Input buttons 810 allow for adjustment of configurable application settings, image capture, and other inputs to the capture application 114 and/or smart device 105. Targeted image 812 shows a preview image 113 of the region targeted by camera 110, showing the image which will be captured once the appropriate input button 810 is selected.

FIG. 8B illustrates a reporting of a successful authentication, according to an embodiment of the present disclosure. FIG. 8B includes phone status information 802, decoded image 814, results field 816, and input buttons 810. Decoded image 814 provides an enhanced image, based on hidden/covert security feature 122, such that the hidden pattern and/or textual information is visible to the unaided eye. Results field 816 provides results associated with the authentication process and/or database lookup information corresponding to hidden/covert security feature 122. Additionally or alternatively, results field 816 displays information related to a barcode or other image information positioned adjacent to hidden/covert security feature 122. Examples of data reported in results field 816 were discussed above in relation to FIGS. 7A-7D.

FIG. 8C illustrates the reporting of a timeout, which may occur when the hidden/covert security feature 122 cannot be detected by capture application 114. FIG. 8C includes phone status information 802, decoded image 814, results field 816, and input buttons 810 similar to FIG. 8B. However, in FIG. 8C no image data is provided at 814, and the results field 816 provides a message indicating that a timeout occurred.

7b) Serialized Security Feature Generation

Turning to FIGS. 9A-D, the components of several example hidden/covert security features 122 and associated images within a secured physical document 120 are shown. Four examples are shown, each image comprising a code 902A-D, a hidden optical target pattern 904A-D, hidden textual information 906A-D, and a background tint 908A-D which conceals the optical target pattern and textual information. These components are combined to create the final image as shown in 910A-D. Thus, in the embodiments shown in FIG. 9A-D, the code is surrounded by the hidden/covert security feature 122 comprising optical targets and textual information. Note that for illustrative purposes the final images 910A-D are enhanced to show the text and pattern within the background tint, but in the actual hidden/covert security feature 122 the pattern and text would not be visible to the unaided eye (but any image adjacent to the hidden/covert security feature 122, such as the bar code shown in 910A-D, will be visible to the naked eye). The optical target patterns and positioning of textual information are not limited to the configurations shown here, but rather the patterns provided are examples of potential configurations. Similarly, while the embodiments here include code 902A-D, a code is not required, as the hidden/covert security feature 122 may be associated with other image information, or may be provided by itself without an additional image or text.

Figure 10A:
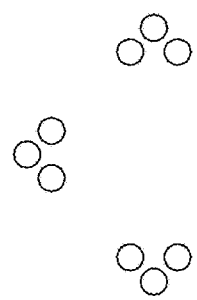
FIG. 10A illustrates an example hidden target pattern, according to embodiments of the present disclosure.
Figure 10B:
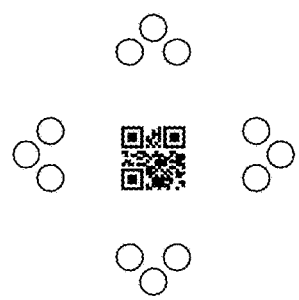
FIG. 10B illustrates an example hidden target pattern associated with a QR code, according to embodiments of the present disclosure.
Figure 10C:
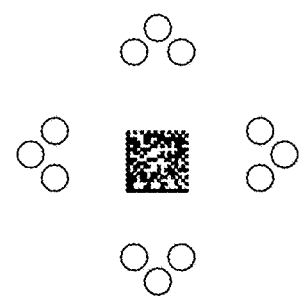
FIG. 10C illustrates an example hidden target pattern associated with a data matrix, according to embodiments of the present disclosure.
Figure 10D:
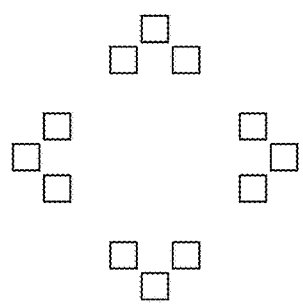
FIG. 10D illustrates an example hidden target pattern including squares, according to embodiments of the present disclosure.
Figure 10E:
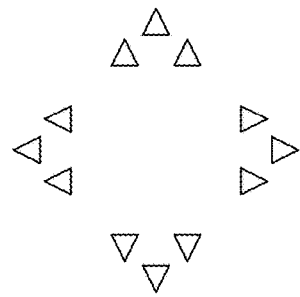
FIG. 10E illustrates an example hidden target pattern including triangles, according to embodiments of the present disclosure.
Figure 10F:
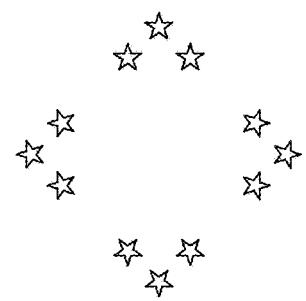
FIG. 10F illustrates an example hidden target pattern including stars, according to embodiments of the present disclosure.
Figure 10G:
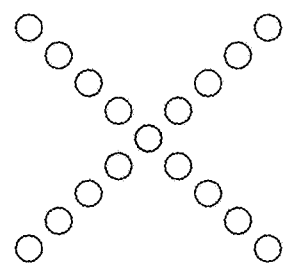
FIG. 10G illustrates an example hidden target pattern in an alternative configuration, according to embodiments of the present disclosure.

As an example, as shown in FIGS. 10A-10C, the pattern may be associated with no image whatsoever as in FIG. 10A, a QR code as in FIG. 10B, a data matrix as in FIG. 10C, or any other image or textual information as desired by a particular security service subscriber 170. Additionally, while example embodiments of patterns disclosed herein have used circles to construct the pattern, the disclosure is not so limited. As shown in FIG. 10D-10F, the pattern may be comprised of squares (FIG. 10D), triangles (FIG. 10E), stars (FIG. 10F), or a variety of other elements. Furthermore, the pattern may be presented in a variety of configurations; one such alternative configuration is shown in FIG. 10G.

7c) Example Serialized Data Extraction

FIGS. 11A-11D illustrate examples in which a serial number is extracted from a pattern of hidden characters using a corresponding decoder, according to embodiments of the present disclosure. As shown in FIGS. 11A and 11B an array of characters and/or symbols can be arranged with guide elements serving as a key (FIG. 11A). The key elements can be analogous to the pattern shown in FIG. 6 that is used for focusing the capture application 114. Additionally or alternatively, the key elements (non-shaded region in FIG. 11A) can be used, during pattern recognition processing, to identify an orientation and/or boundary of the remainder of the coded pattern elements (non-shaded region of FIG. 11B). Thus, the key elements may be arranged proximate the corners of the coded area so as to define the boundaries of the coded area. As described in connection with FIGS. 11C and 11D, the key elements may also be associated with a particular decoder (e.g., the type, number, and/or position(s) of the elements in the key may be used to define a particular decoder for a coded pattern).

FIG. 11C illustrates an example of a 3 by 3 coded pattern that defines a serial number according to a decoder. The example 3 by 3 pattern includes the array shown in left-most box of FIG. 11C in all areas other than the top row and left-most column, which are reserved for the key, similar to the key shown in FIG. 11A. The example 3 by 3 coded pattern thus includes a top row with two blanks ("spaces") followed by a circle; a middle row with two circles followed by a space; and a bottom row with two circles followed by a space. Each entry in the coded pattern can then be associated with a corresponding entry in a decoder table. FIG. 11C also includes an illustration of an example decoder with entries A1, A2, A3, B1, B2, B3, C1, C2, C3. The decoder can then be combined with the coded pattern to generate a serial number. A serial number can be generate by concatenating a string of values that combines the entries in the coded pattern with the entries in the decoder. For example, as shown in FIG. 11C, array locations of the coded pattern populated with a space can correspond to "S" and the array locations populated with a circle can correspond to "C." An "S" or "C" for each entry in the coded pattern can then be concatenated with an entry in a corresponding location of the decoder (e.g., A1 for the top-left location; C3 for the bottom-right location, etc.). The serial number generated may thus be: SA1SA2CA3CB1CB2SB3CC1CC2SC3.

FIG. 11D illustrates an example of a 3 by 4 coded pattern that defines a serial number according to a decoder. The example 3 by 4 pattern includes the array shown in the left-most box of FIG. 11D in all areas other than the top row and left-most column, which are reserved for the key, analogous to the key shown in FIG. 11A. Each entry in the coded pattern can then be associated with a corresponding entry in a decoder table, which is shown in the middle box of FIG. 11D. The example 3 by 4 coded pattern thus includes a top row with a circle followed by three spaces; a middle row with two spaces, followed by a circle, followed by a space; and a bottom row with two circles followed by two spaces. FIG. 11D also includes an illustration of an example decoder with entries PP, d1, 2w, o%, etc. The decoder can then be combined with the 3 by 4 coded pattern to generate a serial number (e.g., by concatenating a string of values that combines the entries in the coded pattern with the entries in the decoder). For example, as shown in FIG. 11D, array locations of the coded pattern populated with a space can correspond to "!1" and the array locations populated with a circle can correspond to "3#." Each entry in the coded pattern can then be concatenated with an entry in a corresponding location of the decoder, similar to the discussion of FIG. 11C above. The serial number generated may thus be: 3#PP!1d1!12w!1o%!1vC!1553#?#!1Gb3#aS3#br!16%!1p0.

In the example shown in FIG. 11C, the total number of unique combinations is given by the number of possible entries in each array location of the coded pattern raised to the power of the number of array locations. For two possible entries in each location (e.g, either a circle "C" or a space "S"), and nine total array locations, there are $2^9=512$ possible combinations. However, by adding another possible entry (e.g., a triangle, star, cross, alphanumeric character, etc.) the number of possible combinations becomes $3^9=19,683$; and by adding a fourth possible entry, the number of possible combinations becomes $4^9=262,144$. Similarly, for the example shown in FIG. 11D with a coded pattern arranged in a 3 by 4 array, a pattern with two possible entries has $2^{12}=4096$ possible combinations; three possible entries provides $3^{12}=531,441$ possible combinations; and four possible entries provides $4^{12}=16,777,216$ possible combinations.

Although, it is noted that the above description of FIG. 11 is just one example of a coded pattern combined with a decoder to generate a serial number, and other arrangements may be used. Generally, the present disclosure provides for a camera-equipped smart device to capture an image of a security feature that may include an encoded pattern, which may not be readily apparent to the naked eye. The image processing techniques on the smart device and/or remote server can then be used to decode the image and characterize the security feature and thereby authenticate the imaged document, such as discussed in connection with FIGS. 1-5 and elsewhere herein. Once decoded via the image processing software, the security feature may include patterns that can be mapped to substantially unique identifiers in order to enable tracking of the particular pattern. Moreover, some embodiments of the present disclosure also provide for generating such security patterns to include substantially unique, dynamically generated identifiers such as the coded patterns discussed above, for example. When incorporated on product packaging, for example, particular products can then be scanned at a future time and information particular to that product (e.g., batch identifier, manufacture date, shipping date, sale date, etc.) can be retrieved from a remote server on the basis of the substantially unique identifier. Accordingly, some embodiments of the present disclosure provide for dynamically generating security patterns to be printed on a series of items such that each resulting item (or perhaps groups of such items) are printed with a substantially unique identifier included in the security pattern in a manner that can be distinguished through the image processing techniques included herein.

7d) Example Serialized Data Encoding

FIGS. 12A-12G illustrate example configurations for patterns of characters to be embedded in security feature, according to embodiments of the present disclosure. As shown in FIGS. 12A-12G characters may be arranged in arrays and optionally surrounded by orienting features. For example, 12A illustrates an arrangement of alphanumeric characters (e.g., the numbers 1-9) situated near the corner-marking key elements which are shown as three lower-case x letters. Although the key elements may be omitted and/or the alphanumeric characters may include letters as well as numbers (FIG. 12B). Moreover, as shown in FIG. 12A-12C the character pattern may be arranged to be wholly or partially within an orienting shape, such as the rounded shapes shown in FIGS. 12A-12B or the box shown in FIG. 12C, for example. Further, the array of alphanumeric characters is not limited to 3 by 3 arrays, and may include arrays (or other arrangements) of a variety of shapes and dimensions. For instance, a 2 by 5 array of alphanumeric characters may be used, as shown in FIG. 12D, or a 5 by 2 array of such characters, as shown in FIG. 12E. Still further, FIG. 12F shows a 3 by 4 array. In addition, the arrangement of alphanumeric characters may be arranged in non-rectangular shapes, such as the arrangement configured to spell out the letters "D S S," as shown in FIG. 12H, or other arbitrarily shapes/configurations. Generally, such arrangements of alphanumeric characters may include any static OCR language library, such that the characters can be identified and recognized by an OCR engine. FIG. 12G is an example of an array populated non-latin alphanumeric characters.

7e) Additional Example Security Features

Figure 13A:
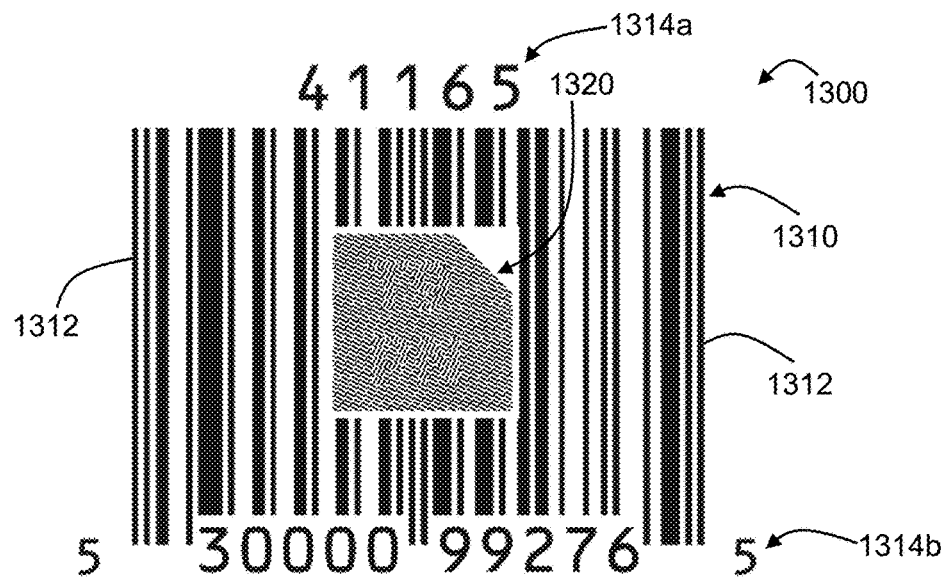
FIG. 13A illustrates an example configurations of a hidden security feature included within a barcode region, according to embodiments of the present disclosure.
Figure 13B:
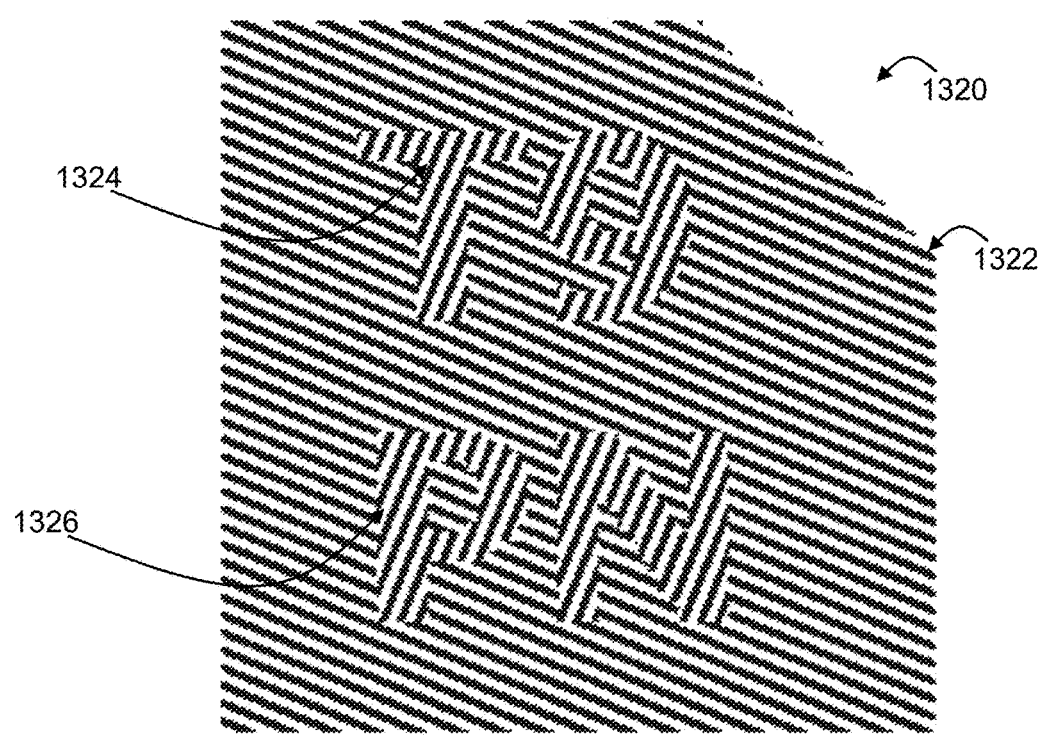
FIG. 13B illustrates an enhanced view of the printed security feature.
Figure 13C:
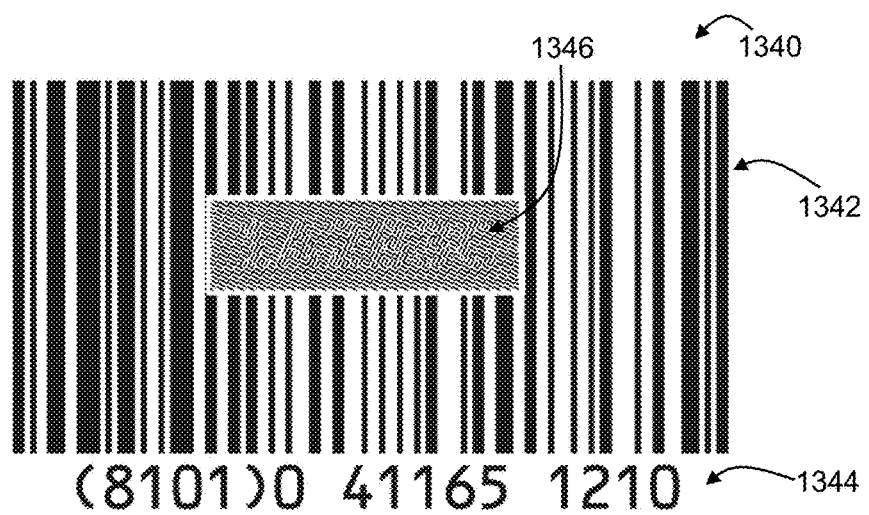
FIG. 13C illustrates another example of a scannable region including both a barcode pattern with associated numbers and an embedded security feature.

FIGS. 13A-13C illustrate example configurations for hidden security features included within a barcode region, according to embodiments of the present disclosure. As shown in FIG. 13A, a scannable barcode region 1300 includes a barcode pattern 1310 and an integrated security feature 1320 within the barcode region 1310. The barcode pattern 1310 can be formed of a pattern of substantially parallel printed elements 1312 of varying widths. Numeric indicators can be included above (1314a) and/or below (1314b) the barcode pattern 1310. The barcode pattern 1310 is interrupted by the printed security feature 1320. The security feature 1320 is illustrated near the center of the barcode pattern 1310, for example purposes, but the security feature 1320 can be printed in any location of the barcode pattern 1310 while leaving a substantially continuous strip, across the entire barcode pattern 1310, in a direction transverse to the orientation of the printed elements 1312. The substantially continuous strip can have a thickness of, for example, ⅛ inch, or another desired value. Thus, the outer edges of the security feature can be separated from the edges of the barcode pattern 1310 (e.g., at one or both of the edge(s) nearest the numbers 1314a-b) by at least the minimum desired thickness of the substantially continuous strip.

FIG. 13B illustrates an enhanced view of the printed security feature 1320. The printed security feature 1320 can include a background setting 1322 and one or more latent images (e.g., the "T" latent image 1324 and the "P" latent image 1326). The background 1322 can be a field including a line screen pattern. The line screen pattern can include a series of substantially parallel lines and/or line elements with a regular spatial frequency. For instance, the lines in the line screen pattern can be arranged with a line frequency between about 100 lines per inch and about 300 lines per inch, as measured by the number of lines crossed in a direction perpendicular to the orientation of the lines. However, the background 1322 may additionally or alternatively include a field of printed elements other than lines, at a similar spatial frequency, such as an arrangement of line segments, circles, squares, irregular shapes, and the like. The "T" latent image 1324 and the "P" latent image 1326 (as well as the "9" and "N" latent images) can each include a field including a line screen pattern. The respective latent images (e.g., the latent images 1324, 1326, etc.) can be shaped as alphanumeric characters (as shown) or as other shapes that can be recognized during analysis by the security service 130. The characters can then be recognized to extract encoded information, similar to the description of recognizing alphanumeric symbols and associating them with serial numbers in FIGS. 11-12 above.

The latent images are configured to be substantially indistinguishable from the background 1322 with the naked eye, but can be distinguished during image analysis performed by the security service 130, for example. Further, the latent images may be distinguishable using a viewing aid with a spatial frequency corresponding to the spatial frequency of one or both of the latent images of the background 1322 (e.g., by aligning such viewing aid to differentially interfere with the line screen patterns of the latent image and/or the background 1322. In some examples, the line-screen pattern of the latent images have a line frequency and print density similar to the line frequency and print density of the background 1322. The print density of the security feature 1320 may be relatively less than the print density of the barcode pattern 1310. For example, the barcode pattern 1310 may have a print density of about 80-100% while the print density of the security feature 1320 may be about 5-50%, or approximately 20%. The latent images can be distinguishable based in part on the line-screen patterns of the latent images and the background 1320 having distinct orientation angles. For example, the two line screen patterns can be oriented approximately perpendicularly (i.e., with a relative angle of about 90 degrees).

FIG. 13C illustrates another example of a scannable region 1340 including both a barcode pattern 1342 with associated numbers 1344 and an embedded security feature 1346. The security feature 1346 includes encoded information as a series of latent images representing alphanumeric characters, which can be recognized by a character recognition module and associated with a serial number and/or other identifying information using the security service 130. In particular, the security feature 1346 includes the following series of alphanumeric characters as latent images: 1 A 2 B 3 C.

Examples of hidden/covert security feature 122 have been previously described in U.S. patent application Ser. No. 13/837,135, filed Mar. 15, 2013, entitled "Barcode Copy Protection System;" International Patent Application Publication WO 2013/067092, filed Nov. 4, 2011, entitled "System and Method for Dynamic Generation of Embedded Security Features in a Document;" U.S. patent application Ser. No. 11/495,900 entitled "Covert Document System;" U.S. patent application Ser. No. 11/741,394 entitled "Document with Linked Viewer File for Correlated Printing;" U.S. Pat. No. 7,906,198 entitled "Document Containing Security Images;" U.S. Pat. No. 7,845,562 entitled "Solid-Color Embedded Security Feature;" U.S. Pat. No. 7,976,068 entitled "Double-blind Security Features;" and U.S. Pat. No. 7,982,917 entitled "Document Containing Scanning Survivable Security Features;" U.S. Pat. No. 8,444,181 entitled "Single Color Screen Patterns for Copy Protection;" each of which is incorporated herein by reference in its entirety.

In some examples, the barcode patterns arranged to surround the security feature can desirably be used by the autofocusing function 116 to allow the camera 110 in the camera-equipped smart device 105 to focus on the high-contrast edges in the barcode pattern to thereby capture a digital image 112.

Incorporating a security feature within a scannable barcode region may allow for such security features to be readily incorporated onto product packaging, because the location of such features will be relatively obvious to those interested in verifying authenticity and/or receiving user-deliverable content. Moreover, providing a security feature within a barcode region allows the security feature to be incorporated onto product packaging without occupying area on the packaging that may be used to portray other content (e.g., logos, graphics, product description, instructions, etc.). Because product packaging commonly already includes a scannable barcode region, for use in point of sale transactions, security features configured to be arranged within a scannable barcode can be deployed onto product packaging without undergoing a packaging redesign.

XIII. Example Rendering Mediums

The security features authenticated via a camera-equipped device described throughout may be rendered in several different ways. Three example rendering techniques are described below in connection with FIGS. 14A-14D. In brief, the security features described herein may be rendered by printed elements on a printable substrate, by an electronic display, or by a surface geometry pattern created in a physical substrate. Any of the rendering mediums allow for the security features, once rendered, to be imaged using a camera-equipped smart device, which can then communicate with a security service to authenticate the security feature based on the captured image.

Figure 14A:
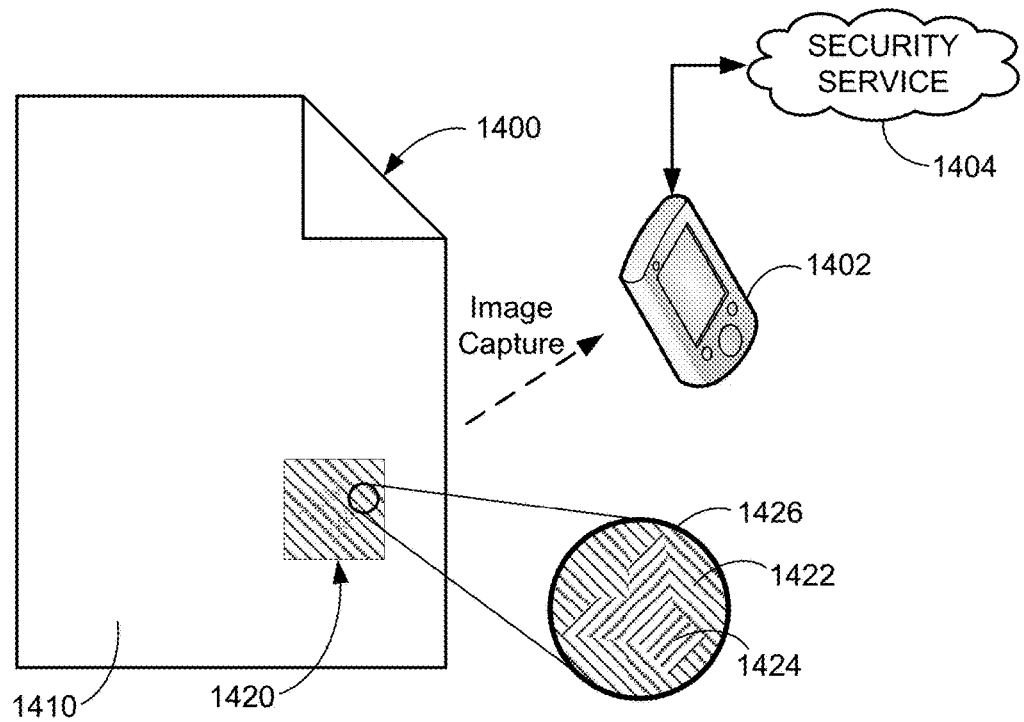
FIG. 14A illustrates an example printed medium having a security feature thereon.

FIG. 14A illustrates an example printed medium 1400 having a security feature thereon. The printed medium 1400 includes a printable substrate 1410, which may be a paper-based and/or plastic-based substrate to which ink, toner, wax, dyes, or other chemical colorants can be applied, adhered, and/or absorbed to the substrate 1410. In some cases, the substrate 1410 may include plant-based fibers (e.g., cotton, etc.), synthetic fibers (e.g., fiber glass, resins, polymeric materials, etc.) and binding media combined to form the substrate 1410. The printable substrate 1410 may be a ticket, bill, coupon, certificate, note, negotiable instrument, another physical surface capable of bearing markings, etc. A printed security feature 1420 is included on the printed substrate 1410 by arranging a suitable pattern of print elements on the print substrate via a printing technology (e.g., offset printing, inkjet printing, laser printing, intaglio, etc.). The printed security feature 1420 can include a background and hidden characters. The printed security feature 1420 may be, for example, the same or similar to any of the security features described above in connection with FIGS. 1-13. The background and characters can be printed with a print density and/or tint such that the respective regions of the background and the hidden characters are not readily differentiable from one another via the naked eye. For example, the background and the hidden characters can each be created from a line screen pattern of parallel lines, line segments, and/or print elements. The line frequency and line thickness in the respective regions combine to define the print density of the printed security feature 1420. An enhanced view 1426 of a portion of the printed security features shows the background 1422 and a hidden character 1424 (i.e., the region shaped like the character "Y"). In some examples, the background 1422 and hidden character 1424 may be formed of line screen patterns oriented at different angles (e.g., at 90 degrees with respect to one another, or another difference in orientation). The hidden character 1424 may be one of several characters embedded in the security feature 1420, similar to the example serialized security features described above.

A smart device 1402 captures an image of the printed security feature 1420 and communicates with a security service 1404 to authenticate/validate the security feature 1420. The authentication/validation of the security feature 1420 using the smart device 1402 may be carried out in accordance with the example processes described above in connection with FIGS. 1-13, for example. Upon confirmation of authenticity of the security feature 1420, which may be provided via the user interface of the smart device 1402, a user of the smart device 1402 may determine that the document 1400 is authentic.

Figure 14B:
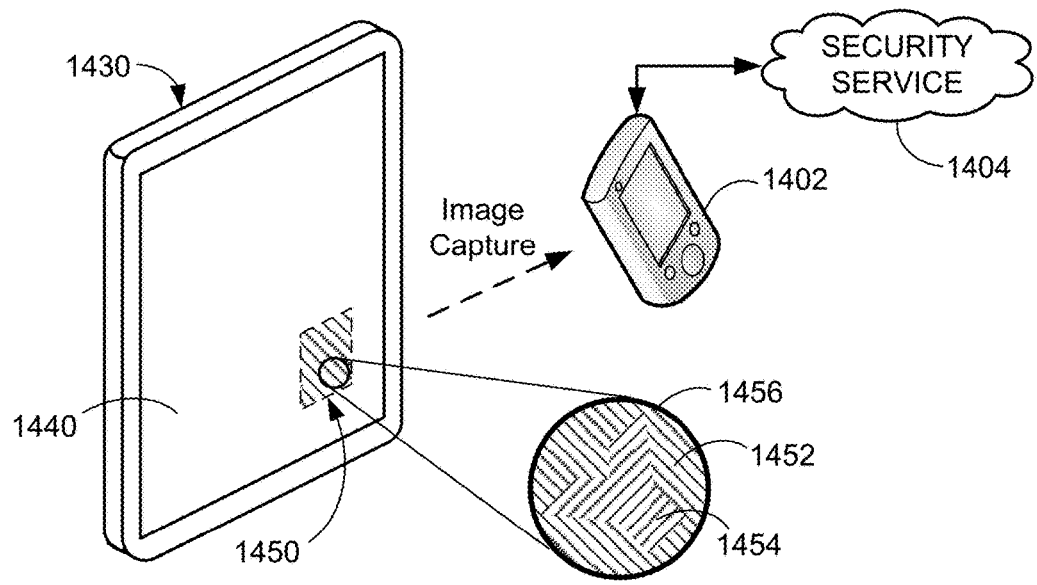
FIG. 14B illustrates an example electronic display rendering a security feature

FIG. 14B illustrates an example electronic display 1430 rendering a security feature 1450. The electronic display 1430 may be an electronic display with a pixelated active display region 1440 that operates using transmissive, emissive, and/or reflective elements to render visual content in accordance with display instructions. Thus, the electronic display 1430 may be embodied in a tablet, a mobile phone, a monitor, a watch, a heads up display, etc. The display region 1440 may be implemented using an array of selectively transmissive elements (e.g., liquid crystal display technology), selectively emissive elements (e.g., light emitting diode technologies), and/or selectively reflective elements (e.g., electronic ink technologies, MEMS-tuned reflective technologies). Display instructions provided to the display region 1440 cause particular pixels in the array to transmit, emit, and/or reflect desired light so as to render a desired image across the display region 1440. As shown in FIG. 1440, a security feature 1450 may be rendered using such an electronic display. An enhanced view 1456 of the security feature 1450 illustrates an example in which the security feature 1456 has a background 1452 and a hidden character 1454 each formed by relatively oriented line screen patterns. However, it is understood that the security feature 1450 may take the form of any of the security features described herein.

Similar to FIG. 14A, the camera-equipped smart device 1402 can capture an image of the electronically rendered security feature 1450. For example, the smart device 1402 can focus on a focal plane that includes the active plane of the display region 1440. The smart device 1402 can then communicate with the security service 1404 to authenticate/validate the security feature 1450, similar to the processes described herein in connection with FIGS. 1-13.

Figure 14C:
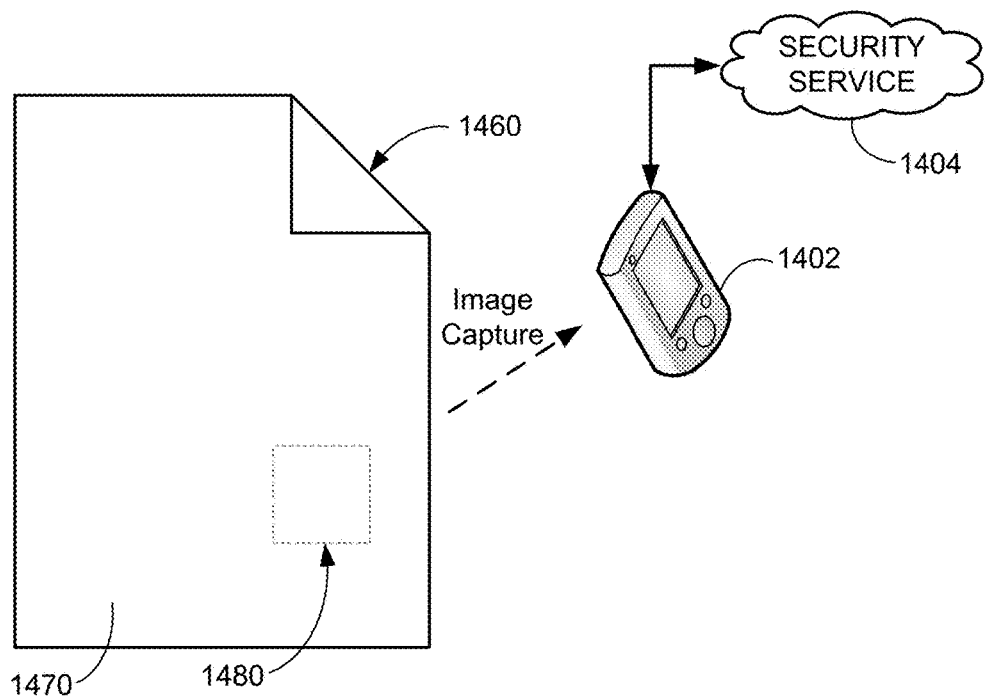
FIG. 14C illustrates an example textured medium having a security feature thereon.
Figure 14D:
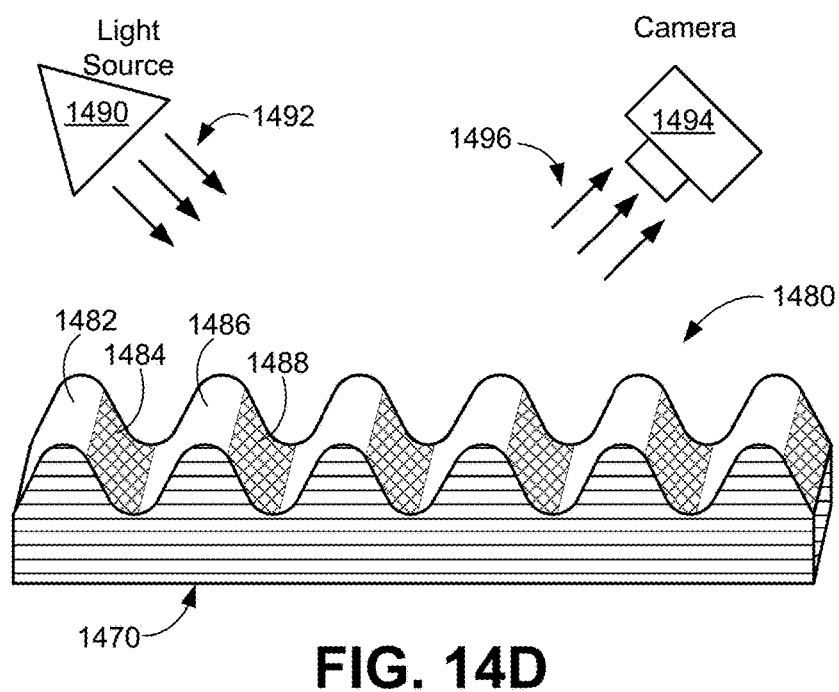
FIG. 14D illustrates an enhanced view of the textured medium shown in FIG. 14C.

FIG. 14C illustrates an example textured medium 1460 having a security feature 1480 thereon. The textured medium 1460 may include a substrate 1470 that is formed of a paper-based or plastic-based material. In some cases, the substrate 1470 may include plant-based fibers (e.g., cotton, etc.), synthetic fibers (e.g., fiber glass, resins, polymeric materials, etc.) and binding media combined to form the substrate 1470. Moreover, the substrate 1470 may be formed of a substantially solid material capable of being finely patterned with texture, such as a metallic material. FIG. 14D illustrates an enhanced view of the textured substrate 1470 shown in FIG. 14C. A security feature 1480 is formed in the textured substrate 1470 as a pattern of periodic variations in surface geometry. The security feature may include a line-screen pattern (or patterns) that are embossed, debossed, stamped, impressed, molded, extruded, cast, or otherwise formed in the substrate 1470. The pattern of surface geometry variations in the security feature 1480 create a corresponding pattern of shadows, which create contrasted patterns when imaged using the smart device 1402. The smart device 1402 captures an image of the shadow-created contrast pattern and communicates with the security service 1404 to authenticate the security feature 1480.

An example of such periodic surface variations and the shadows created thereby is shown in FIG. 14D, which is a cross-section view through the textured substrate 1470. The security feature 1480 may include a pattern of ridges (e.g., 1482, 1486) and valleys (e.g., 1484, 1488). When the security feature 1480 is illuminated from a different direction than it is imaged from, the camera 1494 images a shadow-created contrast pattern between the portions illuminated by the light source 1490 and the portions shadowed by the light source 1490. As shown in FIG. 14D, a light source 1490 illuminates the textured security feature 1480 with light 1492. The angle of the illuminating light 1492 causes the top and left portions of the ridges 1482, 1486, etc. (as viewed in FIG. 14D) to be lit up while the bottom portions of the valleys 1484, 1488, etc. are cast in shadow. As a result, light reaching the camera 1494 (e.g., the smart device 1402) when imaging the textured security feature 1480 indicates contrasting stripes between the ridges 1482, 1486, etc., which reflect a relatively large amount of light, and the valleys 1484, 1488, etc., which reflect relatively less light and therefore appear darker in the captured image. Such patterns of ridges and valleys may therefore be used to create a shadow-induced contrast pattern of line screen patterns in which a hidden image is situated within a background setting, similar to any of the security features described herein.

Furthermore, some examples may further facilitate the shadow-induced contrast pattern by applying coatings to the textured pattern security feature 1480 with variable reflectivity. For instance, the peaks of the ridges 1482, 1486, etc., may be coated with a relatively reflective coating (e.g., a glossy coating) and the bottoms of the valleys 1484, 1488, etc., may be coated with a relatively non-reflective/absorbing coating (e.g., a dull matte coating). As a result, when illuminated by the light source 1490, the contrast between the illuminated glossy regions and the non-illuminated matte regions can enhance the shadow-induced pattern discerned using the camera 1494. In another example, coatings may be used to give the textured security feature 1480 a preferred orientation of illumination and/or viewing. For example, a left side of each ridge may be coated with a relatively reflective coating and a right side may be coated with a relatively non-reflective/absorbing coating. As a result, the shadow-induced contrast pattern is preferentially discernible when the illuminating light is incident on the left, relatively reflective side of each ridge and imaged at an angle such that the right, relatively non-reflective side of each ridge is visible.

IX. Example Applications

According to some embodiments, elements of this disclosure may be used to authenticate a variety of documents and related products, including but not limited to the following: protection/secondary authentication of product codes on product packaging (such as verification of destination country for pharmaceutical products), authentication of unique or expensive goods (such as signed memorabilia), control of imports/exports (such as for luxury goods commonly counterfeited), warehouse management and tracking (such as the destination information and expiration date of perishable items), authentication of important documents such as ID cards or title documents, verification of promotional materials or gaming tickets, identification of product recalls, and many other applications relying on the authentication, via a smart device, of hidden security information within a document.

9a) Access Control/Identity Association

Moreover, some embodiments may be used to authenticate/identify individuals before granting access to a secured area. For example, an access grantor may use a smart device to authenticate a security feature on a user's ticket or access badge, which may be rendered on a physical printed or embossed medium, or rendered on an electronic display. The user's ticket, access badge, electronic display, etc. may include embedded data that allows a security service to authenticate the ticket as an original and/or to identify the particular individual. Generally, the security features described below may be any of the security features described above and may be rendered via any of the rendering mediums described above.

Figure 15A:
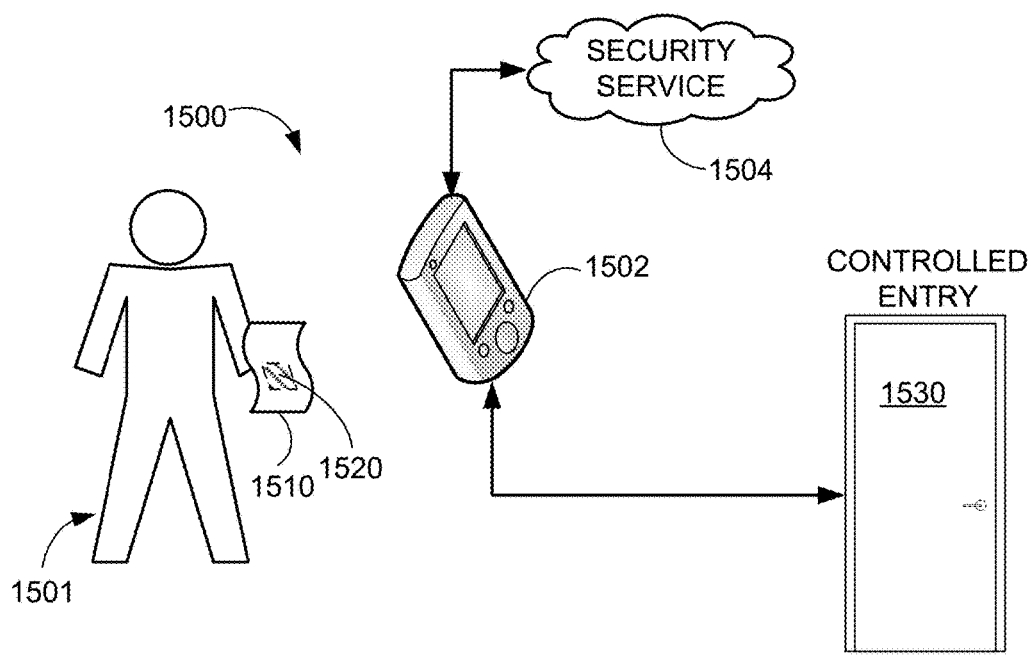
FIG. 15A illustrates an example system in which security features are used to authenticate individuals accessing a secured area.

FIG. 15A illustrates an example system 1500 in which security features 1520 are used to authenticate individuals 1501 accessing a secured area 1530. An individual 1501 presents a ticket 1510 including the security feature 1520 to request access to the secured area 1530. A grantor, which may be an automated system and/or may be an individual, such as a guard, etc., can then use a smart device 1502 to image the security feature 1520. The smart device 1502 communicates with the security service 1504 to authenticate/validate the security feature 1520. The smart device 1502 then indicates to the grantor whether the security feature 1520 is authentic and the grantor can determine whether to allow the individual 1501 to access the secured area 1530 based in part on the authentication feedback. In some cases, the security service 1504 may deliver to the smart device 1502 additional user-specific information useful for providing a secondary authentication. For example, the security service 1504 may map the security feature 1520 to pre-determined user-specific information based on serialized data encoded in the security feature. In one such example, the security feature 1504 may include a picture or description of the individual 1501 that is associated with particular encoded data in the particular security feature 1520 issued to the particular individual 1501. The security service 1504 can then deliver the picture or physical description, etc., to the smart device 1502 to allow the grantor to compare and determine whether the individual 1501 is the same person to which the particular ticket 1510 was issued. Additional supplemental verifications may also be enabled using the smart device 1502 and security service 1504.

Some examples may thus find application in environments in which access to a secured area is controlled to allow access only to individuals bearing authentic tickets. For example a manually operated access door or automated access door may be activated only upon authenticating a user's ticket based on the security feature. Moreover, the activity of the particular user bearing the ticket may be tracked by mapping the security feature to a particular user (e.g., via serialized data encoded in the security features) and recording the time periods in which access is granted, for example.

Figure 15B:
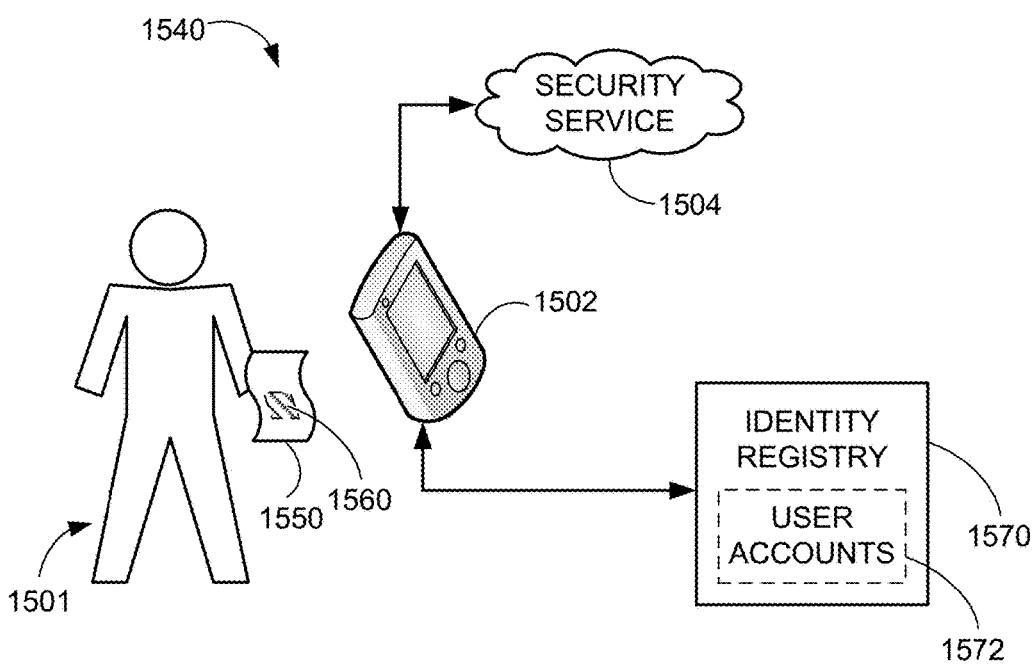
FIG. 15B illustrates an example system in which security features are used to identify a person and/or an account.

FIG. 15B illustrates an example system 1540 in which security features 1560 are used to identify a person and/or an account in an identity registry 1570. The individual 1501 presents a ticket 1550 including the security feature 1560 to verify their identity. A verifier, which may be an automated system and/or may include a person, such as a guard, etc., uses a smart device 1502 to image the security feature 1560. The smart device 1502 then communicates with the security service 1504 to authenticate the security feature 1560 and extract data encoded in the security feature 1520. The extracted data (e.g., serialized data encoded as characters hidden in the security feature) is mapped to a pre-determined identity or user-specific account using the security service 1504. For example, the security service 1504 may include a look up table or other data structure that associates particular individuals and/or particular accounts with particular issued security features 1560 based on serialized data included in such security feature 1560. The security service 1504 can thus deliver data to the smart device 1502 to indicate the security feature 1520 is authentic and also indicates an associated particular identity or account, such as an identity stored in the identity registry 1570, which may further include user accounts 1572, etc.

Some examples may thus find application in hospitality environments in which patrons carry tickets or access badges, wear wristbands, etc. The tickets can include security features embedded with substantially unique identifiers (e.g., a serialized string of characters). A security service can then be used to map the substantially unique identifier to a particular individual or a particular individual's account. Such tickets may therefore allow for patrons to access a secured area (e.g., a lounge, bar, etc.) and/or to negotiate or track purchases. For example, a patron may gain access to a bar by authenticating the security feature on their ticket. The patron may then redeem one or more items from the bar (e.g., drinks, etc.) by authenticating their ticket with individuals regulating the bar. Upon authenticating the ticket, the bar system may debit an account associated with the patron, which may be mapped to the patron based on the serialized data encoded in the security feature, or may track the drinks ordered by the particular patron, or may otherwise associate consumer activity with the particular patron for future reference.

9b) Website Authentication

Figure 16A:
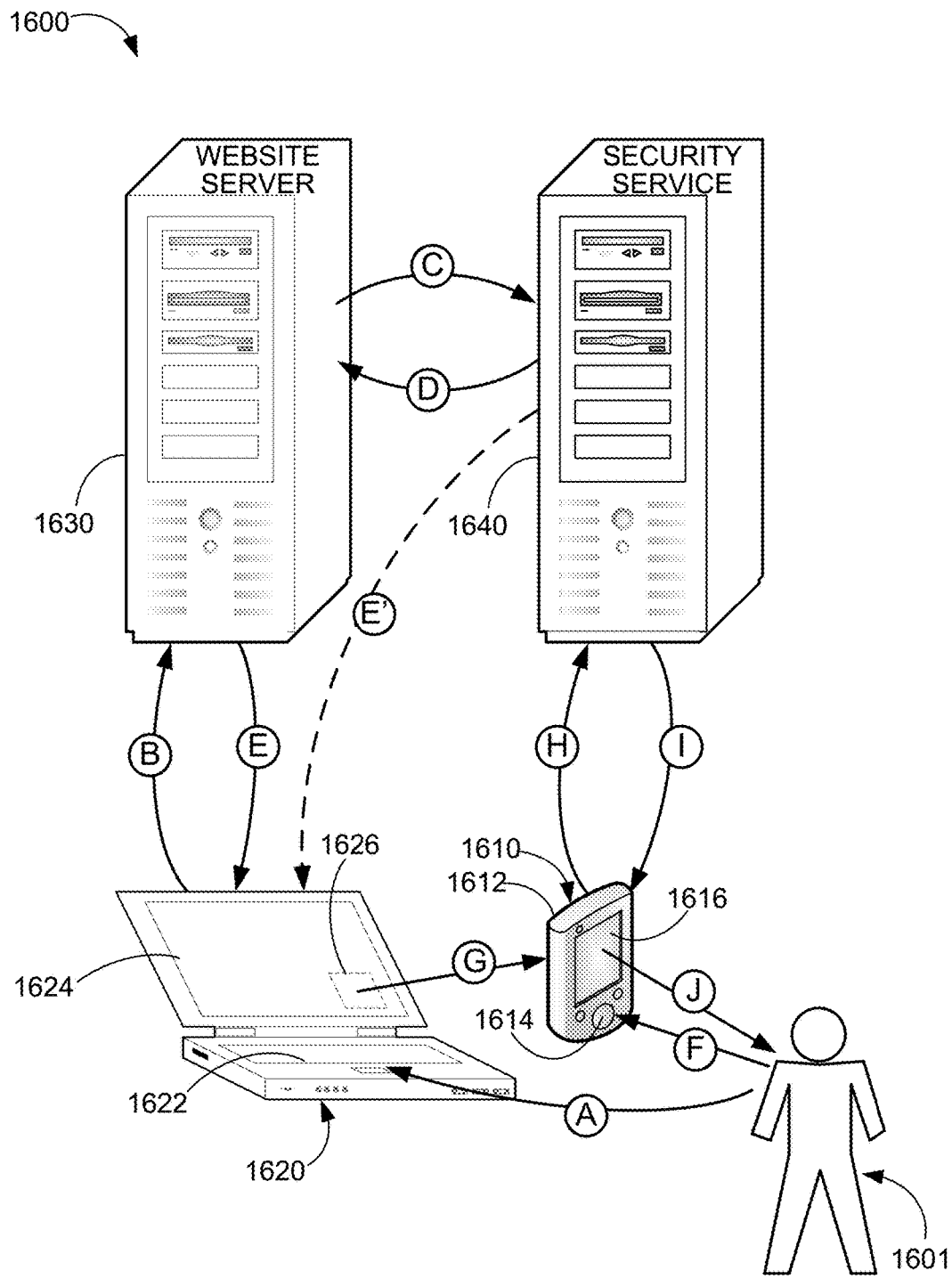
FIG. 16A illustrates an example system for website authentication using a smart device communicatively coupled to a network based security service.

FIG. 16A illustrates an example system 1600 for website authentication using a mobile device 1610 communicatively coupled to a security service 1640. The system 1600 can include a website server 1630 and the security service 1640 in communication with a user terminal 1620 and the mobile device 1610. The website server 1630 is configured to engage in a communication session with the user terminal 1620 to allow the terminal 1620 to render, navigate, and otherwise engage with a particular website via the user terminal 1620. The user terminal 1620 includes a display panel 1624 and user input devices 1622. Upon suitable inputs from the user 1601 (e.g., navigating to a particular website associated with the website server 1630), the user terminal 1620 engages in a communication session with the website server 1630 and renders content on its display panel 1624 according to content specified by the website server 1630.

The security service 1640 communicates with the website server 1630 and/or user terminal 1620 to provide an authentication graphic (represented symbolically in FIG. 16A by the dashed square 1626 on the display 1624) to display on the website. The security service 1640 can be configured to only provide the authentication graphic 1626 if the request for the graphic originates from a website server that is previously known to be authentic (e.g., via a prior authentication screening process). For example, the source of a request for an authentication graphic can be traced to the particular server using secure socket layer encryption to verify the source of the request. Once the authentication graphic 1626 is displayed on the display panel 1624 of the terminal 1620, the user 1601 can use a camera-equipped mobile device 1610 to capture an image of the authentication graphic 1626 and communicate with the security service 1640 to determine whether the authentication graphic 1626 originated with the security service 1640, and is therefore an indication of authenticity of the rendered website. In the alternative, if the authentication graphic 1626 is not displayed (e.g., because the request from the website server 1630 is refused by the security service 1640 or because the security service does not validate the imaged graphic 1626 captured by the mobile device 1610), the failure can therefore be an indication that the rendered website is not authentic and may therefore be counterfeit. The user 1601 can be informed of the authenticity (or non-authenticity) by a message delivered to the terminal 1620 and/or to the mobile device 1610. The authentication process is described further below.

In some embodiments, the website server 1630 and/or the security service 1640 can each be cloud-based. The website server 1630 and/or the security service 1640 can include one or more remotely located servers configured to receive and respond to messages from the user terminal 1620 and/or mobile device 1610 via signals conveyed via a local area network, a wide area network, and/or the Internet according to various messaging protocols and/or standards. The user terminal 1620 may be, for example, a computing device with network connectivity, and one or more processors configured to execute program instructions stored in a non-transitory memory storage. The user terminal 1620 can also include a user interface with one or more input devices 1622 (e.g., keyboard, touchpad, microphone, etc.) and one or more output devices 1624 (e.g., display panel 1624, speakers, etc.). The display panel 1624 can incorporate a range of different display technologies, including emissive display technologies (e.g., light emitting diodes, etc.), transmissive display technologies (e.g., liquid crystal displays, etc.), and/or reflective display technologies (e.g., electronic inks, etc.). The display panel 1624 is configured to render content in according to information communicated from the website server 1630 (e.g., formatting specified by html, scripts, java, etc.). The camera-equipped device 1610 may be, for example, a computing device with network connectivity, an image sensor 1612, and one or more processors configured to execute program instructions stored in a non-transitory memory storage. The camera-equipped device 1610 can also include a user interface with one or more input devices 1614 (e.g., touch-sensitive display, microphone, buttons, dials, etc.) and one or more output devices 1616 (e.g., display panel, haptic feedback system, speakers, etc.).

In some embodiments, the security service 1640 is configured to provide a substantially unique authentication graphic 1624 in response to each request from the website server 1630. For example, the security service 1640 may generate the authentication graphic dynamically in real time in response to each request from the website server 1630. In some examples, the authentication graphic 1626 can include information encoded according to a pattern of characters and/or shapes in the graphic 1626. For example, each generated graphic can encode information including a sequence that substantially uniquely identifies the particular communication session between the terminal 1610 and the website server 1630 (e.g., according to a session identifier or session token). The generated graphics can then be dynamically determined in a manner that causes each generated graphic to be substantially distinguishable from those already generated (and those yet to be generated), because other graphics will have a pattern of characters or shapes determined according to their own session identifiers. Additionally or alternatively, authentication graphics can be generated according to a non-repeating series that is generated to an arbitrary length by the security service using a randomly selected seed. Each subsequently generated graphic may be associated with a particular communication session using a lookup table or the like in the security service 1640 that maps particular graphics to particular communication sessions. As such, the security service 1640 can be used at a later time to associate a particular authentication graphic with a communication session by matching the particular authentication graphic to one in the lookup table. Examples of authentication graphics including encoded information patterns that can be generated by the security service 1640 are disclosed above in connection with FIGS. 1-13, for example.

An example information flow in the system 1600 involving a process to authenticate a website using the security service 1640 is described with reference to the arrows numbered A-J.

Arrow A illustrates the user 1601 operating the user input 1622 of the terminal 1620 to cause the terminal 1620 to establish a communication session with the website server 1630. The communication session may use encrypted communication protocols (e.g., secure socket layer communication, etc.). In some examples, the user input 1622 may involve entering a website address in a website browser operating on the terminal 1620 (e.g., by text input via a keyboard or otherwise manipulating the user input device 1622 of the terminal 1620). In response to the user input (arrow A) causing the terminal 1620 to initiate a communication session with the website server 1630 (arrow B), the website server 1630 may automatically request an authentication graphic from the security service 1640 (arrow C). In response to the request (arrow C), the security service 1640 can determine whether the request (arrow C) originates from an authentic website. For example, the security service 1640 may determine whether the website server 1630 is associated with a previously registered and/or previously validated authentic website server. Upon verifying the authenticity of the requesting website server 1630, the security service 1640 can output data (arrow D) indicative of an authentication graphic to display on the website. The data indicating the authentication graphic (arrow D) can include a raster image file and can be communicated to the website server 130, which can then communicate the authentication graphic to the terminal 1620 (arrow E) such that the authentication graphic 1626 is rendered on the display panel 1624 of the terminal 1620. In an alternative, the data from the security service 1640 conveyed to the terminal 1620 via the website server 1630 (i.e., arrows C and D) can include a pointer (e.g., secure link) to a raster image file of the authentication graphic stored on the security service 1640. Such a pointer can then cause the website rendered on the display panel 1624 of the terminal 1620 to read the image file specified by the pointer on the security service 1640 (arrow E') and render the authentication graphic 1626 on the display panel 1624 of the terminal 1620.

In some examples, the system 1600 operates to automatically generate/provide an authentication graphic 1626 upon initiating a communication session between the terminal 1620 and the website server 1630. For example, the user input (arrow A) may include merely navigating a browser application on the terminal 1620 to the website associated with website server 1630, and the remaining processes (e.g., arrows C-E) may be carried out automatically (i.e., without further user input). Additionally or alternatively, the system 1600 may operate to request an authentication graphic only in response to a specific request from the user 1601 entered via the user interface 1622 of the terminal 1620 after the communication session is already active. For example, arrow A may indicate that the user 1601 requests an authentication graphic (e.g., by clicking a designated region of the website interface, etc.), and the remaining processes (e.g., arrows B-E) may then be carried out automatically (i.e., without further user input). The information flows involving arrows A-E and/or A-E' thereby cause an input from the user 1601 to cause an authentication graphic 1626 to be output from the security service 1640 and rendered on the display panel 1624 of the terminal 1620.

The authentication graphic 1626 may be generated dynamically by the security service 1640 and may be generated according to substantially uniquely identifying information such that each such authentication graphic can be distinguished from others. For example a session identifier or session token can be used to encode information in the authentication graphic, the graphics can be generated according to a series of non-repeating variables, etc. Moreover, the authentication graphic 1626 may be generated based in part on the parameters of the display panel 1624 on the terminal 1620. For example, contrast ratios, aspect ratios, image size, etc., may be adjusted ("tuned") according to the particularities of the display panel 1624 such that the resulting displayed graphic 126 is rendered in a manner suitable for being imaged via the image sensor 1612 of the mobile device 1610. For example, the generated authentication graphic 1626 may be tuned according to the refresh rate, dynamic range, color contrast, pixel spacing, panel size, etc., of the display panel 1624. As such, information indicative of the type of display panel 1624 on the terminal 1620 may be communicated to the security service 1640 (via the arrows B and C).

Once the authentication graphic 1626 is displayed on the terminal 1620, the user 1601 can then verify that the rendered authentication graphic 1626 is in fact an authentic graphic provided by the security service 1640 (and thus an indicator of authenticity of the website) by capturing an image of the authentication graphic using the mobile device 1610 (arrow G). The user 1601 operates the mobile device 1610 via the user inputs 1614 (arrow F) to direct the image sensor 1612 to obtain an image of the authentication graphic 126 (arrow G). For example, the user 1601 can point the mobile device 1610 at the authentication graphic 1626, and press a button to cause the photosensitive image sensor 1612 to integrate received light and thereby obtain an image of the authentication graphic 1626. The mobile device 1610 may be loaded with an image capture application, which may be a combination of hardware and/or software-implemented functional modules configured to operate the image sensor 1612 and/or associated image processing and/or filtering systems to auto-focus the image sensor on the authentication graphic 1626 (e.g., on the plane of the display panel 1624) and expose the image sensor for a suitable exposure time to capture an image of the authentication graphic 1626. Auto-focusing systems and techniques for such image capture applications are described, by way of example, in connection with FIGS. 1-5 above.

In another example, the mobile device 1610 may be used to obtain an image of an authentication graphic being displayed on the display screen 1616 of the device itself rather than on the terminal 1620. In some cases, for example, the mobile device 1610 may be used to display and render the website associated with website server 1630 via an internet browser or similar application installed on the mobile device 1610. Upon viewing a website with an authentication graphic, the user 1601 can provide inputs to the user interface 1614 to cause a screen capture of the displayed content to be obtained. For example, an authentication application installed on the mobile device 1610 may function as an add-on or plug-in to an internet browser application and allow for capturing a screen shot (e.g., a raster image of at least a portion of currently displayed content on the display screen 1616). The screen shot image can include an image of the authentication graphic, for example.

Once the image is captured (arrow G or via screen capture), the mobile device 1610 may filter, compress, and otherwise pre-process the obtained image and then communicate data indicative of the captured image to the security service 1640 (arrow H). The security service 1640 analyzes the received image data (arrow H) and determines whether the imaged authentication graphic 1626 corresponds to a valid authentication graphic. For example, the security service 1640 can determine whether the imaged authentication graphic is the same as one that was previously generated and provided to the website server 1630 and/or the terminal 1620. The security service 1640 may extract encoded information from the imaged authentication graphic (e.g., by detecting an embedded pattern of characters and/or shapes and decoding the pattern according to pre-determined key). The extracted information can then be compared with extracted information embedded in previously generated/provided authentication graphics to determine whether the imaged authentication graphic 1626 is authentic. The security service 1640 thus operates to recognize distinguishing features of the imaged authentication graphic 1626 and determine whether those distinguishing features correspond to a valid authentication image that was generated and/or provided by the security service 1640. The security service 1640 responds to the mobile device 1610 with an authenticity indicating message (arrow I). The authenticity indicating message (arrow I) indicates whether the imaged authentication graphic 1626 is authentic (i.e., whether it corresponds to a valid authentication graphic that was generated/provided by the security service 1640). The mobile device 1610 can then indicate whether the authentication graphic 1626 is authentic (and thus whether the website being viewed on the terminal 1620 is actually associated with the authenticated website server 1630 recognized by the security service 1640, and not a counterfeit) by displaying authenticity information to the user 1601 (arrow J). For example, the mobile device 1610 can display a message on the display 1616.

In some examples, the system 1600 may operate such that the authentication graphics are single use only. For example, once a given authentication graphic is validated by the security server 1640, the security service 1640 can remove that authentication graphic from its database of valid authentication graphics. In such an example, a subsequent attempt to validate using an image of the same authentication graphic will return that the authentication graphic is not valid, because the security service 1640 will fail to recognize the images authentication graphic as a valid one. Such a process can thus prevent images, once generated by the security service 1640, from being intercepted and replicated on fraudulent websites. In some examples, because each authentication graphic is only generated and authenticated one time, and only in response to a request originating from a website server 1630 that is known to be authentic, an authenticity-indicating message (arrow I) from the security service 1640 can be considered a reliable indicator of authenticity. The one-time use nature of the authentication graphic 1626 can assure the user 1601 that the validation of the particular authentication graphic (e.g., at arrow J) is preceded by a check from the security service 1640 that the website server 1630 is associated with an authentic website (e.g., at arrow C).

In some examples, the system 1600 may operate to additionally or alternatively obtain marketing and/or consumer research information from the user 1601, the terminal 1620, and/or the mobile device 1610. For example, the information provided to the website server 1630 and/or security service 1640 from the terminal 1620 (i.e., arrows B and C) may include information indicative of the terminal 1620 and/or the user 1601, such as an approximate geographic location, information indicative of purchasing habits, etc. In some cases, for example, in order to utilize the authentication process of the system 1600, the user 1601 may be prompted to complete a brief survey and provide permission to share information with the security service 1640 and/or to receive marketing offers from the operators of the website server 1630 and/or security service 1640. Additionally or alternatively, the information provided to the security service 1640 from the mobile device 1610 (i.e., arrow H) may include information indicative of the mobile device 1610 and/or the user 1601, such as an approximate geographic location, information indicative of purchasing habits, etc. In some cases, the user 1601 may be prompted to provide such information in exchange for viewing the authenticity indication (arrow J). Additionally or alternatively, the user 1601 may consent to receiving offers related to products or services connected with the website being viewed on the terminal 1620 or to releasing contact information, etc. Moreover, the user 1601 may be provided with marketing and/or promotional materials (e.g., coupons, consumer loyalty/rewards programs benefits, other discounts or benefits, etc.) via the terminal 1620 and/or mobile device 1610 after completing the authentication procedure described herein.

In some examples, an authenticity failure message (at arrow I) may be accompanied by a query to request additional information about the non-authentic website from the user 1601. The additional information may include, for example, information about the complete website address, an indication of how the site was accessed, and any other information that may be useful in investigating and/or shutting down a fraudulent website. The information may then be passed to a fraudulent website investigation service, for example.

Figure 16B:
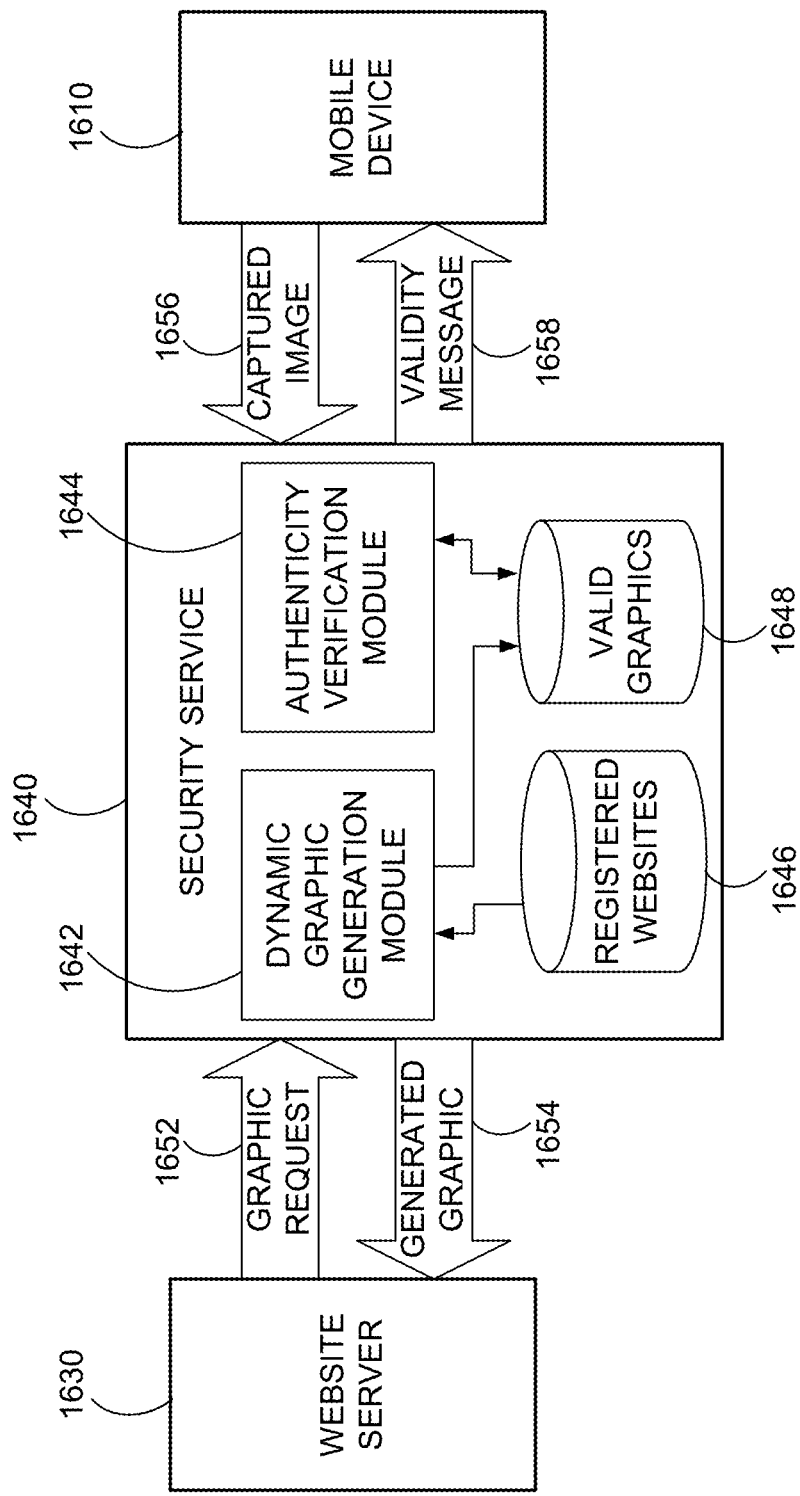
FIG. 16B illustrates some example functional modules in the network-based security service.

FIG. 16B illustrates some example functional modules in the network-based security service 1640. As shown, the security service 1640 can include a dynamic mark generation module 1642 and an authenticity verification module 1644, each of which can include a combination of hardware-implemented and/or software-implemented functional modules to carry out the functions described herein. The dynamic mark generation module 1642 can operate to output an authentication graphic (e.g., a raster image file) in response to receiving a mark request 1652 from the website server 1630. Upon receiving the mark request 1652, the dynamic mark generation module 1642 can refer a database of registered websites 1646, which can be a database maintained by the security service 1640 of screened, validated websites. The database of registered websites 1646 can include a listing, for example, of website addresses and security procedures and/or protocols for verifying the authenticity of messages from such websites (e.g., passwords, encrypted keys, etc.). Upon verifying that the request message 1652 is from an authentic website listed in the database of registered websites 1646, the generation module 1642 can create an authentication graphic and provide the generated graphic 1654 (e.g., generated mark) in a response message to the website server 1630 (and/or to the terminal 1620). The dynamic generation module 1642 can function to create the generated graphic based at least in part on substantially unique identifying information associated with the website server 1630 and/or terminal 1620 (e.g., a session identifier, session token, etc.). In some examples, the generated mark 1654 can include encoded information by arranging a pattern of characters and/or shapes in a pattern. Examples of authentication graphics and/or security marks with encoded information (e.g., serial numbers, etc.) can be found, for example, in connection with the discussion of FIGS. 1-13 above.

In some examples, the generated graphic 1654 may be created according to information indicative of a display on which the graphic 1654 is to be rendered (e.g., the display panel 1624 of the terminal 1620). For example, darker/lighter contrasting colors may be selected to account for a display with a relatively low contrast ratio. Other examples of display panel specific tuning and/or optimization of the generated mark 1656 may also be employed.

The dynamic mark generation module 1642 can also operate to update a database of valid marks 1648 stored in the security service 1640 to include the newly generated mark 1654. The database of valid marks 1648 is updated so that a subsequent query to validate an image of the generated mark includes an entry for the generated mark 1654. The security service 1640 can then receive a message from the mobile device 1610 including data indicative of a captured image 1656. The authenticity verification module 1644 can analyze the captured image 1656 to determine whether the captured image is of a valid authentication graphic or not. For example, the authenticity verification module 1644 can compare the captured image 1656 to valid graphics/marks included in the database of valid marks 1648. In another example, the authenticity verification module 1644 can extract information encoded in the captured image (e.g., based on a pattern of characters and/or shapes in the image 1656). The authenticity verification module can then check if an authentication graphic was previously generated with the encoded information, based on entries in the database of valid marks 1648. In some examples, failure to successfully extract encoded information from the captured image 1656 may cause the authenticity verification module 1644 to determine that the captured image 1646 is not of an authentic graphic. Upon determining that the captured image 1656 is valid because the imaged authentication graphic is included in the database of valid marks 1648, the authenticity verification module 1644 can then operate to remove the listing of the validated authentication graphic from the database of valid m arks 1648. Removing the validated authentication graphic from the database 1648 ensures that the authentication procedure is only completed once per generated authentication graphic. The security service 1640 can then send an authenticity indicating validity message 1658 to the mobile device 1610.

Figure 17:
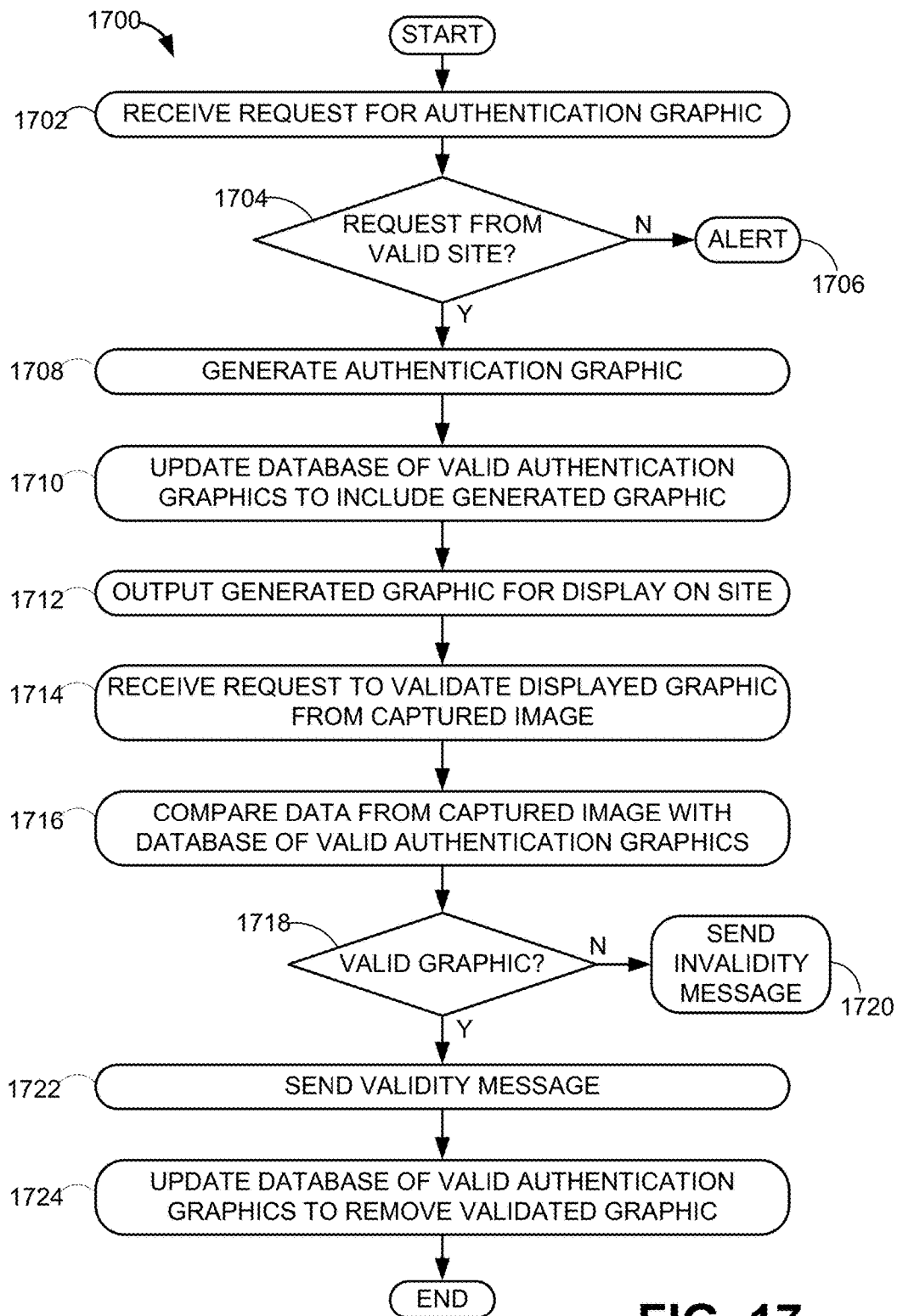
FIG. 17 is a flowchart of an example process for authenticating a website.

FIG. 17 is a flowchart of an example process 1700 for authenticating a website. At least some portions of the process 1700 may be performed, for example, by the network-based security service 1640 described in connection with FIG. 16A above. While applications vary, the process 1700 may be employed to authenticate websites associated with financial dealings (e.g., online banking websites, online investment websites, currency exchange, money transfers, etc.), government business (e.g., government benefits, taxes, etc.), healthcare records (e.g., websites for hospitals are care providers, medical insurers, etc.), websites for services (e.g., websites for online billpay and the like) and/or websites for online merchants (e.g., websites allowing product purchases, coupons and discounts websites, customer rewards sites, etc.). The foregoing example websites are included for example purposes only; other websites with other functions may be authenticated additionally or alternatively using the systems and processes disclosed herein.

Moreover, in some examples, the displayed content that is authenticated may be a network-delivered communication or an electronic document that is rendered on the display panel of the terminal 1620. For example, the display terminal may display an email, a text message, a facsimile, a document rendered using a Portable Document Format (PDF) viewer, a document created/viewed using a word processor, etc. Generally, any content displayed via the display panel 1624 of the terminal 1620 may incorporate authentication graphics which can then be authenticated via the camera-equipped mobile device 1610 in communication with the network-based security service 1640. In still further examples, the content to be authenticated may be an email, text message, PDF file, etc., that is displayed on the display 1616 of the mobile device 1610 itself and includes an authentication graphic. Similar to the discussion above, the mobile device 1610 can be used to authenticate such content by capturing an image of the content displayed on the screen 1616, and then communicating the captured image to the security service 1640 to obtain a determination of authenticity in response from the security service. Thus, rather than obtaining an image of an authentication graphic using the camera 1612 directed at the display panel 1624 of the terminal 1620, the mobile device 1610 may include suitable user interface commands to allow the user 1601 to capture an image of currently displayed content on the mobile device screen 1616 and thereby obtain an image of an authentication graphic rendered on the screen 1616.

The process 1700 can begin with the security service 1640 receiving a request for an authentication mark (or authentication graphic) (1702). For example, the security service 1640 can receive a request for an authentication mark from the website server 1630, which can itself be prompted by the user 1601 via the terminal 1620. The security service 1640 can evaluate the request to determine whether the request comes from a valid site (1704). For example, the security service 1640 can obtain credentials and/or authenticating information from the website server 1630 at block 1704 to validate the source of the request received at block 1702. If the security service 1640 determines the request is not from a valid site (e.g., if the website server fails to properly authenticate or is not listed in a list of predetermined screened and/or validated websites, such as in the registered website database 1646), the security service 1640 generates an alert 1706. The alert 1706 may include logging and storing available details of the request received at block 1702 for subsequent investigation. The alert 1706 may also include informing the requesting entity (from block 1702) that they are not registered with the security service 1640, and may include sending information to the requesting entity on how to become registered, etc.

On the other hand, if the request is determined to come from a valid, pre-screened website server at block 1704, the security service 1640 generates an authentication graphic, at block 1708. At block 1710, the security service 1640 can update a listing of valid authentication graphics (e.g., the database 1648) to allow the authentication graphic generated at block 1708 to be recognized subsequently. The information stored at block 1710 can include a copy of the digital graphic (e.g., a raster image file) and may additionally or alternatively include substantially uniquely identifying information for the generated graphic. For example, the information stored may include data indicative of information encoded in the authentication graphic generated at block 1708. At block 1712, the generated authentication graphic is output for display on the site. Block 1712 may involve outputting the digital image file for the generated graphic or providing a pointer (e.g., a link) to the file stored on the security service. For example, the security service 1712 may output a link to allow the terminal 1620 to access and display the authentication graphic 1626 on the display panel 1624 (e.g., via the arrow E'). To maintain security of such connections, secure tokens, passwords, encryption techniques and the like may be used to establish a session between the terminal 1620 and the security service 1640 and ensure the terminal 1620 is actually in communication with the website server 1630.

Once the authentication graphic is displayed on the terminal 1620, the security service may receive a request to validate the displayed graphic using a captured image, at block 1714. The request can include a transmission from the mobile device 1610 with data indicative of an image of the authentication graphic 1626 as it is displayed on the display panel 1624 of the terminal 1620. The data indicative of the image included with the request received at block 1714 may optionally be filtered, compressed, or otherwise pre-processed by hardware and/or software operating in the mobile device 1610. After receiving the request (and associated image data), the security service determines whether the captured image is of a valid authentication graphic, at block 1716. Block 1716 can include comparing data from the captured image with a stored listing of valid authentication graphics (e.g., the database 1648). In some cases, block 716 can include analyzing the received image data to extract encoded information in the imaged authentication graphic, and then determining whether the extracted encoded information corresponds to a currently valid authentication graphics. Based on such analysis, the security service determines, at block 1718, whether the authentication graphic is valid. If the graphic is not valid (e.g., no match found), the security service returns an invalidity message 1720 to the requesting mobile device 1610. On the other hand, if the security service 1640 determines at block 1718 that the imaged graphic is valid, the security service 1640 can send a validity message to the mobile device at block 1722.

At block 1724, the security service 1640 can also optionally update the stored listing of authentication graphics to remove the graphic validated in block 1718. By removing the graphic from the list of valid authentication graphics after a single validation, the security service 1740 can prevent the system 1600 from being used to validate multiple websites from a single authentication graphic. However, in some examples, block 1724 may be omitted or modified to allow for such behavior, depending on particular implementations. For example, each generated graphic may be valid for up to N number of authentications (N>1), at which point it is removed from database 1648 to prevent additional successful authentications. In another example, each generated graphic can be valid for a particular time window, to allow sufficient time for the user 1601 to capture an image of the displayed graphic, send an authentication request to the security service 1640, and receive an indication of the authenticity determination via the mobile device 1610. Such a time window may be, for example, about 60 seconds. Generally, expiring authentication graphics, single-use authentication graphics, or N-use authentication graphics, or combinations thereof, frustrate attempts to create a counterfeit website that incorporates such authentication graphics (perhaps by intercepting/copying such a graphic, once generated, from a website server and/or terminal), because the website is forced to constantly update the authentication graphics that are displayed as currently valid authentication graphics and changed/updated on an ongoing basis. In a single-use authentication scenario, a counterfeit website is completely frustrated from using authentication graphics since each generated graphics are only valid for a single authentication.

In some examples, after determining the graphic is not valid at block 1718, the security service 1720 may also log information about the details of the request and the captured image at block 1720 for subsequent investigation. In some cases, the security service 1640 may additionally request additional information from the user 1601 of the mobile device 1610 by sending queries, prompts, etc. to learn additional information about the conditions/nature of the user's encounter with the invalid graphic and the website on which it appeared.

Figure 18A:
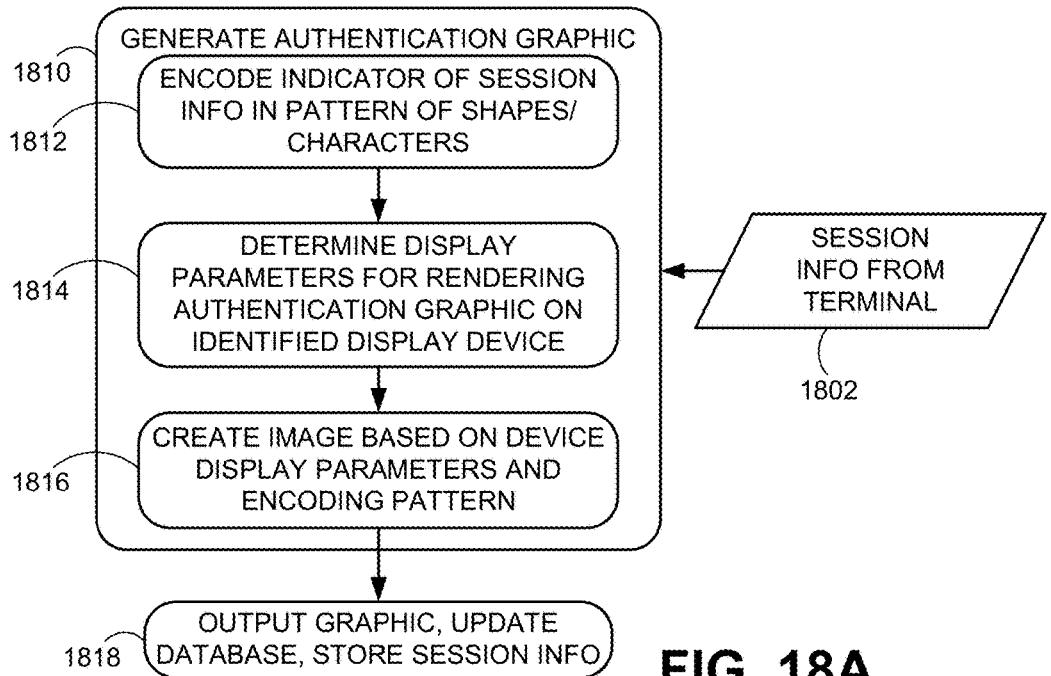
FIG. 18A is a flowchart of an example process for authenticating a website and harvesting user-specific data.

FIG. 18A is a flowchart of an example process for authenticating a website and simultaneously harvesting consumer/promotional data. In general, the processes in FIGS. 18A-18B allow for mapping a user's experience/interaction with the website server 1630 via the terminal 1620 to their experience/interaction with the security service 1640 via the mobile device 1610. In some cases, the processes in FIGS. 18A-18B can also allow for supplementing a user's website experience by delivering additional, supplemental, and/or complementary content to the user's mobile device. For example, the security service 1640 and/or website server 1630 can select and deliver content to the mobile device 1610 that may include promotional content, marketing content, product information content, customer rewards program content, coupons, discounts, entry offers, etc., and at least some of such content may relate to the user's interaction with the website server 1630 (e.g., products/services offered via the website the user 1601 viewed via the terminal 1620).

FIG. 18A is a process for generating an authentication graphic 1810, which may be carried out by the network-based security service 1640. The security service 1640 can receive session info 1802 for the connection between the website server 1630 and the terminal 1620. The session info 1802 may include, for example, a session identifier, a session token, etc. to uniquely identify a particular communication link maintained by the website server 1630 and the terminal 1620. At block 1812, the session information 1802 can then be encoded into a pattern of shapes/characters according to a predetermined key maintained by the security service 1640. Additionally or alternatively, a substantially random arrangement of shapes/characters can be created and mapped to the session information 1802 via a lookup table maintained by the security service 1640. Generally, block 1812 results in a two-dimensional pattern that the security service 1640 is able to associate with the session information 1802. At block 1814, the security service 1640 may also determine display parameters for rendering an authentication graphic. For example, based on the size, contrast ratio, refresh rate, brightness, sharpness, pixel layout, etc. of the display panel 1624 (which information may optionally be included with the session information 1802), the security service 1640 can determine one or more parameters that are tuned, optimized, or otherwise judged suitable for rendering the authentication graphic 1626 on such display panel 1624. The parameters determined in block 1814 are generally set such that the resulting authentication graphic 1626, once rendered, is sufficient to allow for imaging via the image sensor 1612 on the mobile device 1610. For instance, in embodiments in which the authentication graphic includes contrasting features, the display colors may be selected to create greater relative contrast to account for a display panel with relatively low contrast ratio. Other examples of such compensation are also possible. In some embodiments, however, block 1814 may be omitted entirely or in part.

At block 1816, an image is created based on device display parameters and the encoding pattern. For example, a raster image can be created that includes a background field arranged as a line screen pattern or another distribution of line segments and/or shapes, and a foreground field of patterned shapes and/or characters rendered with another line screen pattern or another distribution of line segments/shapes. Line screen patterns, as used herein, refers to a rendered pattern of substantially regularly spaced parallel lines that fill a specified two-dimensional region, which region may include shapes, alphanumeric characters, etc. At block 1818, the graphic created at block 1816 is output, the listing of valid authentication graphics is updated to include the created graphic, and the session info 1802 is stored for future reference. In some examples, the session info 1802 is stored so as to be associated with the authentication graphic generated at block 1816.

Figure 18B:
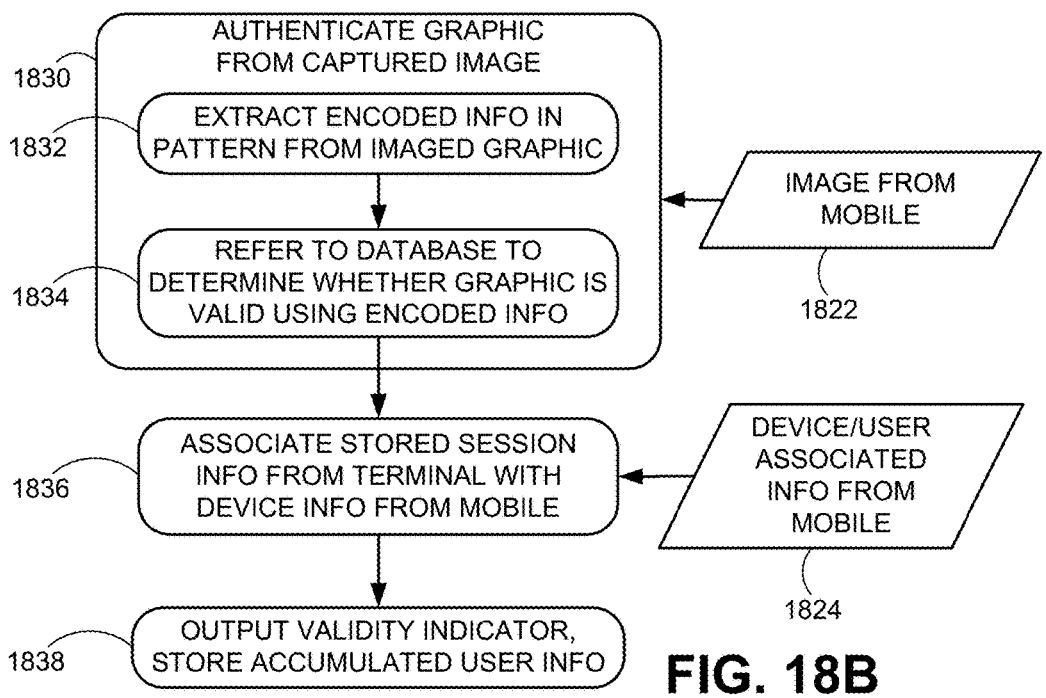
FIG. 18B is a flowchart of another example process for associating an authentication operation with user-specific data.

FIG. 18B is a process for authenticating an imaged authentication graphic 1830, which may be carried out by the network-based security service 1640. The security service 1640 can receive an image 1822 from mobile device 110. The image 1822 may include, for example, an image file for an image captured via the image sensor 1612, or data indicative of such an image (e.g., filtered, compressed, or otherwise pre-processed data derived from a captured image). At block 1832, the security service 1640 can extract (e.g., decode) information from the imaged graphic based on a pattern of shapes/characters in the imaged graphic. The extracted information may be a serial number, or another substantially unique identifier associated with an entry in a lookup table or other database accessible to the security service 1640. At block 1834, the security service 1640 can refer to a database of valid authentication graphics to determine whether the imaged graphic is valid. For example, the security service 1640 can check whether a currently valid mark includes the encoded information extracted at block 1832.

The security service 1640 can then associated stored session information 1802 indicative of the user's interaction with the website server 1630 via the terminal 1620 with information 1824 from the mobile device 1610. In some cases, the information 1824 from the mobile device 1610 may be information the user 1601 enters into the device 1610 in real time in response to a prompt (e.g., a short survey regarding the website, purchasing plans, income, location, etc.). In some cases, the information 1824 from the mobile device 1610 may additionally or alternatively may be information the user 1601 pre-authorizes the security service 1640 to access (e.g., upon registering with the security service, etc.) and may include information such as the geo-location of the mobile device 1610, usage information about the mobile device 1610, income information, call history, other information useful for promotional/marketing purposes, etc.). At block 1838, the security service 1640 sends the mobile device 1610 an indication of the validity determination and stores the aggregated user information. Because the imaged authentication graphic was substantially uniquely identified with the session information in block 1830, the security service 1640 is able to associate the user 1601 with both the mobile device 1610 and the terminal 1620, and to associate data gathered from each with the user 1601.

In some embodiments, upon associating the user 1601 with both the terminal interactions the security service 1640 and/or website server 1630 may also identify additional user-deliverable content that can be delivered via the terminal 1620 (e.g., advertisements, emails, etc.) and/or mobile device 1610 (e.g., text messages, mobile website, pre-loaded application, etc.). Thus, the security service 1640 and/or website server 1630 may analyze the device/user associated information 1824 and identify supplemental and/or complementary content to provide to the user 1601 via the mobile device 1610 and send such information. In some examples, promotional materials, discount offers, etc. related to products/services offered via the website viewed on terminal 1620 may be provided to the user 1601 via the mobile device 1610, thereby enriching the user's interaction with the particular content and enhancing the marketing efforts of the website server 1630.

In some examples, the authentication procedure(s) described herein can involve charging an additional fee or requesting additional information from the user 1601 in exchange for the security service 1640 providing the authentication service.

X. Authentication at Point-of-Sale

Figure 19:
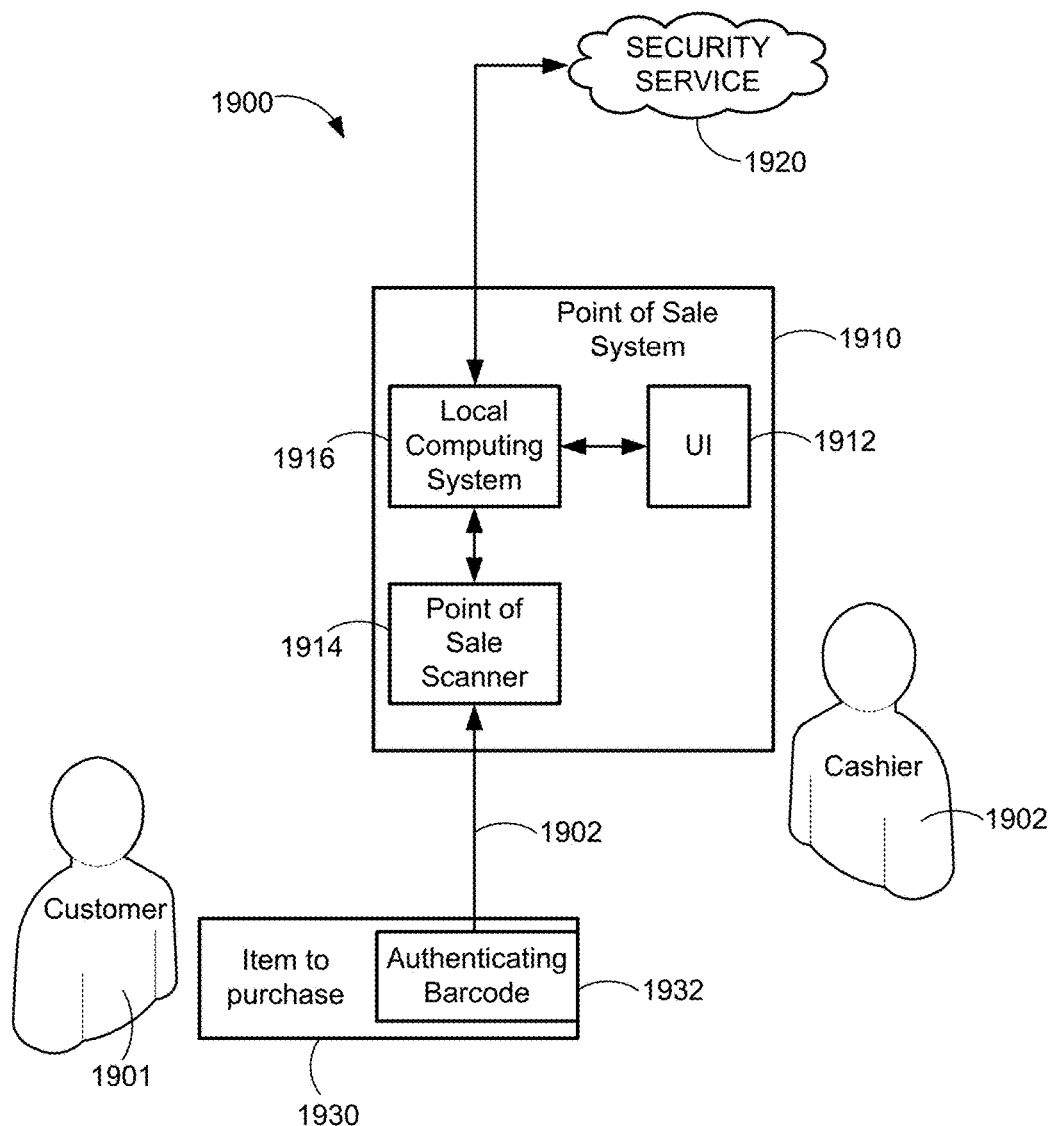
FIG. 19 is a block diagram of a point of sale system.

FIG. 19 is a block diagram of an example point of sale system 1900 configured to authenticate an item 1930 at the point of sale via an authenticated barcode pattern 1932. In a retail environment, a customer 1901 selects an item to purchase from among an inventory of items available for purchase at the particular store. Each item is labeled with an item-specific printed pattern to facilitate recognition by the point of sale system 1910. For instance, each item may be labeled by a pattern of printed indicia including contrasting regions, and the spatial arrangement of the contrasting regions can encode information related to the item (e.g., a barcode or quick response code may be used to encode a series of numbers, which can then uniquely identify a particular item in the store's inventory. At the point of sale, the customer 1901 presents their selected item (e.g., the item 1930) to a cashier 1902 to negotiate a transaction to purchase the item 1930. The cashier 1902 uses a point of sale system 1910 to scan the item-specific printed pattern, and the system 1910 identifies the item and the price of the item based on the identification. For instance, a computing system 1916 associated with the point of sale system 1910 may include a database with an entry for each item in the store's inventory. The database can also store data associated with each item, such as the item's price and an indication of its item-specific printed pattern (e.g., barcode, quick response code). Such a database may further be in communication with an inventory control system, and upon completing a transaction for a given item 1930, the inventory control system can be updated to reflect one less of the item in the store.

Once the item and price are identified based on scanning the item-specific printed pattern, information related to the price and other information pertinent to the transaction can be conveyed to the cashier 1902 and/or customer via a user interface 1912. The user interface 1912 may include, for example, a display.

In embodiments disclosed herein, a retail environment may label items in their inventory using authenticating barcodes 1932, which include latent security features integrated within regions of the barcode pattern. The security features may be similar to the security features described throughout the present disclosure. For instance, latent images of alphanumeric characters, symbols, etc., rendered as fields filled with a line screen pattern surrounded by a visually integrated setting. In some cases, the latent image and the background setting may each be line screen patterns having substantially common colors, print density, and line frequency, but oriented at different angles. As discussed above, due to limitations of photocopiers, scanners, and the like, such latent images are rendered in a modified form upon reproduction. In some cases, the latent image is no longer present in a reproduction. As a consequence, a printed pattern that includes such latent images integrated within solid regions of the pattern may be authenticated as an original (e.g., not a photocopy). In particular, the point of sale scanner 1914 may include an imaging system that is configured to automatically focus on contrasting regions of a printed pattern, such as the contrasting regions of a barcode pattern, and obtain a two-dimensional pixelated image of the pattern. The obtained image may then undergo pre-processing within the point of sale system (e.g., using the local computing system 1916).

A query can then be sent to a security service 1920 to determine whether the imaged pattern is authentic. The query may include the obtained image (or a processed version of such image), and can be transmitted by the local computing system 1916. In some examples, the security service 1920 may be a remote server, similar to the discussion of the security service 1640. The security service 1920 is configured to analyze the data in the query (e.g., the obtained image), and send a response to the point of sale system 1910 indicating whether the image is authentic. In particular, if the security service 1920 successfully decodes latent security features from one or more solid regions of the image of the printed pattern, then the security service 1920 may provide a response indicating that the printed pattern is authentic. An indication of authenticity may optionally be provided via the user interface 1912, such as an audible indicator (e.g., beep or chime) and/or a visual indicator. On the other hand, if the security service 1920 is not able to decode latent security features from the printed pattern, then the service 1920 may provide a response indicating that the printed pattern is not authentic. Moreover, in some examples, the security service 1920 may provide a response indicating that the printed pattern should be imaged again, such as in a case where the obtained image was not well focused or was too far from the printed pattern, etc. Upon receiving such an indication of non-authenticity from the security service 1920, an indication of non-authenticity may optionally be provided via the user interface 1912, such as an audible indicator and/or a visual indicator. In some examples, upon receiving an indication of non-authenticity from the security service 1920, the point of sale system 1910 may be configured to automatically halt a transaction with the customer 1901 or take other actions, such as alerting an inventory control system and/or legal authorities.

In an example operation, the customer 1901 presents the item 1930 to the cashier 1902. The item 1930 is labeled by authenticating barcode 1932. The cashier 1902 uses the point of sale system 1910 to obtain an image (1902) of the authenticating barcode 1932 via the point of sale scanner 1914. The obtained image (or a processed version of such image) is then communicated to the security service 1920, and the security service 1920 determines whether the authenticating barcode 1932 is authentic based in part on whether latent security features can be decoded from solid regions barcode within the obtained image. The security service 1920 then sends an indication of the authenticity determination to the point of sale system 1910 (and/or to other systems, such as an inventory control system) and the point of sale system 1910 provides an indication of the authenticity determination via the user interface 1912. The cashier 1902 can then proceeds with the transaction (or not) based in part on the indication. By preventing the purchase and sale of non-authentic goods, the system 1900 thereby protects the customer 1901 from purchasing non-authentic merchandise and also protects the retail store by alerting the store to the presence of non-authentic merchandise.

Figure 20A:
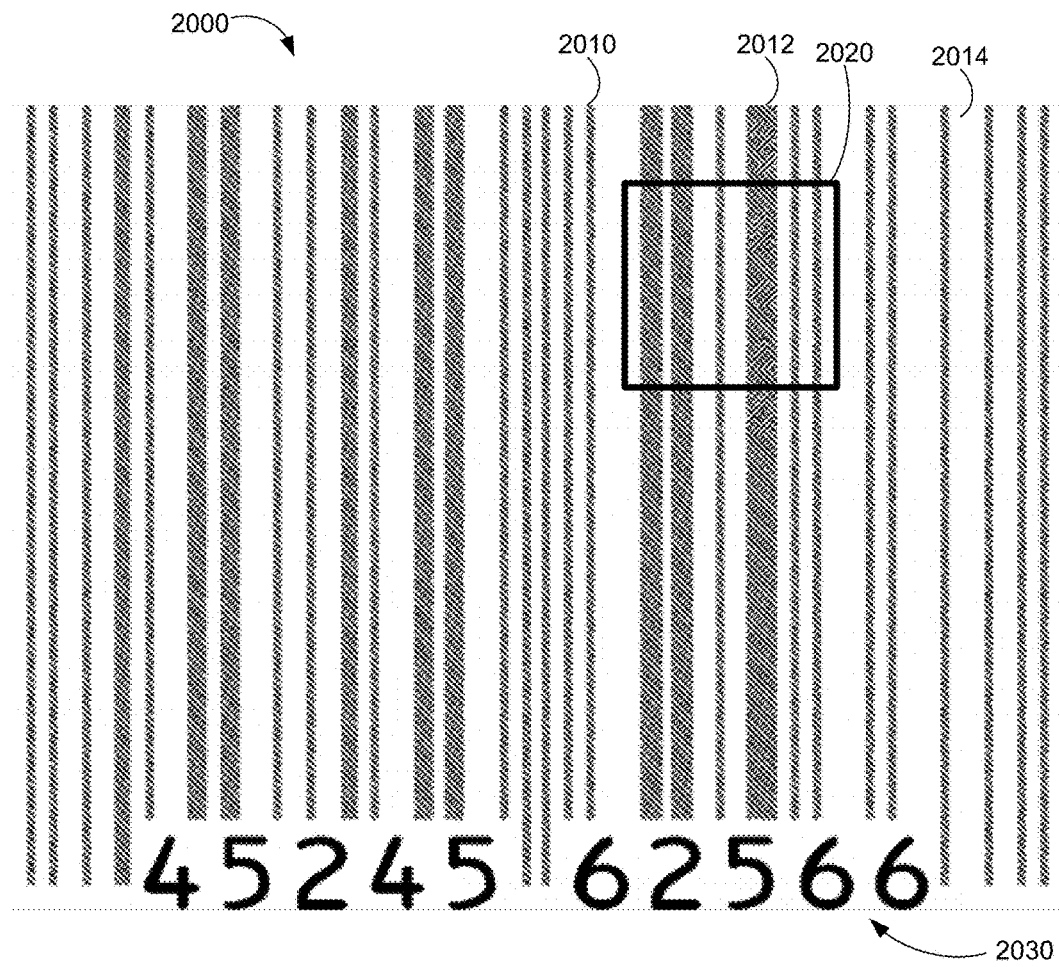
FIG. 20A shows an example barcode incorporating an embedded security feature within at least one bar area.
Figure 20B:
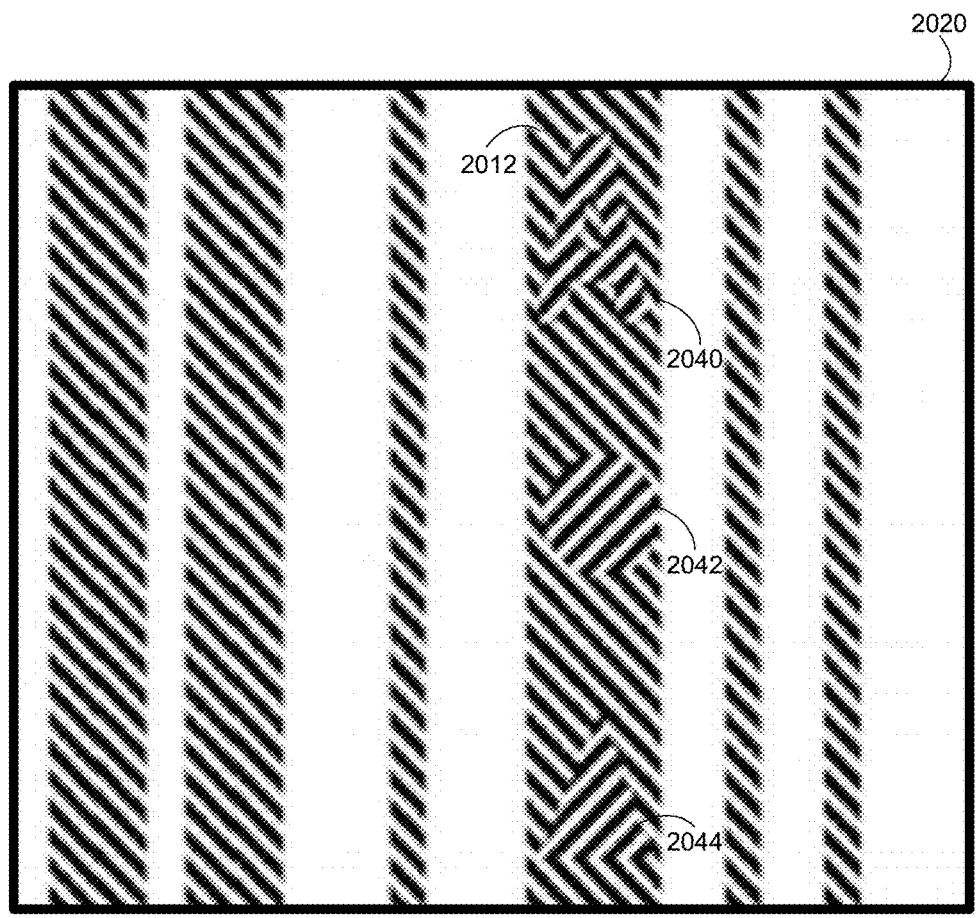
FIG. 20B shows an enhanced view of a portion of the barcode shown in FIG. 20A.

FIG. 20A shows an example barcode incorporating an embedded security feature within at least one bar area. FIG. 20B shows an enhanced view of a portion of the barcode shown in FIG. 20A. The barcode 2000 includes a pattern of contrasting regions, namely dark regions (e.g., the bar region 2010 and the bar region 2012) and light regions (e.g., the light space 2014 between bars). The spacing between bars, and the thickness of the bars, are used to encode a number 2030 in a manner that allows a barcode scanner to read the code (and thereby use the number 2030 as a lookup to identify the item with which the barcode 2000 is associated). Box 2020 is shown in an enhanced view in FIG. 20B. As shown in FIG. 20B, the bar region 2012 includes a series of security features integrated entirely within the solid bar region 2012. In particular the bar region 2012 includes a background line screen pattern oriented in a first direction, which may be approximately 45 degrees to the orientation of the lengths of the bar regions. Within the bar region, and entirely surrounded by the background line screen pattern, there are three latent security features: a capital "A" 2040, a circle 2042, and a triangle 2044. In some examples, each of the security features 2040, 2042, 2044 are formed by line screen patterns with the same print density, color, and line frequency as the background line screen pattern, but with an orientation approximately perpendicular to the background line screen pattern.

Many other examples of security features integrated into solid regions of item-specific printed patterns are possible. For instance, characters may be included in a solid region of a two-dimensional printed pattern (e.g., a quick response code). In addition, the latent security features that are integrated within the printed pattern may include alphanumeric characters (e.g., the letter "A" 2040), shapes (e.g., the circle 2042 and triangle 2044), and other recognizable symbols.

Further still, in some examples, the authenticating barcode patterns may be encoded with serialized data via the latent security features integrated in one or more solid regions of the barcode. Thus, a given barcode may be used to store far more information than could be stored in a single barcode of contrasting printed regions. To take just one example, a barcode which includes 8 alphanumeric characters integrated within one or more solid regions of the barcode as latent security features could be arranged in $36^8$ different arrangements. Such a barcode could conceivably be encoded with serialized security features so as to uniquely identify each given item shipped by a manufacturer (as opposed to merely identifying each type of item). Upon negotiating the item at the point of sale, an inventory control system could be updated to confirm that a given item being negotiated corresponds to an item that was shipped to that retail store via an authorized supply chain. Such a system could thus be used to detect product diversions within a given supply chain and/or introduction of counterfeit merchandise within a given supply chain.

Figure 21:
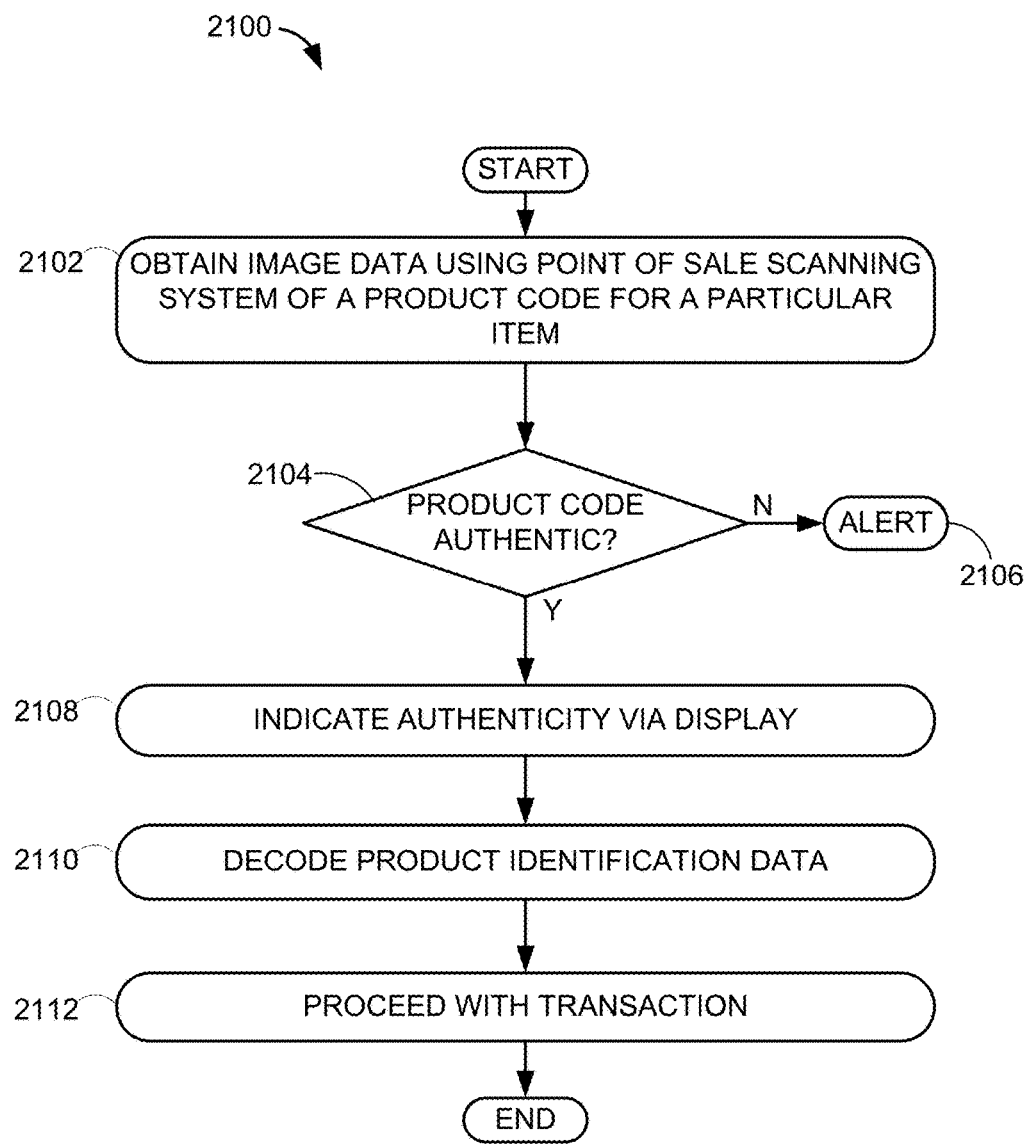
FIG. 21 is a flowchart showing an example operation that may be performed using a point of sale system.

FIG. 21 is a flowchart showing an example process 2100 that may be performed using a point of sale system. At block 2102, the point of sale system obtains an image of a product code for a particular item using a point of sale scanning system. At block 2104, the point of sale system makes a determination whether the product code is authentic based on the obtained image. In some examples, the determination can be made based on sending the obtained image (or a processed version of such image) to a security service, which determines whether the image is authentic based on being able to successfully decode latent security features from the product code. Because the security features are altered in a reproduction of the product code, successfully decoding such features indicates that the product code is authentic. If it is determined that the product code is not authentic, an alert may be generated at block 2106. For example, the security service may send a response to the point of sale system that causes a user interface of the point of sale system to indicate that the product code is not authentic.

If it is determined that the product code is authentic, an indication of authenticity can be displayed (or otherwise indicated) via the user interface of the point of sale system, at block 2108. At block 2110, product identification data can be decoded by the point of sale system based on the image obtained at block 2102. For instance, product identification data may be encoded in the product code based on the spatial arrangement of contrasting regions within the product code (e.g., as in a barcode). In some cases, block 2110 may precede block 2104. At block 2112, the point of sale system can proceed with the transaction. For example, the point of sale system may request a payment to be tendered by the customer in exchange for the particular item.

Among other aspects, the authenticated product code may be implemented as a 1-dimensional barcode (UPC code), a 2-dimensional printed code (e.g., QR code within its internal locator solid squares), a pdf 417 barcode, a GS1 stacked databar barcode or the like. The product codes may be printed in black ink or a color or a combination of colors or reversed out of a white or black or color image, laser engraved, hot or cold foil stamping, die-cut or applied utilizing holographic foils and/or embedded in a holographic image. Moreover, the product codes can be printed utilizing inks other than traditional, such as thermal reactive, coin reactive, UV or IR light reactive, blind emboss or ink jet holographic to add another layer of authentication. For instance, in addition to decoding latent security features, some embodiments may involve illuminating the barcode with UV or applying heat to first make the security features visible via UV-reactive and/or heat-reactive inks A single or multiple bars (or other solid regions of a product code) can used as a background region into which latent characters can be incorporated (e.g., the bar region 2012). An example of multiple bars could include a barcode that has two solid bars at either end of the code, thus dual authenticating codes (on both solid bars) could be utilized.

The security features do not interfere with a conventional barcode scanner as the preferred line screen angles prohibit a break in the scan (e.g., a line angle of about 45 degrees to the length of the bar). Utilizing a camera scanner instead of a traditional bar code scanner allows for detecting the latent security features at the same time as the barcode read. But the latent characters can then be decoded when the barcode is imaged or revealed, either by a matching lenticular lens, camera, wearable device or a smartphone application.

By integrating the hidden prism marks into barcode bars themselves, no additional exterior packaging space is required to incorporate an authenticated packaging feature. In addition, the presence of the security feature is relatively more covert, because the mark appears to be a conventional barcode to the naked eye, and the security features can be scanned simultaneously with the UPC or 2d code in a single operation at the point of sale.

As noted above, the additional information represented by the latent characters may be used for authenticating the UPC code at the point of sale and also for product tracking, inventory control, document content control, etc. The barcode bars or squares can contain the prism codes to be positioned either horizontally or vertically or both, depending if additional authentication at the opposite angle needs to be accomplished.

Barcodes that incorporate these security features can also be designed as copy distortion patterns, such as described in a U.S. patent application publication no. 2013/0320099.

The barcode containing integrated latent security features can be printed on a substrate, such as a portion of an item packaging, or may be resident as displayed images on an electronic display (e.g., television screen, computer screen, tablet screen, wearable device or smartphone screen). The barcode containing integrated latent security features can be resident in a text message, photograph or email correspondence as an authentication of the content, author or date.

The barcode containing integrated latent security features may accompany or be incorporated into photographs or artwork to serve as authentication of evidence. The barcode containing integrated latent security features can be incorporated into the barcode at 100% of overall size or less than 100% to facilitate density of the bar or locator block uniformity.

Dual usage of the barcode is accomplished by utilizing at or near 100% density in a portion of the bar or block for inventory scans, and a line-screened area completing the bar or block to act as an authentication area for camera scanning.

Many functions described herein may be implemented in hardware, firmware, or software. Further, software descriptions of the disclosure can be used to produce hardware and/or firmware implementing the disclosed embodiments. According to some embodiments, software and/or firmware may be embodied on any known non-transitory computer-readable medium having embodied therein a computer program for storing data. In the context of this disclosure, computer-readable storage may be any tangible medium that can contain or store data for use by, or in connection with, an instruction execution system, apparatus, or device. For example, a non-volatile computer-readable medium may store software and/or firmware program logic executable by a processor to achieve one or more of the functions described herein in connection with FIGS. 1-21. Computer-readable storage may be, for example, an electronic, magnetic, optical, electromagnetic, infrared, or semiconductor system, apparatus, or device, or any suitable combination of the foregoing. More specific examples of computer-readable storage would include but are not limited to the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. Further, although aspects of the present disclosure have been described herein in the context of a particular implementation in a particular environment for a particular purpose, those of ordinary skill in the art will recognize that its usefulness is not limited thereto and that the present disclosure can be beneficially implemented in any number of environments for any number of purposes.

Figure 22:
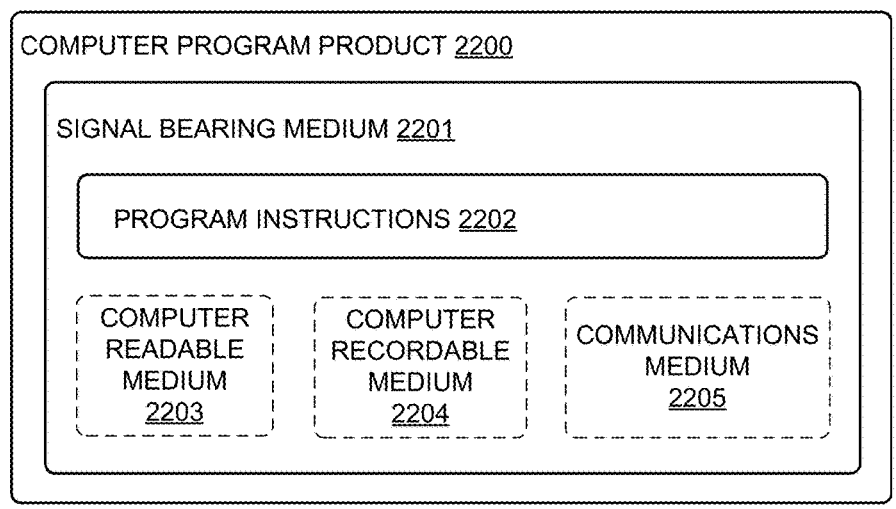
FIG. 22 depicts a computer-readable medium configured according to an example embodiment.

FIG. 22 depicts a computer-readable medium configured according to an example embodiment. In example embodiments, the example system can include one or more processors, one or more forms of memory, one or more input devices/interfaces, one or more output devices/interfaces, and machine-readable instructions that when executed by the one or more processors cause the system to carry out the various functions, tasks, capabilities, etc., described above.

As noted above, in some embodiments, the disclosed techniques can be implemented by computer program instructions encoded on a non-transitory computer-readable storage media in a machine-readable format, or on other non-transitory media or articles of manufacture (e.g., instructions stored on the memory storage(s) of the website server 1630, security service 1640 and/or mobile device 1610 of the system 1600 described in connection with FIG. 16, or any of the systems described in connection with FIGS. 1-5 and elsewhere herein). FIG. 22 is a schematic illustrating a conceptual partial view of an example computer program product that includes a computer program for executing a computer process on a computing device, arranged according to at least some embodiments presented herein.

In one embodiment, the example computer program product 2200 is provided using a signal bearing medium 2201. The signal bearing medium 2201 may include one or more programming instructions 2202 that, when executed by one or more processors may provide functionality or portions of the functionality described above with respect to FIGS. 1-21. In some examples, the signal bearing medium 2201 can be a non-transitory computer-readable medium 2203, such as, but not limited to, a hard disk drive, a Compact Disc (CD), a Digital Video Disk (DVD), a digital tape, memory, etc. In some implementations, the signal bearing medium 1901 can be a computer recordable medium 2204, such as, but not limited to, memory, read/write (R/W) CDs, R/W DVDs, etc. In some implementations, the signal bearing medium 2201 can be a communications medium 2205, such as, but not limited to, a digital and/or an analog communication medium (e.g., a fiber optic cable, a waveguide, a wired communications link, a wireless communication link, etc.). Thus, for example, the signal bearing medium 2201 can be conveyed by a wireless form of the communications medium 2205.

The one or more programming instructions 2202 can be, for example, computer executable and/or logic implemented instructions. In some examples, a computing device such as the processor-equipped security service 1640 of FIG. 16 is configured to provide various operations, functions, or actions in response to the programming instructions 2202 conveyed to the computing device by one or more of the computer readable medium 2203, the computer recordable medium 2204, and/or the communications medium 2205.

The non-transitory computer readable medium 2203 can also be distributed among multiple data storage elements, which could be remotely located from each other. The computing device that executes some or all of the stored instructions could be a networked server, such as the network-based security service 1640 illustrated in FIG. 16, or a mobile computing platform, such as a smartphone, tablet device, personal computer, etc., such as the mobile device 1610. Alternatively, the computing device that executes some or all of the stored instructions could be a combination of computing devices working cooperatively, some of which may include a remotely located computer system, such as a server.

XI. Additional Embodiments

Embodiment A1: A system for authenticating at least one hidden security feature, the system comprising: a secure physical document with at least one hidden security feature; and a smart device comprising a processor, a camera, a capture application, and a security service; wherein the camera captures image information corresponding to the at least one hidden security feature to be authenticated, the capture application performs processing, via the processor, to generate a processed digital image containing image data corresponding to the hidden security feature; and wherein the security service receives the processed digital image containing image data corresponding to the hidden security feature from the capture application, processes, via the processor, the processed digital image containing image data corresponding to the hidden security feature, and sends data to the smart device indicating the authenticity of the processed digital image containing image data corresponding to the hidden security feature.

Embodiment A2: The system of Embodiment A1, wherein the at least one hidden security feature comprises a hidden target pattern.

Embodiment A3: The system of Embodiment A2, wherein the at least one hidden security feature comprises hidden textual information.

Embodiment A4: The system of Embodiment A2, wherein the camera communicates with a security-specific autofocus function, the security-specific autofocus function analyzing image data corresponding to the hidden target pattern.

Embodiment A5: The system of Embodiment A1, wherein the hidden security feature is accomplished using PRISM security technology.

Embodiment A6: The system of Embodiment A1, wherein the hidden security feature is accomplished using VERI-GLOW security technology.

Embodiment A7: The system of Embodiment A1, wherein the hidden security feature is adjacent to a barcode.

Embodiment A8: The system of Embodiment A7, wherein the barcode is a two-dimensional barcode.

Embodiment A9: The system of Embodiment A8, wherein the barcode is one of a QR code, data matrix, PDF417, or Aztec.

Embodiment A10: The system of claim Embodiment A1, wherein the security service comprises a database, the database comprising security feature data, rules data, tracking data, and image data.

Embodiment B1: A system for authenticating documents, the system comprising: a document comprising hidden data to be authenticated; a smart device comprising a processor, a camera, and a capture application; and a security service communicatively coupled to the smart device.

Embodiment B2: The system of Embodiment B1, wherein the camera captures a preview image of hidden data to be authenticated, the camera communicates the preview image to the capture application, and the capture application filters the preview image to optically reveal the hidden data to be authenticated.

Embodiment B3: The system of Embodiment B2, wherein the capture application communicates data to the camera to adjust focus and generate a second preview image.

Embodiment B4: The system of Embodiment B2, wherein the hidden data to be authenticated comprises a preferred focus pattern.

Embodiment B5: The system of Embodiment B2, wherein the document comprises a barcode, and the barcode is positioned such that the hidden data to be authenticated is adjacent to a barcode.

Embodiment B6: The system of Embodiment B5, wherein the hidden data substantially surrounds the barcode.

Embodiment C1: A method of authenticating a hidden security feature using a smart device, the smart device comprising a display, a camera and a security application, the method comprising: capturing, via the camera, an image of a hidden security feature; processing, via the security application, the image to create a processed image; communicating the processed image to a security server, the security server comprising a decision processor and a database, the database comprising security feature data; determining, via the decision processor and according to the security feature data, the authenticity of the processed image and generating corresponding authenticity information; communicating the authenticity information to the capture application; and, displaying the authenticity information on the display of the smart device.

Embodiment C2: The method of Embodiment C1, wherein the hidden security feature comprises a target pattern and text.

Embodiment C3: The method of Embodiment C2, wherein the target pattern and text are hidden using PRISM security technology.

Embodiment C4: The method of Embodiment C2, wherein the target pattern and text are hidden using VERI-GLOW security technology.

Embodiment D1: A method comprising: receiving a request from a website server; responsive to the request, providing an authentication graphic to display via the website, wherein data indicative of the authentication graphic is stored in a database of valid authentication graphics; receiving data indicative of an image of the displayed authentication graphic, wherein the image is captured via a camera-equipped device; determining whether the imaged authentication graphic is valid based at least in part on the database of valid authentication graphics; and indicating the validity determination to the camera-equipped device.

Embodiment D2: The method according to Embodiment D1, wherein the validity determination includes: extracting information encoded in the imaged authentication graphic; and comparing the extracted information to information in the database of valid authentication graphics.

Embodiment D3: The method according to Embodiment D1, wherein the data indicative of the authentication graphic is removed from the database following a single validity determination such that the authentication graphic is valid for only a single validation.

Embodiment D4: The method according to Embodiment D1, further comprising: responsive to determining that the imaged authentication graphic is valid, updating the database of valid authentication graphics to remove data corresponding to the imaged authentication graphic.

Embodiment D5: The method according to Embodiment D1, further comprising: responsive to receiving the request, generating the authentication graphic.

Embodiment D6: The method according to Embodiment D5, wherein the authentication graphic is generated based on data received from the website server that substantially uniquely identifies the request.

Embodiment D7: The method according to Embodiment D5, wherein the authentication graphic is generated based on a particular website session identifier.

Embodiment D8: The method according to Embodiment D1, wherein the provided authentication graphic includes a substantially uniquely identifying pattern.

Embodiment D9: The method according to Embodiment D8, wherein the substantially uniquely identifying pattern is correlated to the particular request from the website server.

Embodiment D10: The method according to Embodiment D8, wherein the pattern includes an arrangement of shapes or characters situated so as to encode information in the authentication graphic.

Embodiment D11: The method according to Embodiment D1, further comprising: extracting information encoded in the imaged authentication pattern; and associating the imaged authentication pattern with a particular request based on the extracted information.

Embodiment D12: The method according to Embodiment D1, further comprising receiving data indicative of consumer information.

Embodiment D13: The method according to Embodiment D12, wherein the consumer information includes at least one of: a location of the camera-equipped device when used to capture the image or information about a user associated with the camera-equipped device.

Embodiment D14: The method according to Embodiment D13, wherein the information about the user includes at least one of: contact information for the user, demographic information for the user, income classification for the user, or purchase habits for the user.

Embodiment D15: The method according to Embodiment D1, further comprising determining that the imaged authentication graphic is not authentic.

Embodiment D16: The method according to Embodiment D15, further comprising sending a report about the imaged authentication graphic for use by an authenticity tracking service, wherein the sent report includes at least one of: a location of the camera-equipped device when used to capture the image or information about a user associated with the camera-equipped device.

Embodiment D17: The method according to Embodiment D15, further comprising sending a message to the camera-equipped device to cause the camera-equipped device to prompt a user to provide information about the website from which the image of the determined not authentic authentication graphic was captured.

Embodiment D18: The method according to Embodiment D1, further comprising: identifying, based at least in part on the imaged authentication graphic, the website server associated with the provided authentication graphic; determining user-deliverable content to send to the camera-equipped device based identified website; and sending a message including the determined user-deliverable content.

Embodiment D19: The method according to Embodiment D18, wherein the user-deliverable content includes a product promotion.

Embodiment D20: The method according to Embodiment D19, wherein the sending data to the camera-equipped device includes sending data configured to cause the camera-equipped device to display product information corresponding to the product promotion.

Embodiment D21: The method according to Embodiment D1, wherein the displayed security feature includes a hidden target pattern comprising a latent image situated in a background, wherein at least one of the latent image or the background includes a line screen pattern, and wherein the latent image and the background are not readily distinguishable with the naked eye.

Embodiment D22: The method according to Embodiment D21, wherein the latent image includes one or more alphanumeric characters, the method further comprising: extracting encoded information from the imaged authentication graphic by recognizing the one or more alphanumeric characters.

Embodiment D23: The method according to Embodiment D21, wherein the encoded information is encoded, at least in part, according to the position or shape of one or more latent images Embodiment D24: The method according to any one of Embodiment D1-D23, wherein the camera-equipped device uses an application-specific autofocus function to capture the image of the authentication graphic from an electronic display of the website.

Embodiment E1: A non-transitory computer-readable medium including instructions that, when executed by one or more processors in a computing device, cause the computing device to perform operations, the operations comprising: receiving data indicative of an image of a printed security feature, wherein the image is captured via a camera-equipped device; extracting information encoded in the security feature based on the received data; determining that the printed security feature is authentic based at least in part on successfully extracting the information; determining user-deliverable content associated with the extracted information; and sending data indicative of the user-deliverable content to the camera-equipped device Embodiment E2: A non-transitory computer readable medium according to Embodiment E1, wherein the operations include performing a method according to any of Embodiments D1-D24.

Embodiment E3: A system including the non-transitory computer-readable medium of Embodiments E1 or E2.

Embodiment F1: A method comprising: receiving data indicative of an image of a security feature, wherein the image is captured via a camera-equipped device; extracting information encoded in the security feature based on the received data; determining that the security feature is authentic based at least in part on successfully extracting the information; determining user-deliverable content associated with the extracted information; and sending data indicative of the user-deliverable content to the camera-equipped device.

Embodiment F2: The method according to Embodiment F1, further comprising receiving data indicative of consumer information.

Embodiment F3: The method according to Embodiment F2, wherein the consumer information includes at least one of: a location of the camera-equipped device when used to capture the image or information about a user associated with the camera-equipped device.

Embodiment F4: The method according to Embodiment F3, wherein the information about the user includes at least one of: contact information for the user, demographic information for the user, income classification for the user, or purchase habits for the user.

Embodiment F5: The method according to Embodiment F1, wherein the user-deliverable content includes an authenticity verification message that indicates the security feature captured via the camera-equipped device is authentic, and wherein the authenticity verification message, when received at the camera-equipped device, causes the camera-equipped device to display an indication that the security feature is authentic.

Embodiment F6: The method according to Embodiment F1, further comprising: determining that the printed security feature is not authentic based at least in part on failing to successfully extract the information; and sending information about the printed security feature for use by an authenticity tracking service, wherein the stored information includes at least one of: a location of the camera-equipped device when used to capture the image or information about a user associated with the camera-equipped device.

Embodiment F7: The method according to Embodiment F1, wherein the extracted information is associated with a marketing promotion, and wherein the sending data to the camera-equipped device includes sending data configured to cause the camera-equipped device to display promotional information corresponding to the marketing promotion.

Embodiment F8: The method according to Embodiment F6, wherein the promotional information includes information to enable the camera-equipped device to be used to redeem the marketing promotion at a retail point of sale.

Embodiment F9: The method according to Embodiment F1, wherein the extracted information is associated with a particular product, and wherein the sending data to the camera-equipped device includes sending data configured to cause the camera-equipped device to display product information corresponding to the particular product.

Embodiment F10: The method according to Embodiment F1, wherein the extracted information is associated with a product warning, and wherein the sending data to the camera-equipped device includes sending data configured to cause the camera-equipped device to display warning information corresponding to the product warning.

Embodiment F11: The method according to Embodiment F10, wherein the warning information includes at least one of a list of allergies, side effects, or usage directions.

Embodiment F12: The method according to Embodiment F1, wherein the determining user-deliverable content includes identifying a particular product associated with the extracted information.

Embodiment F13: The method according to Embodiment F12, wherein the determining user-deliverable content further includes determining a marketing promotion for the particular product, and wherein the data sent to the camera-equipped device is configured to enable the camera-equipped device to be used to redeem a benefit of the marketing promotion.

Embodiment F14: The method according to Embodiment F13, wherein the camera-equipped device is enabled to be used to retrieve a negotiable instrument for the benefit of the marketing promotion via a retail kiosk.

Embodiment F15: The method according to Embodiment F13, wherein the camera-equipped device is enabled to be used to negotiate the benefit of the marketing promotion at a retail point of sale via at least one of wireless a scannable image rendered on a display of the camera-equipped device or a communication between the camera-equipped device Embodiment F16: The method according to Embodiment F1, wherein the security feature includes a hidden target pattern comprising a latent image situated in a background, wherein at least one of the latent image or the background includes a line screen pattern, and wherein the latent image and the background are not readily distinguishable with the naked eye.

Embodiment F17: The method according to Embodiment F16, wherein the latent image includes one or more alphanumeric characters, and wherein the extracting the encoded information includes recognizing the one or more alphanumeric characters.

Embodiment F18: The method according to Embodiment F16, wherein the encoded information is encoded, at least in part, according to the position or shape of one or more latent images.

Embodiment F19: The method according to any one of Embodiments F1-F18, wherein the security feature imaged by the camera-equipped device is a printed pattern rendered on a printable substrate.

Embodiment F20: The method according to any one of Embodiments F1-F18, wherein the security feature imaged by the camera-equipped device is an electronically displayed pattern rendered on an electronic display.

Embodiment F21: The method according to any one of Embodiments F1-F18, wherein the security feature imaged by the camera-equipped device is a pattern due to shadows cast by a surface geometry rendered in a textured substrate.

Embodiment F22: The method according to any one of Embodiments F19-F21, wherein the camera-equipped device uses an application-specific autofocus function to capture the image of the printed security feature.

Embodiment G1: A non-transitory computer-readable medium including instructions that, when executed by one or more processors in a computing device, cause the computing device to perform operations, the operations comprising: receiving data indicative of an image of a printed security feature, wherein the image is captured via a camera-equipped device; extracting information encoded in the security feature based on the received data; determining that the printed security feature is authentic based at least in part on successfully extracting the information; determining user-deliverable content associated with the extracted information; and sending data indicative of the user-deliverable content to the camera-equipped device.

Embodiment G2: A computer readable medium according to Embodiment G1, wherein the operations include performing a method according to any of Embodiments F1-F22.

Embodiment H1: A system including the non-transitory computer-readable medium of Embodiments G1 or G2.

Embodiment I1: A method comprising: capturing an image of a security feature via a camera-equipped device; sending data indicative of the captured image to a verification service; receiving, from the verification service, data indicate of user-deliverable content; and providing the user-deliverable content via a user interface of the camera-equipped device.

Embodiment I2: The method according to Embodiment I1, further comprising sending data indicative of consumer information to the verification service.

Embodiment I3: The method according to Embodiment I2, wherein the consumer information includes at least one of: a location of the camera-equipped device when used to capture the image or information about a user associated with the camera-equipped device.

Embodiment I4: The method according to Embodiment I3, wherein the information about the user includes at least one of: contact information for the user, demographic information for the user, income classification for the user, or purchase habits for the user.

Embodiment I5: The method according to Embodiment I1, wherein the user-deliverable content includes an authenticity verification message that indicates the security feature captured via the camera-equipped device is authentic, and wherein the authenticity verification message, when received at the camera-equipped device, causes the camera-equipped device to display an indication that the security feature is authentic.

Embodiment I6: The method according to Embodiment I1, further comprising:m determining, based on the user-deliverable content, whether to grant access to a restricted area to a person or object associated with the security feature; and in response to determining to grant access, allowing the person or object to access the restricted area.

Embodiment I7: The method according to Embodiment I1, further comprising: identifying, based on the user-deliverable content, a person associated with the security feature, wherein the person is identified based at least in part on a substantially unique pattern of characters encoded in the imaged security feature.

Embodiment I8: The method according to Embodiment I1, further comprising: identifying, based on the user-deliverable content, an account associated with the security feature, wherein the account is identified based at least in part on a substantially unique pattern of characters encoded in the imaged security feature.

Embodiment I9: The method according to Embodiment I8, further comprising, using the identified account to negotiate a transaction.

Embodiment I10: The method according to Embodiment I1, wherein the user-deliverable content includes information associated with a marketing promotion for a particular product associated with the captured image, and wherein the data received by the camera-equipped device is configured to enable the camera-equipped device to be used to redeem a benefit of the marketing promotion.

Embodiment I11: The method according to Embodiment I10, wherein the camera-equipped device is enabled to be used to retrieve a negotiable instrument for the benefit of the marketing promotion via a retail kiosk.

Embodiment I12: The method according to claim I10, wherein the camera-equipped device is enabled to be used to negotiate the benefit of the marketing promotion at a retail point of sale via at least one of wireless a scannable image rendered on a display of the camera-equipped device or a communication between the camera-equipped device Embodiment I13: The method according to Embodiment I1, wherein the security feature includes a hidden target pattern comprising a latent image situated in a background, wherein at least one of the latent image or the background includes a line screen pattern, and wherein the latent image and the background are not readily distinguishable with the naked eye.

Embodiment I14: The method according to Embodiment I13, wherein the latent image includes one or more alphanumeric characters, and wherein the extracting the encoded information includes recognizing the one or more alphanumeric characters.

Embodiment I15: The method according to Embodiment I13, wherein the encoded information is encoded, at least in part, according to the position or shape of one or more latent images.

Embodiment I16: The method according to any one of Embodiments I1-I15, wherein the security feature imaged by the camera-equipped device is a printed pattern rendered on a printable substrate.

Embodiment I17: The method according to any one of Embodiments I1-I15, wherein the security feature imaged by the camera-equipped device is an electronically displayed pattern rendered on an electronic display.

Embodiment I18: The method according to any one of Embodiments I1-I15, wherein the security feature imaged by the camera-equipped device is a pattern due to shadows cast by a surface geometry rendered in a textured substrate.

Embodiment I19: The method according to any one of Embodiments I16-I18, wherein the camera-equipped device uses an application-specific autofocus function to capture the image of the printed security feature.

Embodiment J1: A non-transitory computer-readable medium including instructions that, when executed by one or more processors in a computing device, cause the computing device to perform operations, the operations comprising: capturing an image of a security feature via a camera-equipped device; sending data indicative of the captured image to a verification service; receiving, from the verification service, data indicate of user-deliverable content; and providing the user-deliverable content via a user interface of the camera-equipped device.

Embodiment J2: A computer readable medium according to Embodiment J1, wherein the operations include performing a method according to any of Embodiments I1-I19.

Embodiment K: A system including the non-transitory computer-readable medium of Embodiments J1-J2.

In view of the exemplary systems described above, methodologies that may be implemented in accordance with the described subject matter will be better appreciated with reference to the various figures. For simplicity of explanation, the methodologies are depicted and described as a series of acts. However, acts in accordance with this disclosure can occur in various orders and/or concurrently, and with other acts not presented and described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be appreciated that the methodologies described in this disclosure are capable of being stored on an article of manufacture to facilitate transporting and transferring such methodologies to computing devices.

Although some of various drawings illustrate a number of logical stages in a particular order, stages which are not order dependent can be reordered and other stages can be combined or broken out. Alternative orderings and groupings, whether described above or not, can be appropriate or obvious to those of ordinary skill in the art of computer science. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to be limiting to the precise forms disclosed. Many modifications and variations are possible in view of the above teachings. The embodiments were chosen and described in order to best explain the principles of the aspects and its practical applications, to thereby enable others skilled in the art to best utilize the aspects and various embodiments with various modifications as are suited to the particular use contemplated.

What is claimed is:

1. A point-of-sale-system comprising:
an imaging system;
a user interface display;
a lightsource configured to illuminate a product code;
a control system configured to, while the point-of-sale system is used to complete a transaction for a particular item:
  causing a security feature to become visible by exposure to the light source;
  obtain, via the imaging system, image data of the product code associated with the particular item while the security feature is visible from the light source, wherein the product code comprises a pattern of printed indicia printed as a barcode and the security feature, wherein the security feature is distorted by a reproduction of the product code and wherein the security featured is located within the barcode;
  make a determination, based on the security feature, that the product code is either authentic or rather that the product code is unauthentic; and
  if the determination is made that the product code is unauthentic, cause the user interface display to render an indication of unauthenticity, or else, if the determination is made that the product is authentic, proceed with the transaction for the particular item.

2. The point-of-sale system of claim 1, further comprising a communication system, and wherein the control system is further configured such that the control system making the determination comprises the control system:
  sending an authentication query to an authentication server using the communication system, wherein the authentication query comprises at least a portion of the obtained image data;
  receiving, from the authentication server, an indication of an authenticity of the product code; and
  using the received indication as a basis to make the determination.

3. The point-of-sale system of claim 2, wherein the control system is further configured to receive, from the authentication server, an indication of serialized information associated with the particular item.

4. The point-of-sale system of claim 1, wherein the control system is further configured such that, if the determination is made that the product code is authentic, the control system proceeding with the transaction for the particular item comprises the control system:
  associating the product identification data with a price for the particular item;
  determining that a payment for the price has been tendered;
  in response to determining that the payment has been tendered, providing a receipt indicating the payment tendered and the product type indicated by the product identification data.

5. The point-of-sale system of claim 1, further comprising a communication system, wherein the control system is further configured such that, if the determination is made that the product code is unauthentic, the control system is configured to:
  terminate the transaction for the particular item; and
  send an unauthenticity indication to an authentication server using the communication system.

6. A method comprising:
while a point-of-sale system is used to complete a transaction for a particular item:
  illuminating a security feature by exposure to a light source, wherein the illuminating causes the security feature to be visible;
  obtaining, via an imaging system, image data of a product code associated with the particular item while the product code is illuminated, wherein the product code comprises a barcode and the security feature, wherein the security feature is distorted by a reproduction of the product code and wherein the security featured is located within the barcode;
  making a determination, based on the security feature, that the product code is either authentic or rather that the product code is unauthentic; and
  if the determination is made that the product code is unauthentic, cause a user interface display to render an indication of unauthenticity, or else, if the determination is made that the product is authentic, proceed with the transaction for the particular item.

7. The method of claim 6, further comprising:
sending an authentication query to an authentication server using a communication system, wherein the authentication query comprises at least a portion of the obtained image data;
receiving, from the authentication server, an indication of an authenticity of the product code; and
using the received indication as a basis to make the determination.

* * * * *